INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

Feb. 28, 1967 G. H. DURR 3,307,156

INFORMATION PROCESSING AND DISPLAY SYSTEM

Filed Oct. 1, 1962 25 Sheets-Sheet 3

INVENTOR.
GEORGE H. DURR
BY Kenway, Jenney & Hildreth
ATTORNEYS

Feb. 28, 1967 G. H. DURR 3,307,156
INFORMATION PROCESSING AND DISPLAY SYSTEM
Filed Oct. 1, 1962 25 Sheets-Sheet 4
FIG. 9
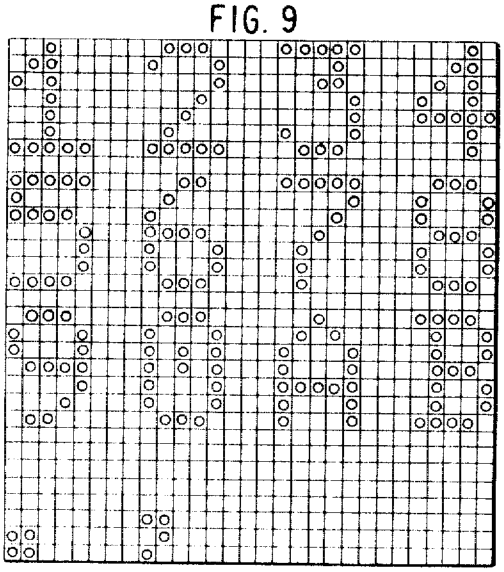
FIG. 10
| | $9_1$ | $9_2$ | $9_3$ | $9_4$ | $9_5$ | $9_6$ | $9_7$ | $9_8$ | $9_9$ |
|---|---|---|---|---|---|---|---|---|---|
| $7_1$ | 0 | 1 | 1 | 0 | 0 | 0 | 1 | 0 | 0 |
| $7_2$ | 0 | 0 | 0 | 0 | 0 | 0 | 0 | 0 | 0 |
| $7_3$ | 0 | 1 | 1 | 1 | 1 | 0 | 0 | 0 | 0 |
| $7_4$ | 1 | 0 | 0 | 1 | 0 | 1 | 0 | 0 | 0 |
| $7_5$ | 1 | 0 | 0 | 1 | 0 | 0 | 1 | 0 | 0 |
| $7_6$ | 1 | 0 | 0 | 1 | 0 | 0 | 1 | 0 | 0 |
| $7_7$ | 0 | 1 | 1 | 0 | 0 | 0 | 0 | 0 | 0 |
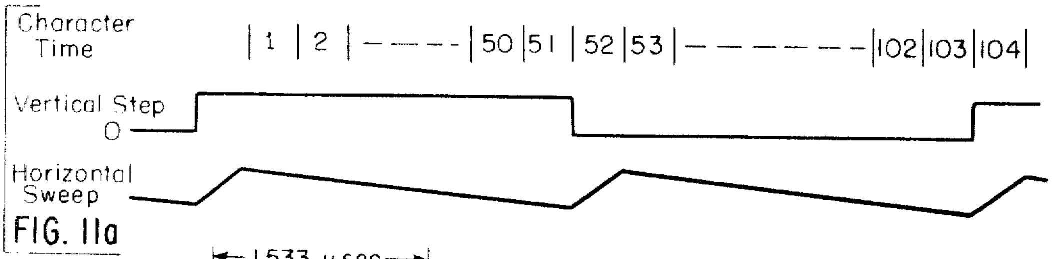
FIG. 11a
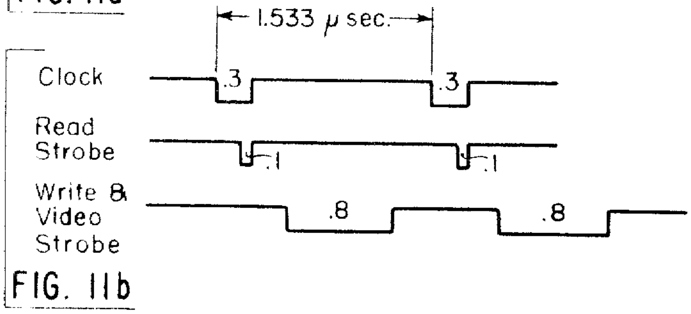
FIG. 11b
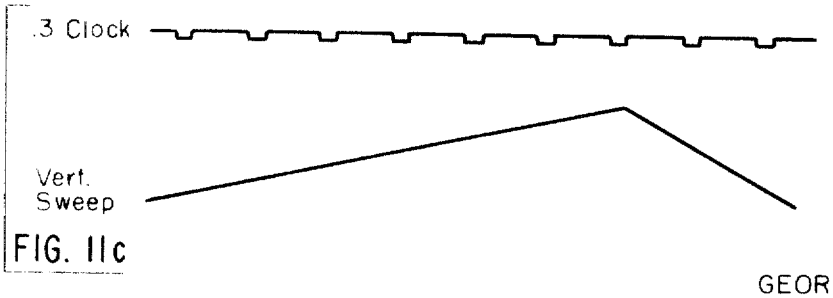
FIG. 11c
INVENTOR.
GEORGE H. DURR
BY
Kenway, Jenney & Hildreth
ATTORNEYS Feb. 28, 1967 G. H. DURR 3,307,156

INFORMATION PROCESSING AND DISPLAY SYSTEM

Filed Oct. 4, 1962 25 Sheets-Sheet 5

INVENTOR.
GEORGE H. DURR
BY Kenway & Jenney & Hildreth
ATTORNEYS

INVENTOR.
GEORGE H. DURR
BY Kenway, Jenney & Hildreth
ATTORNEYS

INVENTOR.
GEORGE H. DURR
BY *Kenway, Jenney & Hildreth*
ATTORNEYS

INFORMATION PROCESSING AND DISPLAY SYSTEM

Filed Oct. 4, 1962 25 Sheets-Sheet 8

INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

Feb. 28, 1967 G. H. DURR 3,307,156

INFORMATION PROCESSING AND DISPLAY SYSTEM

Filed Oct. 4, 1962 25 Sheets-Sheet 10

INVENTOR

GEORGE H. DURR

BY

Kenway, Jenney & Hildreth

ATTORNEYS

INVENTOR.
GEORGE H. DURR
BY
Lindsay, Jenney & Hildreth
ATTORNEYS

INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

INVENTOR
GEORGE H. DURR
BY Kenway, Jenney & Hildreth
ATTORNEYS

INVENTOR.
GEORGE H. DURR
BY Kenway, Jenney & Hildreth
ATTORNEYS

INVENTOR.
GEORGE H. DURR
BY
Kenway, Jenney & Hildreth
ATTORNEYS

INVENTOR
GEORGE H. DURR
BY Kenway, Jenney & Hildreth
ATTORNEYS

INVENTOR
GEORGE H. DURR
BY Kenway, Jenney & Hildreth
ATTORNEYS

INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

INVENTOR.
GEORGE H. DURR
BY
Kenway, Jenney & Hildreth
ATTORNEYS

Feb. 28, 1967 G. H. DURR 3,307,156

INFORMATION PROCESSING AND DISPLAY SYSTEM

Filed Oct. 4, 1962 25 Sheets-Sheet 25

INVENTOR
GEORGE H. DURR
BY
Kenway, Jenney & Hildreth
ATTORNEYS

United States Patent Office 3,307,156
Patented Feb. 28, 1967

3,307,156
INFORMATION PROCESSING AND DISPLAY SYSTEM

George H. Durr, Marblehead, Mass., assignor, by mesne assignments, to Stromberg-Carlson Corporation, Rochester, N.Y., a corporation of Delaware Filed Oct. 4, 1962, Ser. No. 228,416
27 Claims. (Cl. 340—172.5)

My invention relates to information processing and display apparatus, and particularly to an improved system for exchanging information between human operators and information sources such as computers, accounting systems, information processing and retrieval systems, and the like. Computers of great accuracy and flexibility, and information storage systems of vast capacity, are now commonly available. At first, the capacity of apparatus of this type was limited by its reliability, so that the full capacity of computers and the like could only be utilized during limited periods between shutdowns for maintenance. However, great strides have been made in improving the reliability of complex apparatus and today it is difficult or impossible to supply requests for information rapidly enough to permit the full utilization of the capacity of the machines that are available.

An information source of the class here considered is utilized in response to a request by a human operator to solve a particular problem or to retrieve a particular item of information. Since the rate at which a single operator can utilize information is usually low relative to the rate at which it can be supplied by modern information sources, it is desirable to make it possible for a number of operators to share an information source. It is the object of my invention to facilitate the communication between a number of human operators and a central information source.

A basic problem in the field of man-machine communication is that particular computers or other information sources usually require a particular form and language into which the user must translate his request for information. In view of the great differences between information sources as to alphabet, language, form of data representation, and speed, it has been conventional to provide a special access device for each information source which will perform the translation function. Many of these special access devices require considerable skill and knowledge to program and operate. A second object of my invention is to make possible the use of a single data entry system for interrogating any information source, without the necessity for the operator to understand the language and programming techniques of various information sources that he may wish to utilize.

The data processing and display system of my invention is characterized by the provision of a plurality of consoles for the use of human operators. Each of these consoles is provided with simple programming controls for use by the operator in obtaining possession of the system to enter a request, means for entering data in a desired numeric, alphanumeric or other alphabet, and means for displaying information presented to and received from the system visually in the alphabet used for information entry, or in a larger or different alphabet if desired. The programming controls may typically comprise labeled keys or switches for clearing the system and transmitting information, and an electric lamp or other indicator for signalling to the operator that the system is at his disposal. The data entry means may conveniently comprise another set of keys, labeled in a selected alphabet, and, where convenient or desirable, including keys labeled to indicate a particular type of request or a requested program. The display device may be a cathode ray tube mounted in the console with its screen located above the keyboard on the console and visible to the operator. In accordance with my invention, a message entered at the keyboard is displayed on this tube for visual checking before transmission, and a message received from the information source is displayed on the same tube.

Storage means are provided for storing data for each console until it is transmitted, or, in the case of a received message, until the operator no longer requires its display. Information in this storage means is channeled to a symbol generator, which provides video signals for the cathode ray tube. At the proper time, information in the storage means is sent, a character at a time, to a common central buffer system, which sends it a character at a time to the information source. Replies are received by the central buffer system a character at a time, and are relayed to the storage means for the console in the same manner.

In accordance with one specific embodiment of my invention, the storage means may comprise a delay line associated with each console unit into which data from the keyboard is entered a character at a time, or into which data from the central buffer may be entered a character at a time. Space is provided in the delay line following each character for the storage of video signals for the cathode ray tube which will display the associated character on the face of the tube. Alternatively, the characters may be supplied to a printer. A common symbol generator is provided, which is sequentially connected to each of a selected plurality of console units. As a character emerges from the delay line of any console unit which has the symbol generator in its possession, the character is transmitted to the symbol generator, which returns the necessary video signals to the delay line and places them in sequence after the character code.

In accordance with a second embodiment of my invention, which is especially adapted for use with relatively large alphabets containing many individual symbols or for use with long messages, I provide a delay line or storage for each console unit which has a delay selected to cause characters to be entered into it in an interlaced manner. In this way, as will appear, the entire delay line may be filled with character codes and yet permit each character to be properly displayed. For this purpose, the characters, represented by suitable code sequences, are interlaced in such a manner that sufficient time is made available for the display of the proper video signal on the cathode ray tube following the emergence of each character from the delay line. The video information in this embodiment of my invention is provided by a symbol generator which is assigned to only one console unit. This symbol generator operates in response to the emergence of each character from the delay line to generate the video signal corresponding to the character and to present it to the cathode ray tube. By this arrangement, it is possible to store messages of several hundred characters in length, while maintaining a high rate of display, so that the machine is able to display information as rapidly as the operator can enter it at the keyboard.

An important aspect of my invention resides in the arrangement of the information control gates for the central buffer. As will appear, in accordance with the system of my invention only four lines are required from the central buffer system to any desired data processing or retrieval system. These lines are multiplexed in a novel way such that two of them are used to exchange control data, and the other two are used to exchange information. During the receipt of information from the external processing system, the buffer is controlled in its program at the rate selected by the external information source. Thus, the buffer control system is independent of the type of information source or sources with which it is employed. In order to convert the standardized four line interconnection system of my invention to the particular requirements of a given information source, it is merely necessary to translate the information on the four lines provided by the central buffer into the particular language of the computer desired. This may be readily accomplished in any specific case, without the need for intervention by the operator, as will be illustrated in detail below.

My invention will best be understood by reference to the accompanying drawings, together with the following detailed description, of a preferred embodiment thereof.

Figure 1:
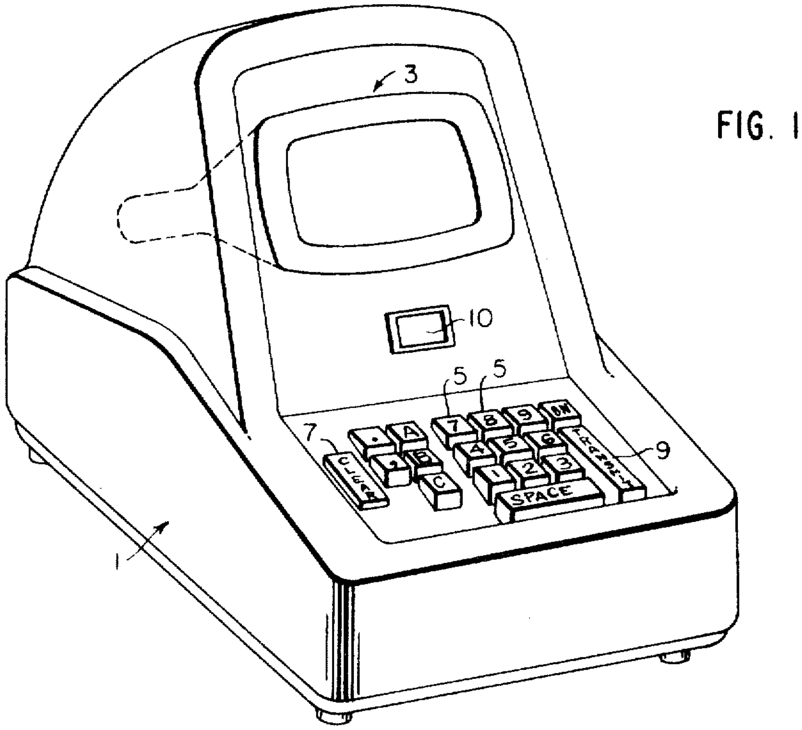
FIG. 1 is a perspective sketch of a typical operator's console comprising a single station in an information processing system in accordance with a preferred embodiment of my invention.
Figure 3:
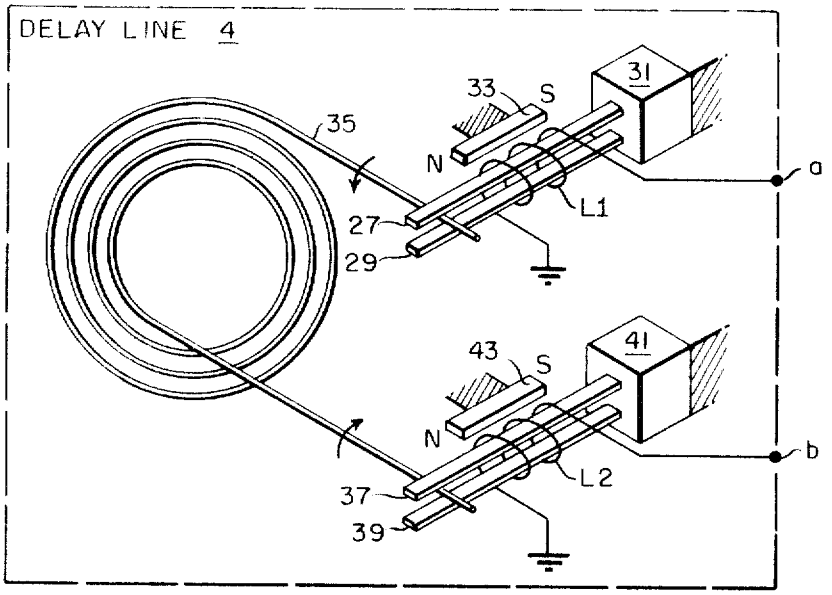
FIG. 3 is a schematic wiring diagram of a delay line suitable for use with the apparatus of my invention.
Figure 4:
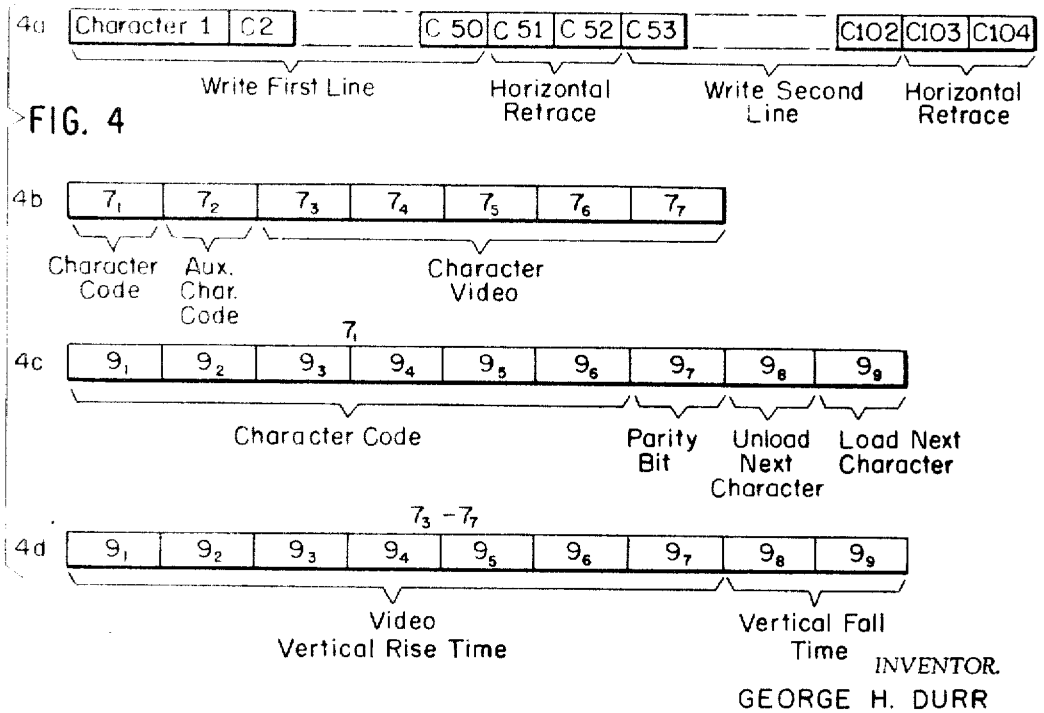
Figure 5:
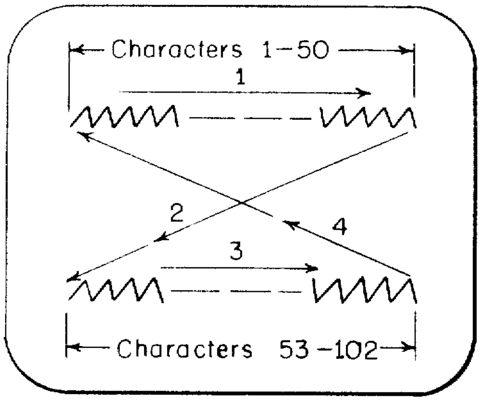
Figure 6:
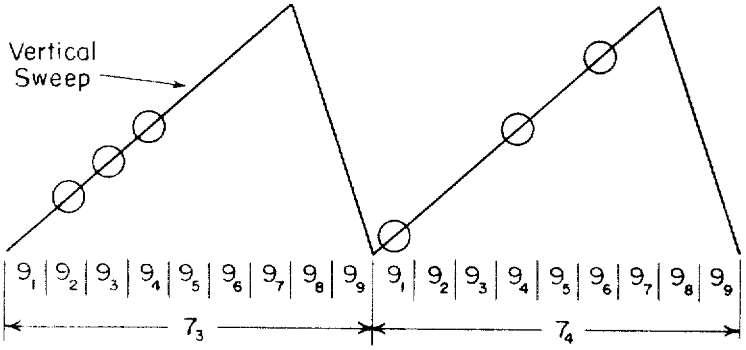
Figure 7:
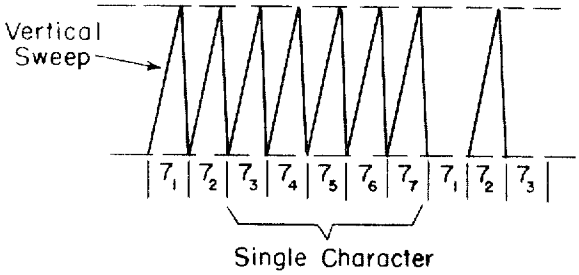
Figure 8:
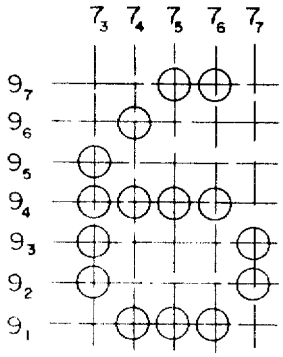
Figure 12:
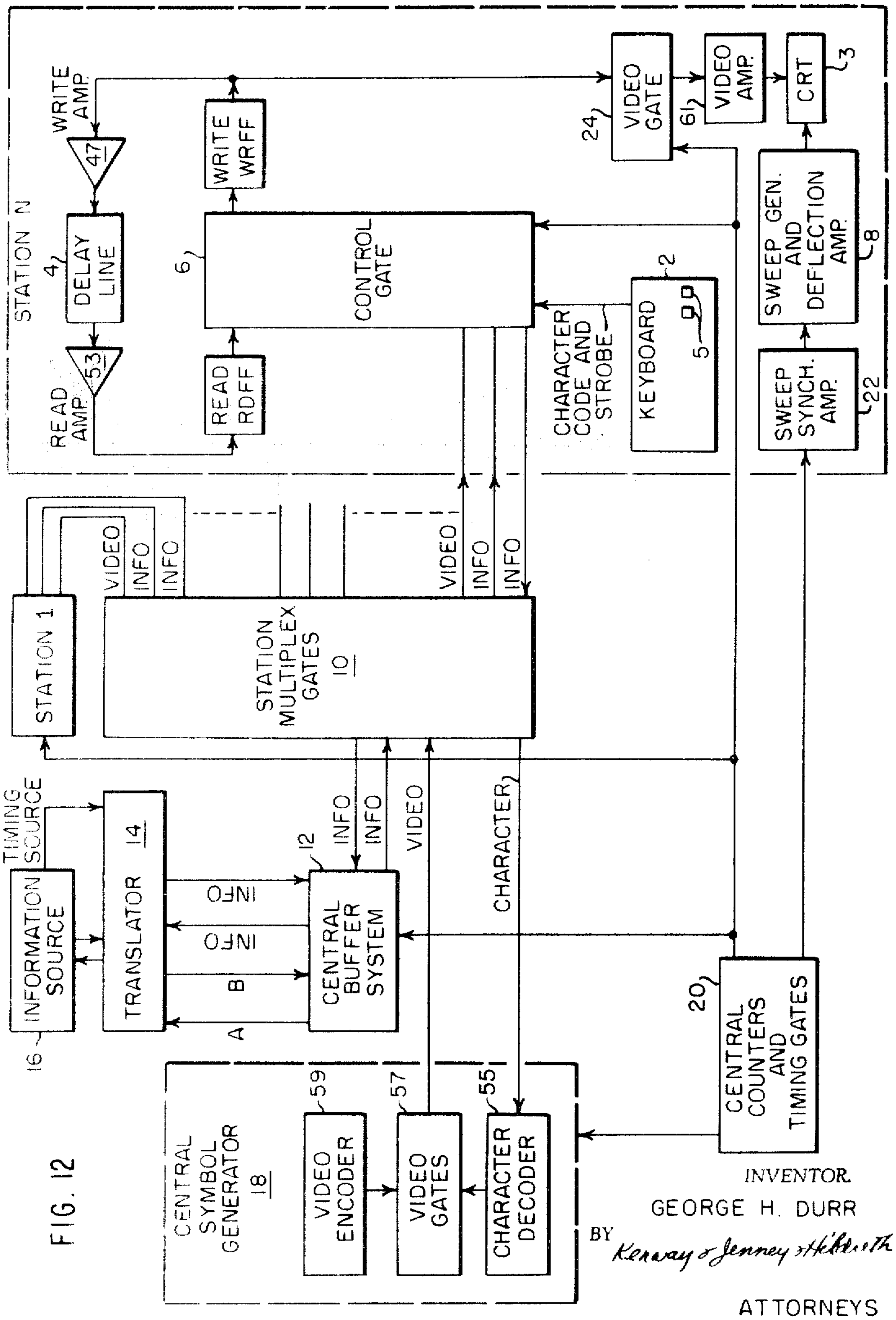
Figure 13:
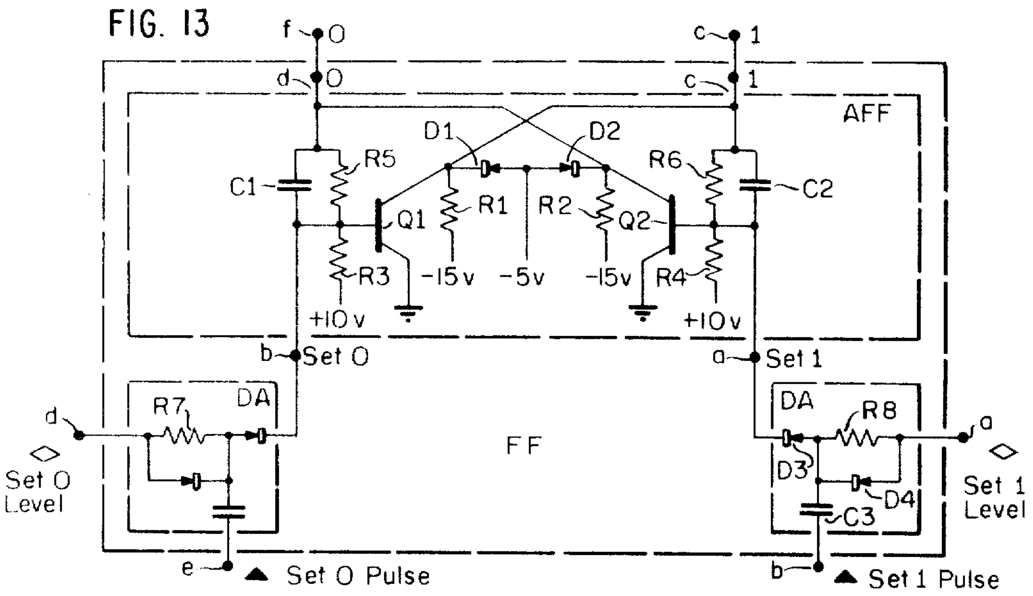
Figure 14:
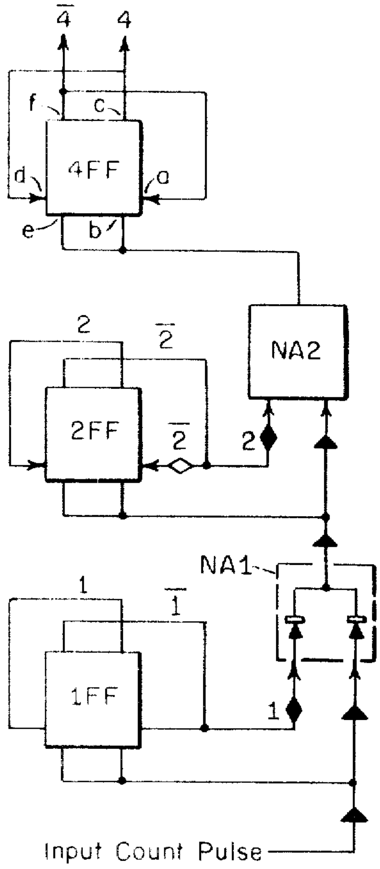
Figure 15:
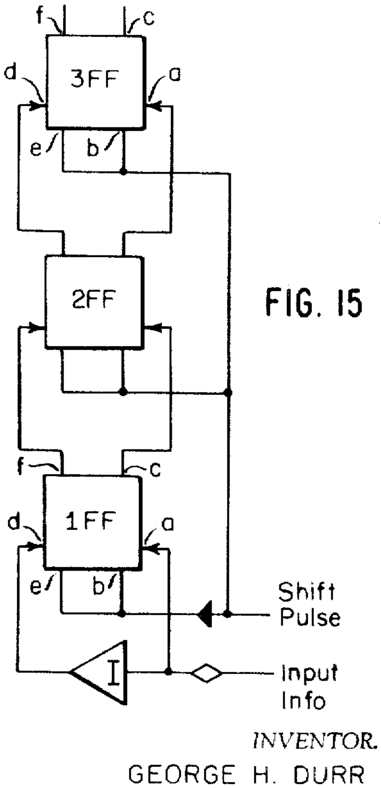
Figure 16A:
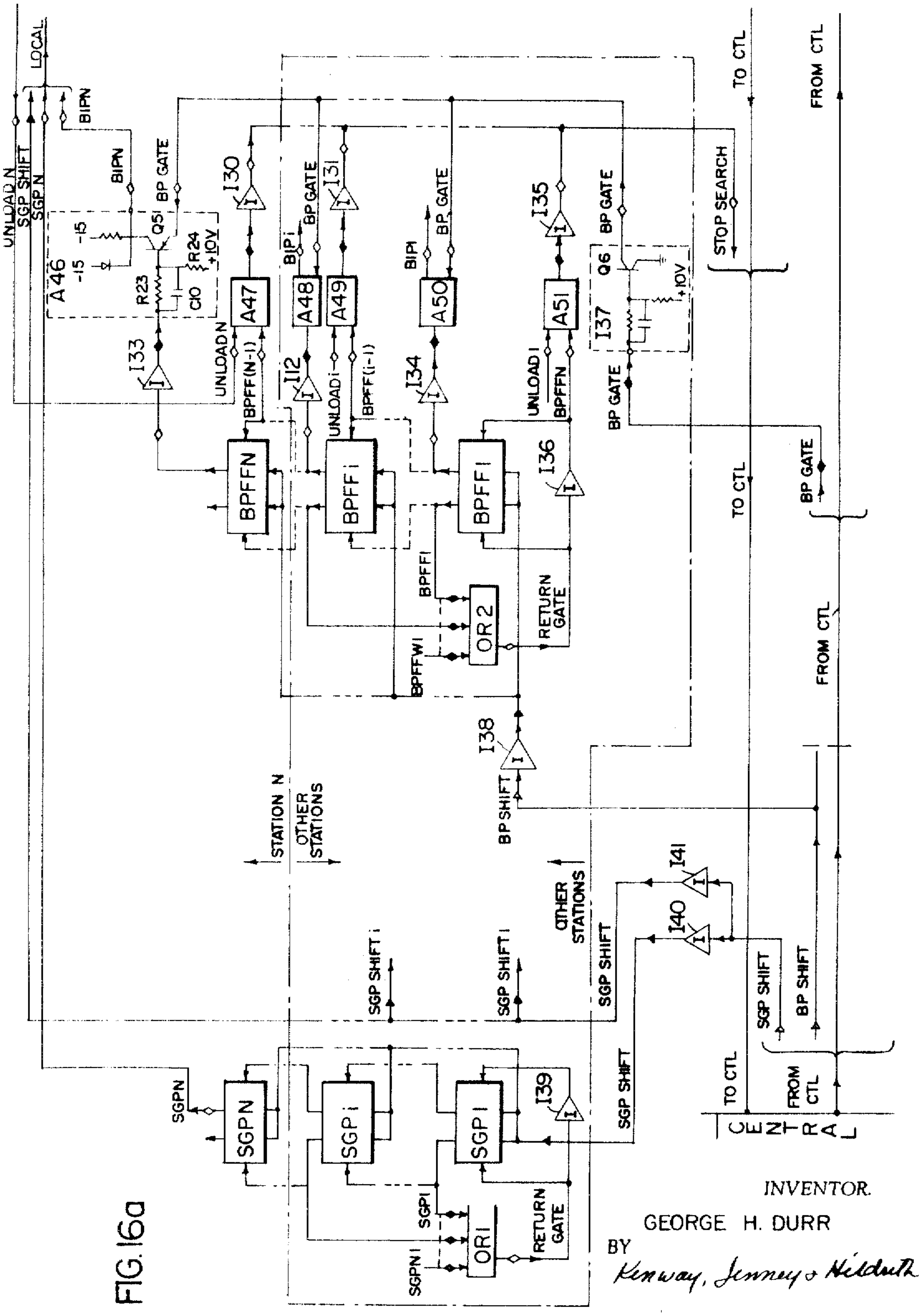
Figure 16B:
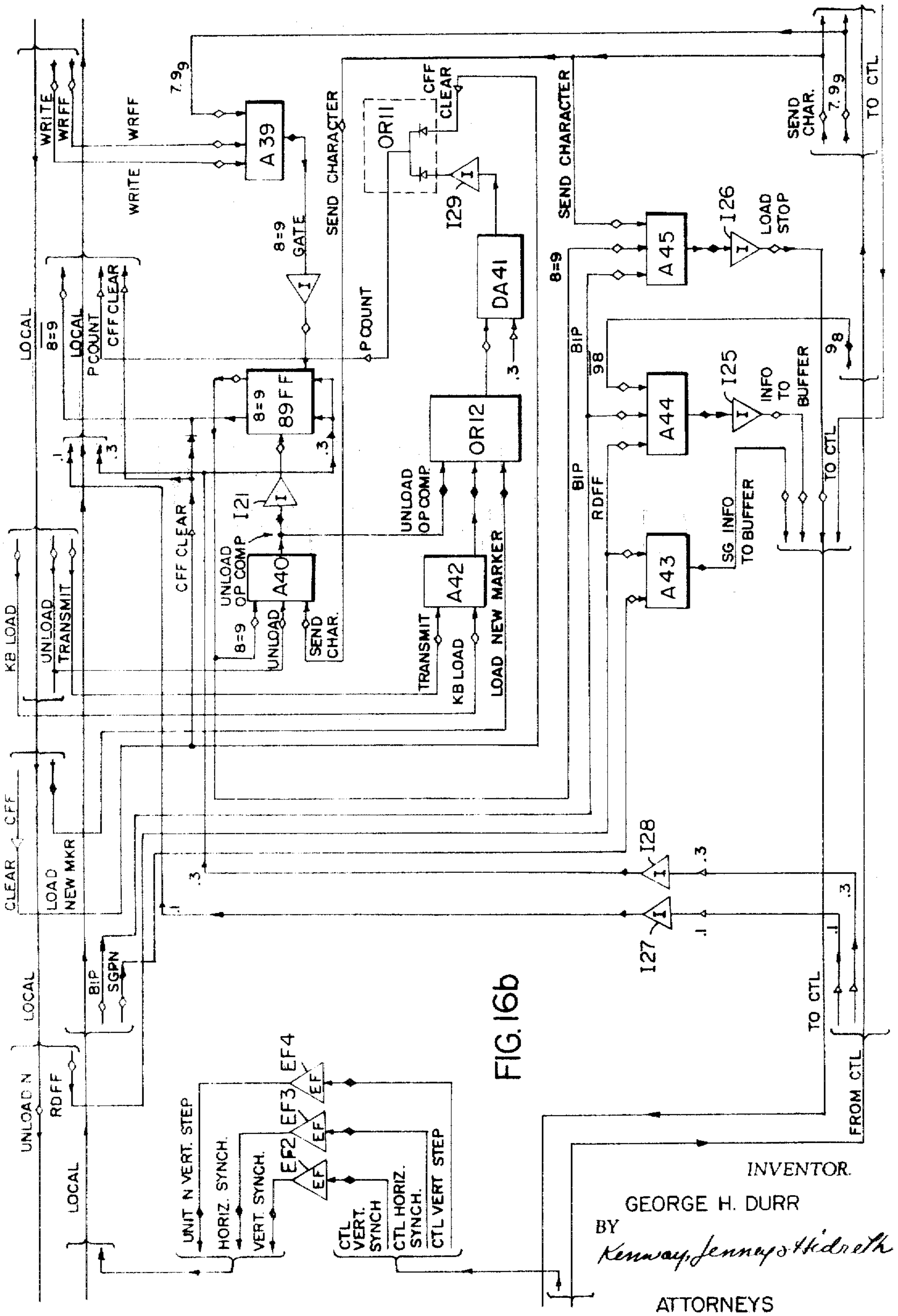
Figure 16C:
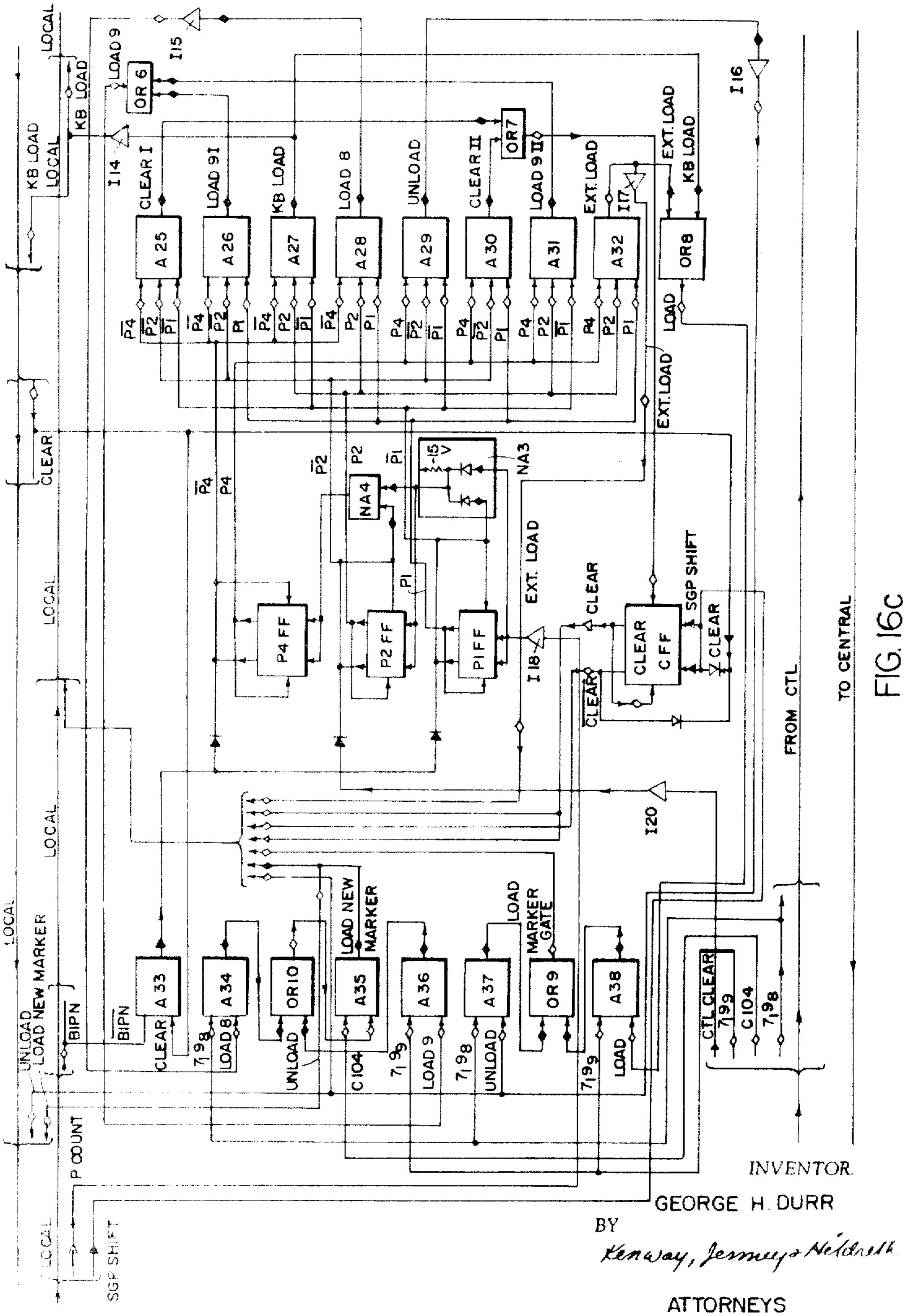
Figure 16D:
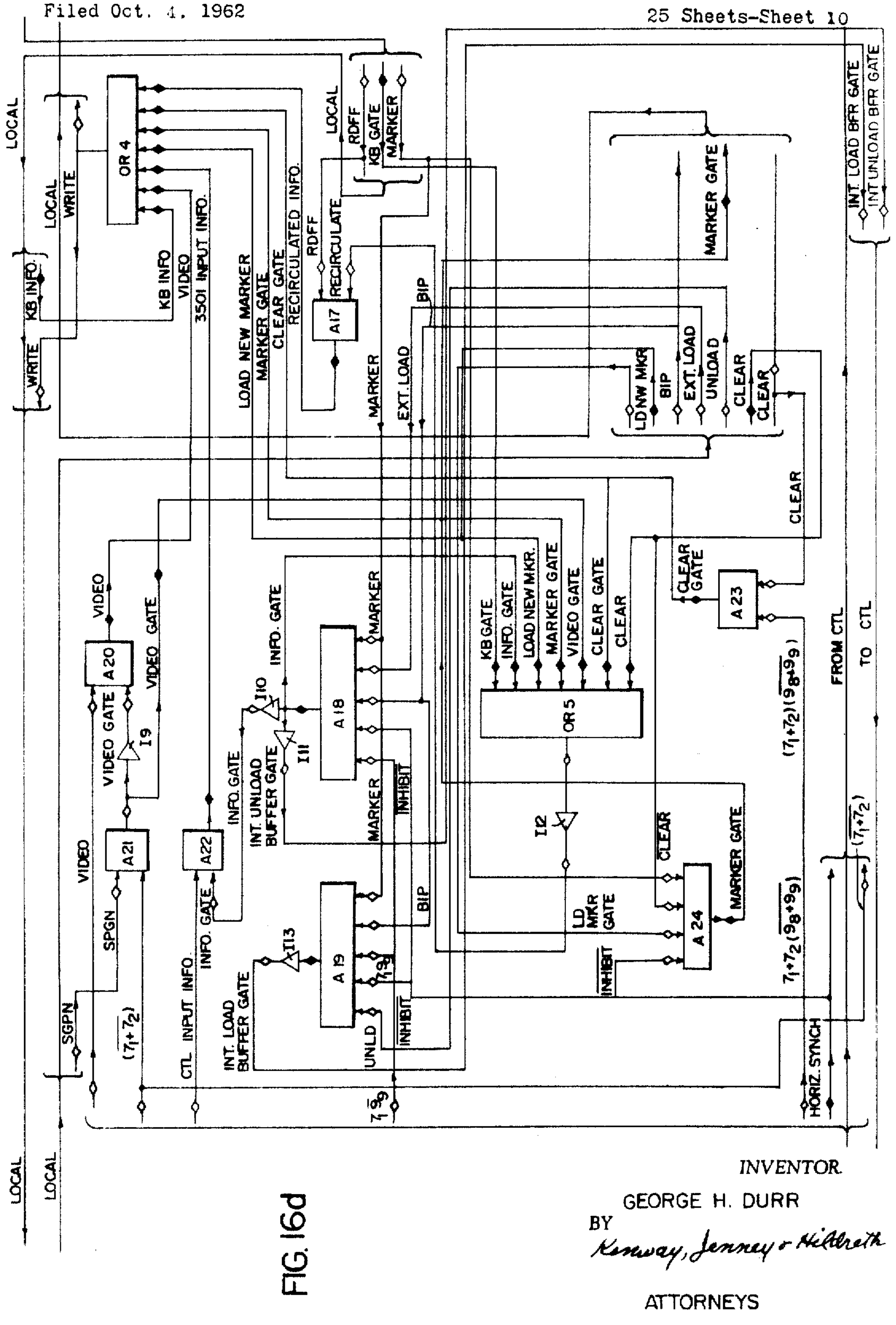
Figure 16E:
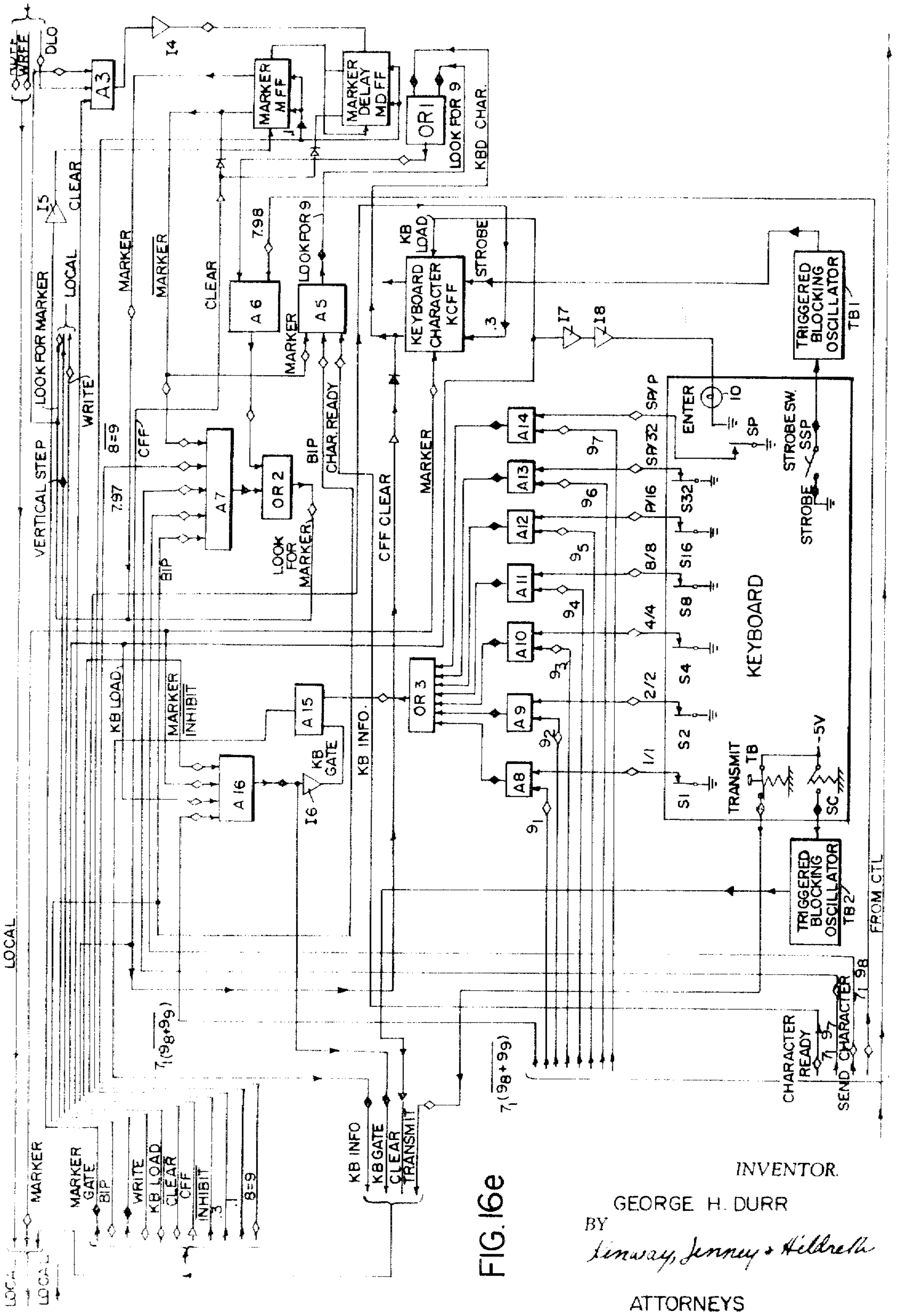
Figure 16F:
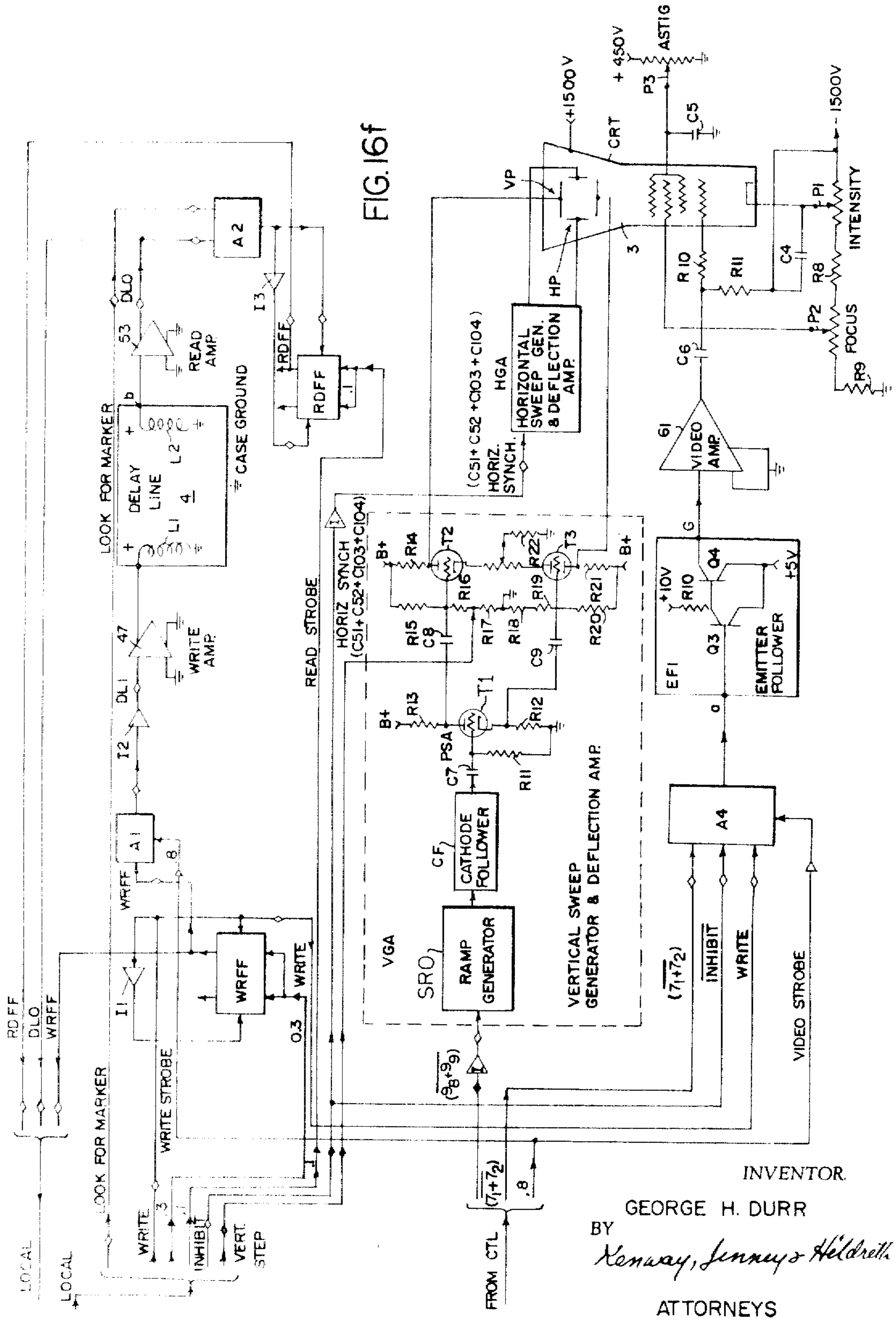
Figure 17A:
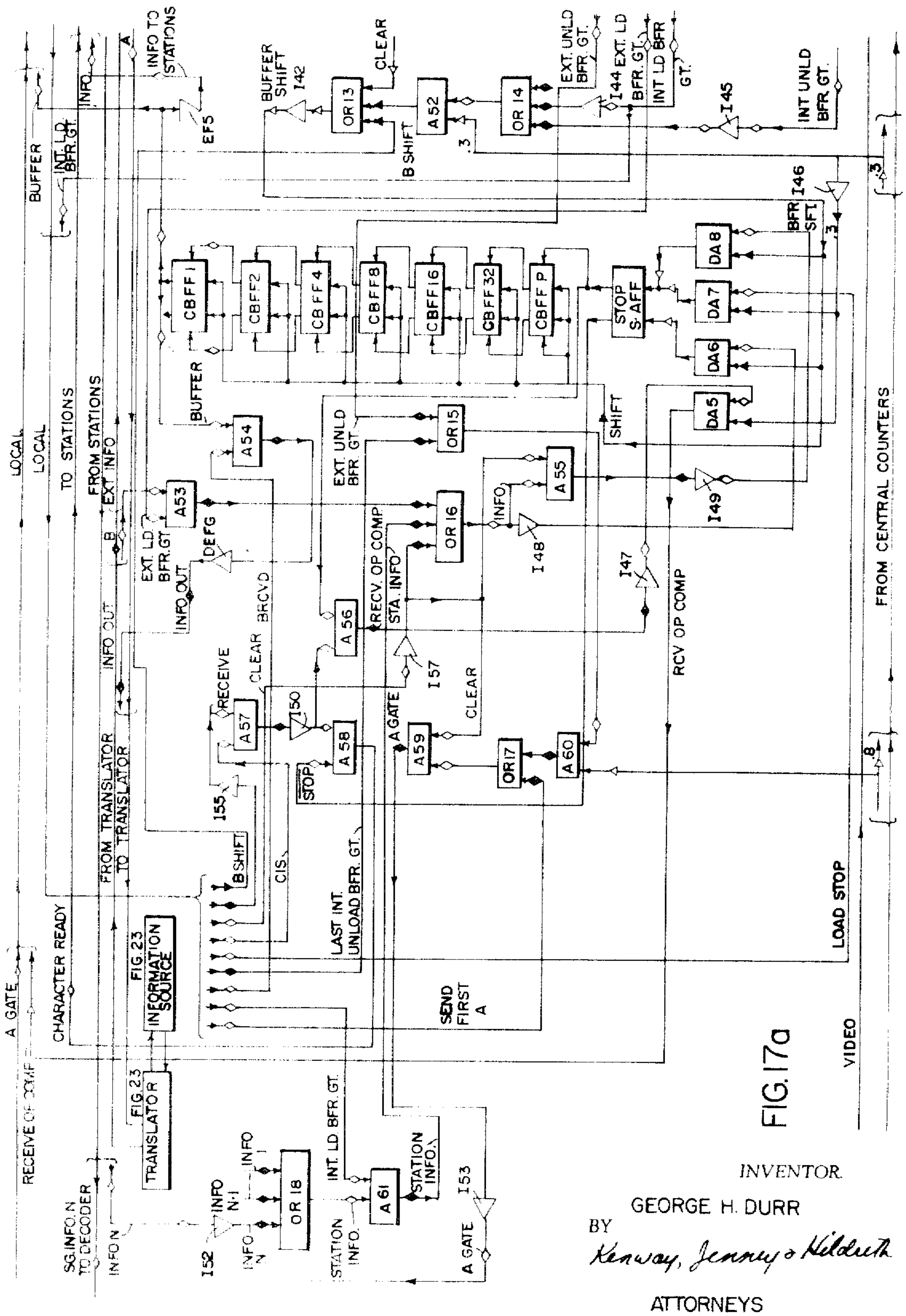
Figure 17B:
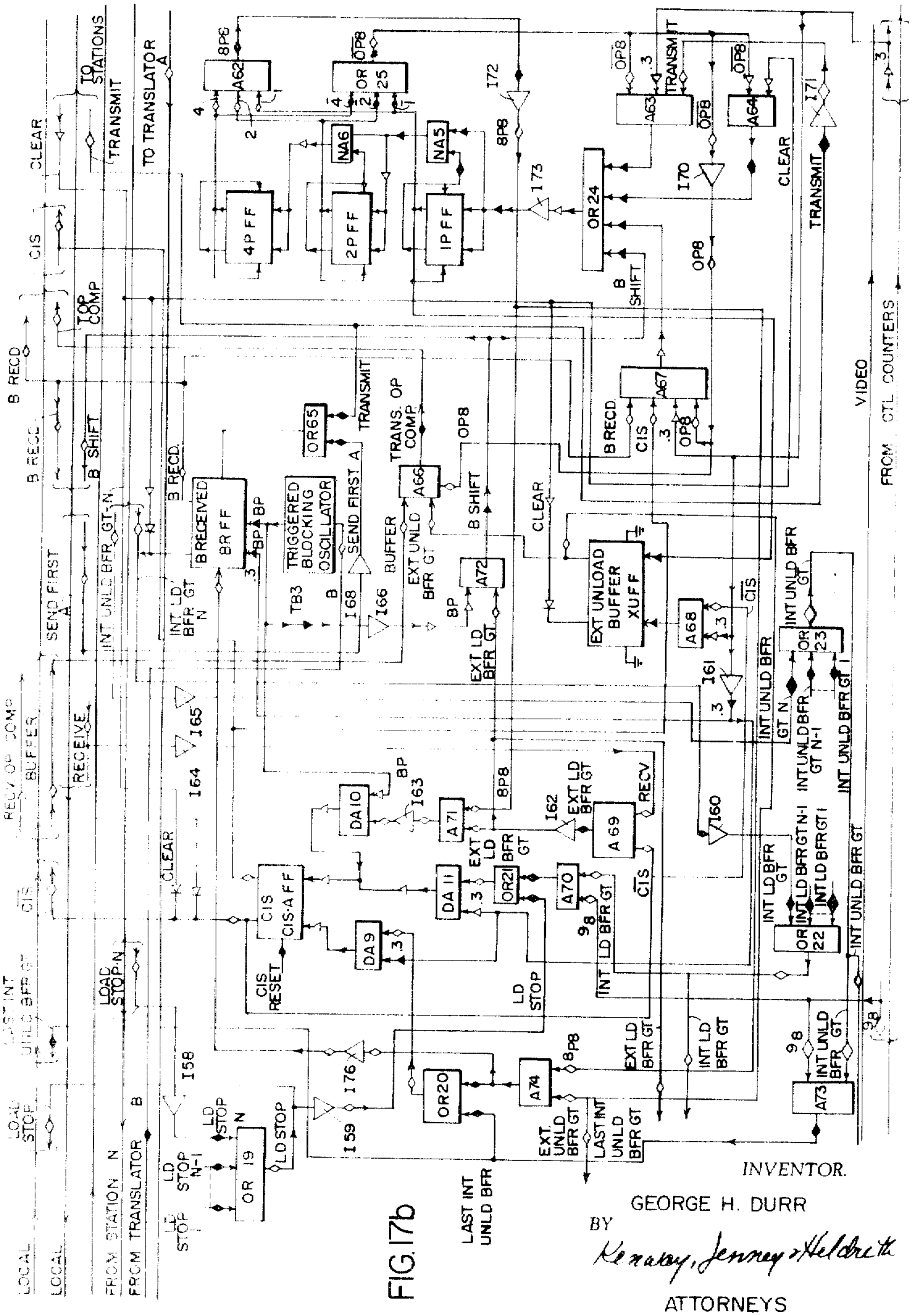
Figure 17C:
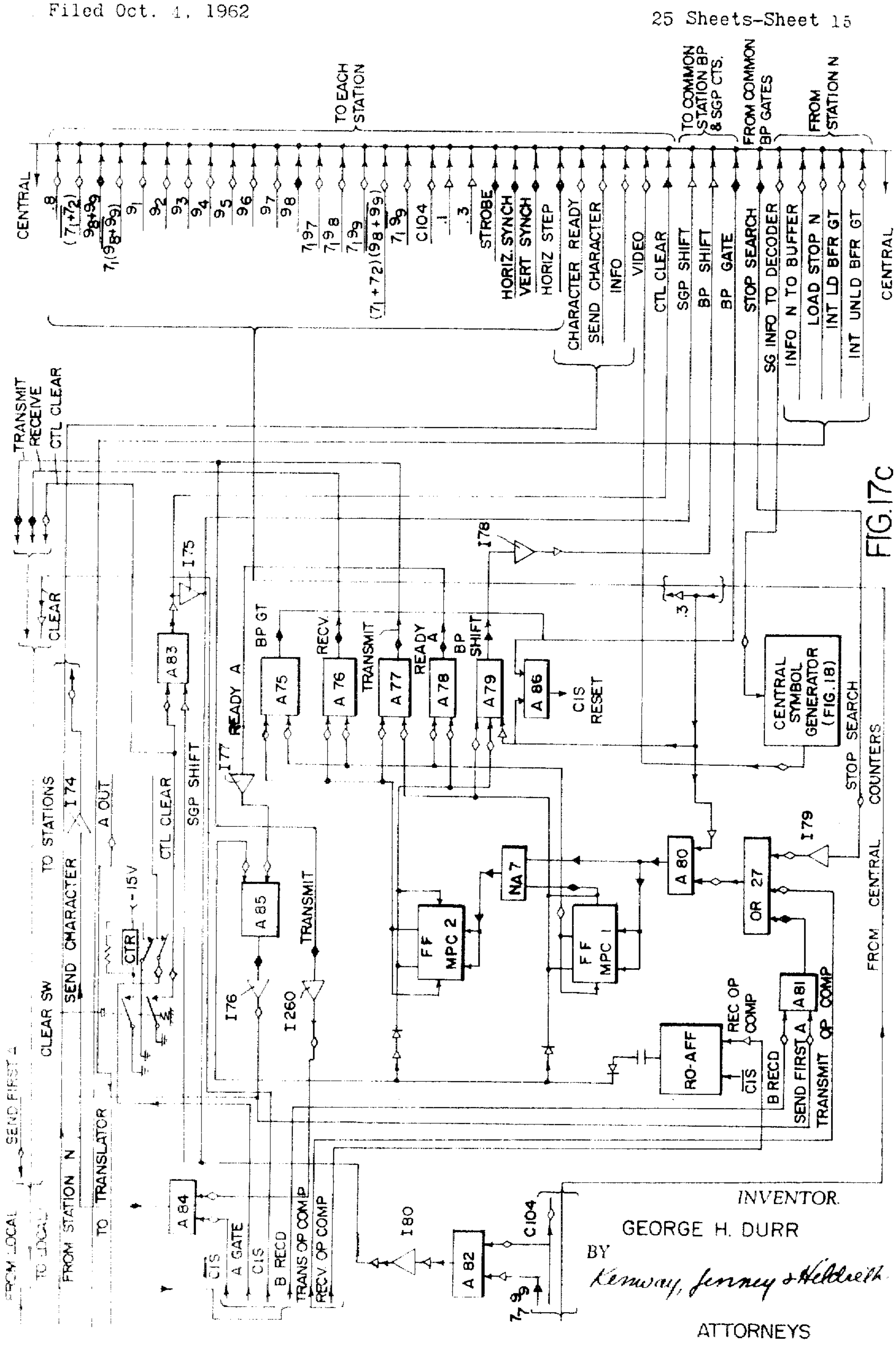
Figure 18:
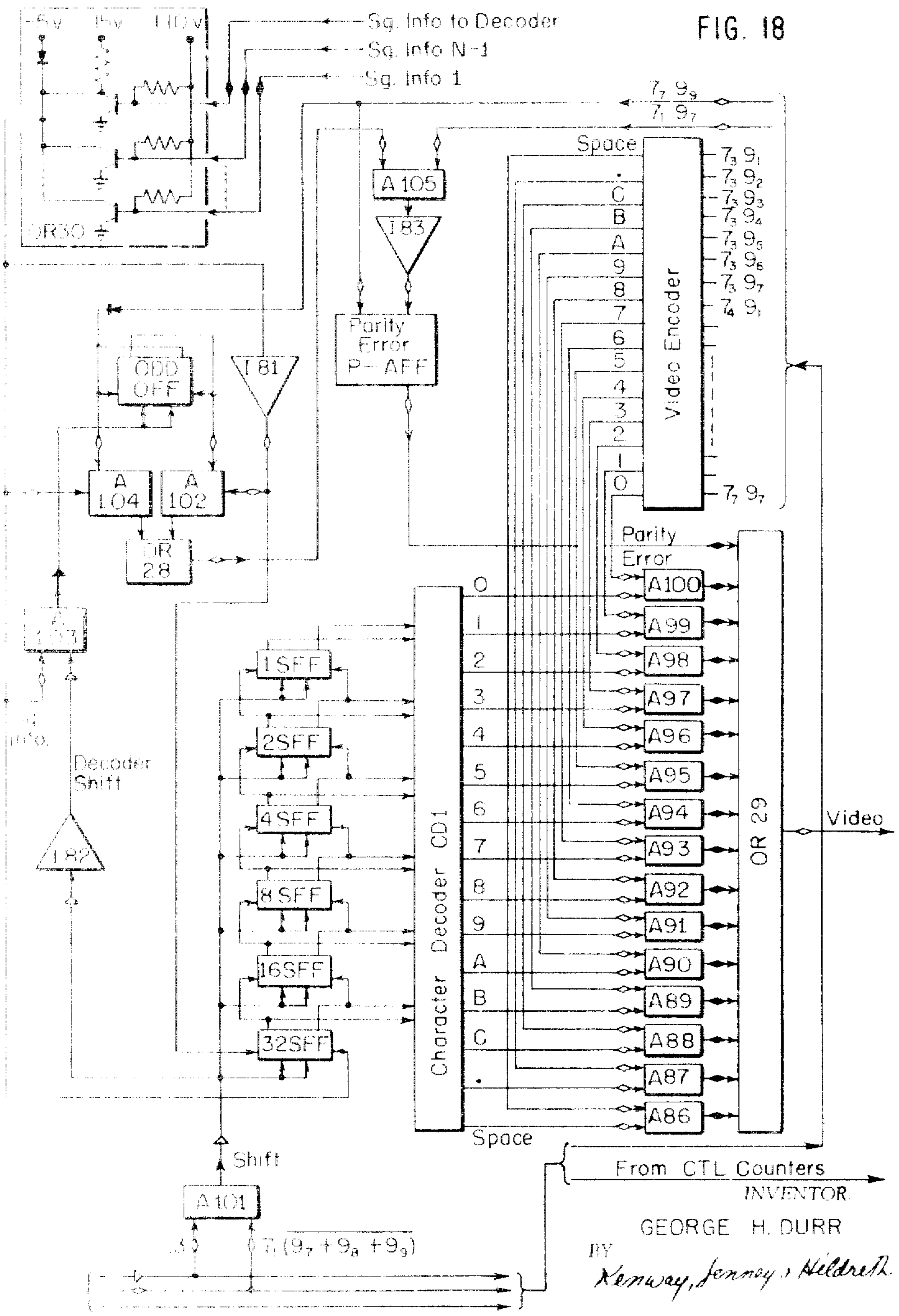
Figure 19:
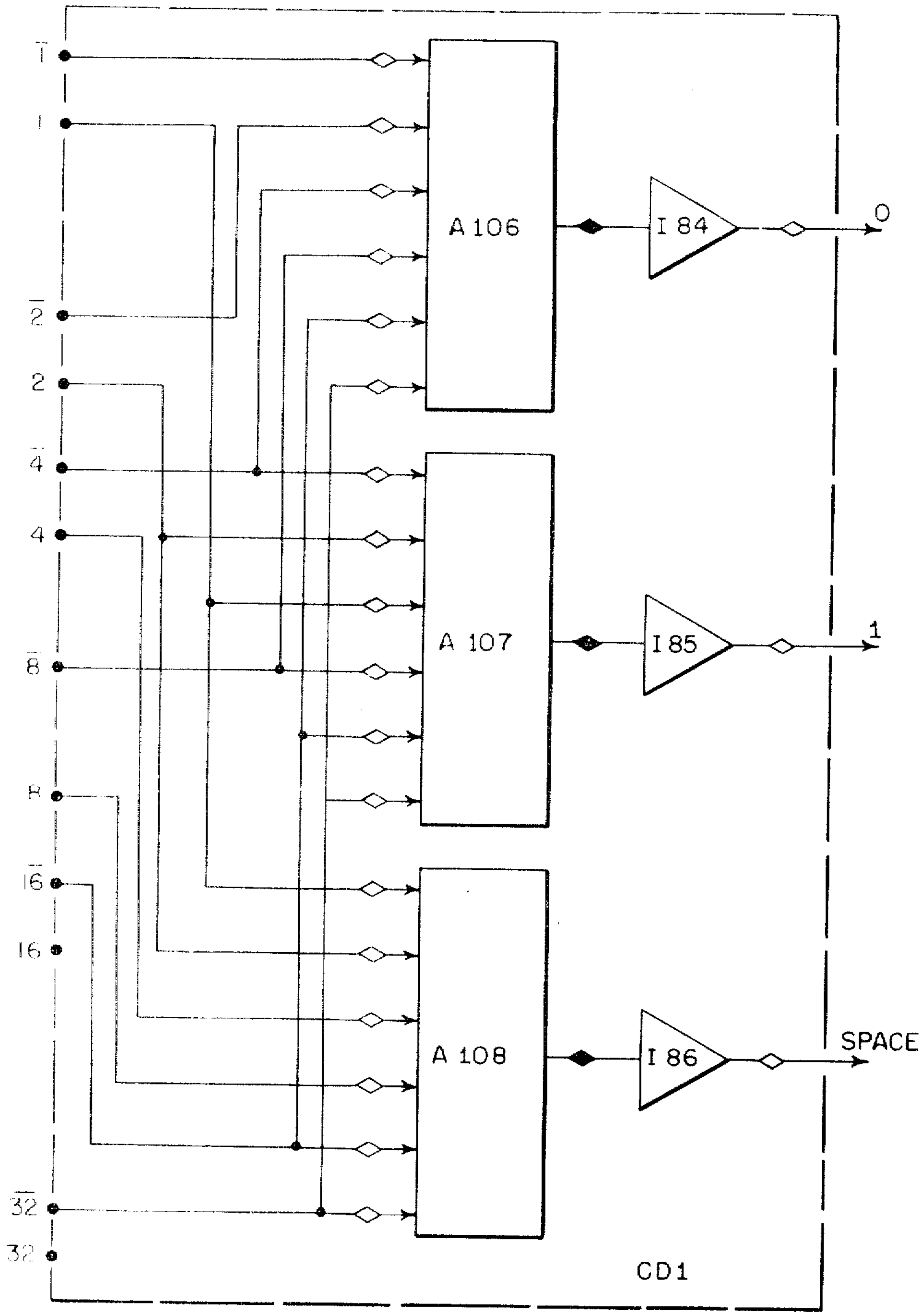
Figure 20:
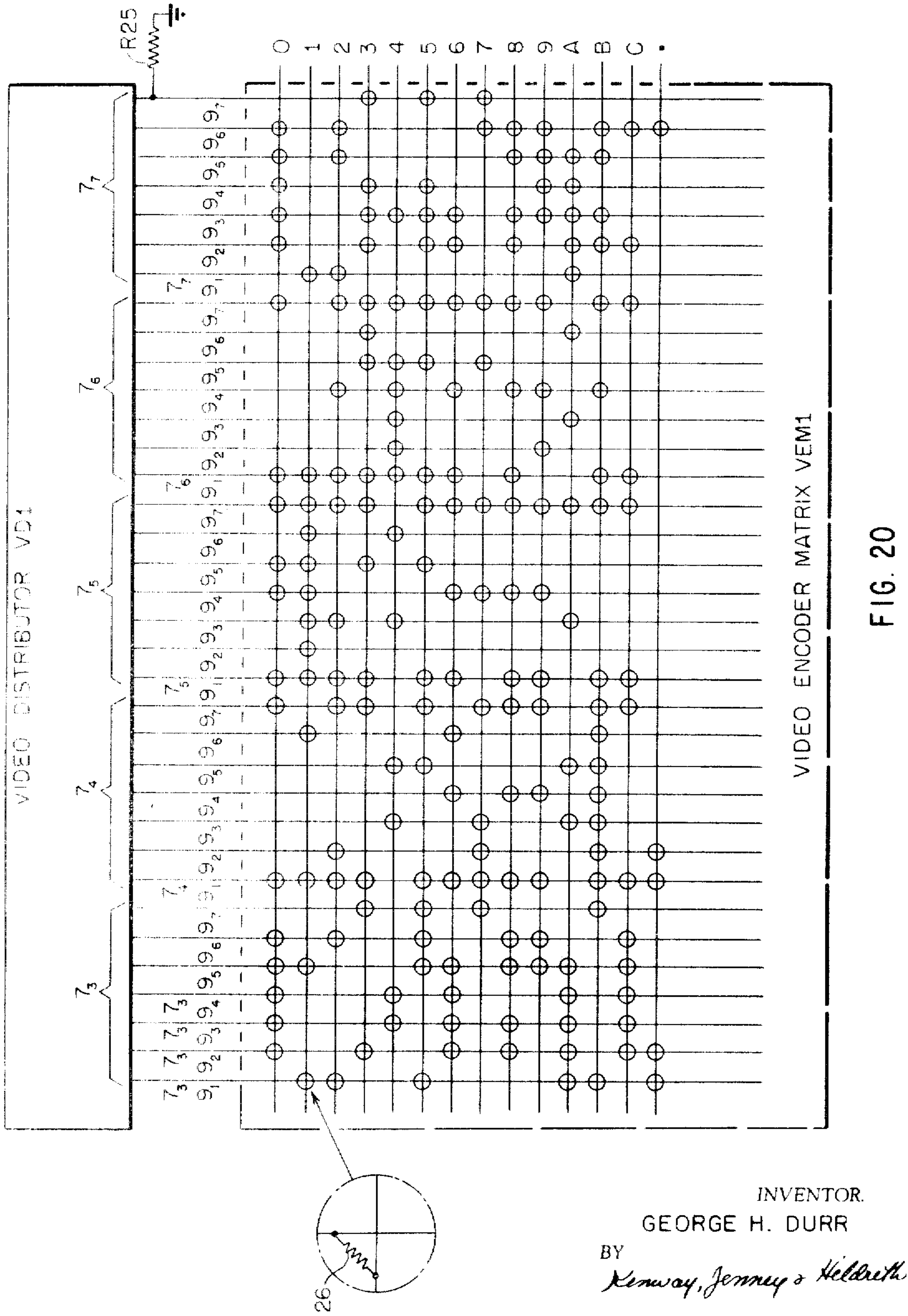
Figure 21:
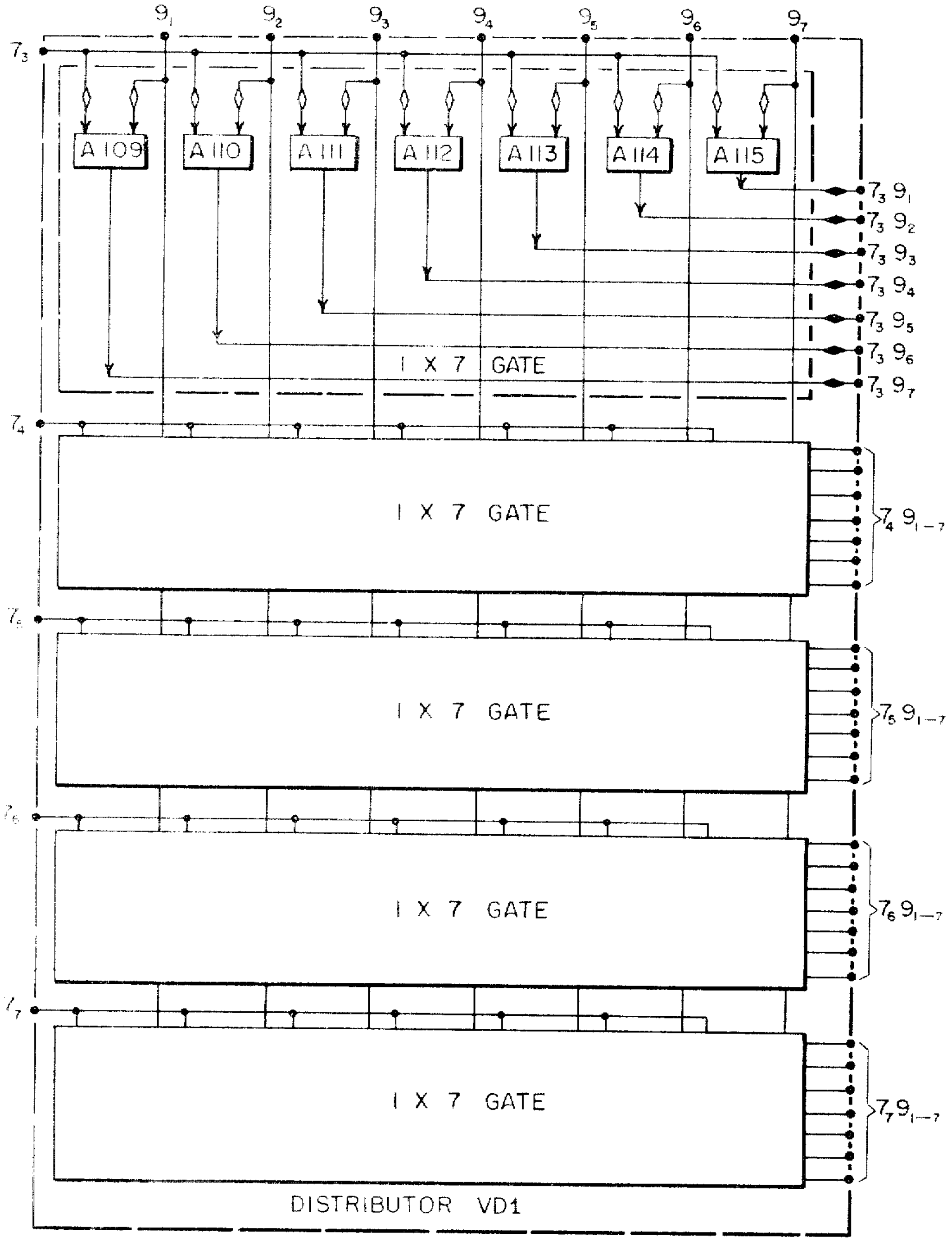
Figure 22A:
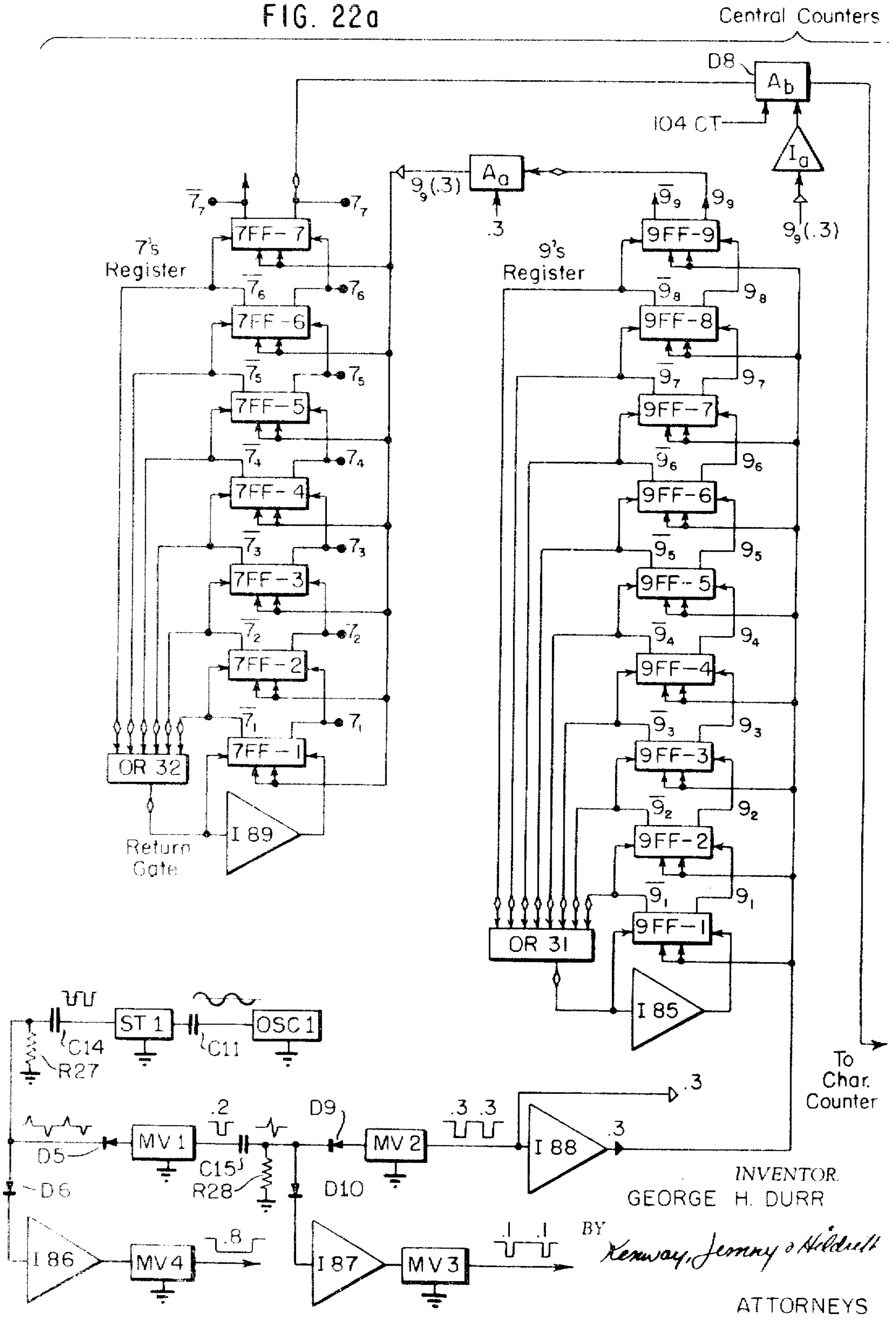
Figure 22B:
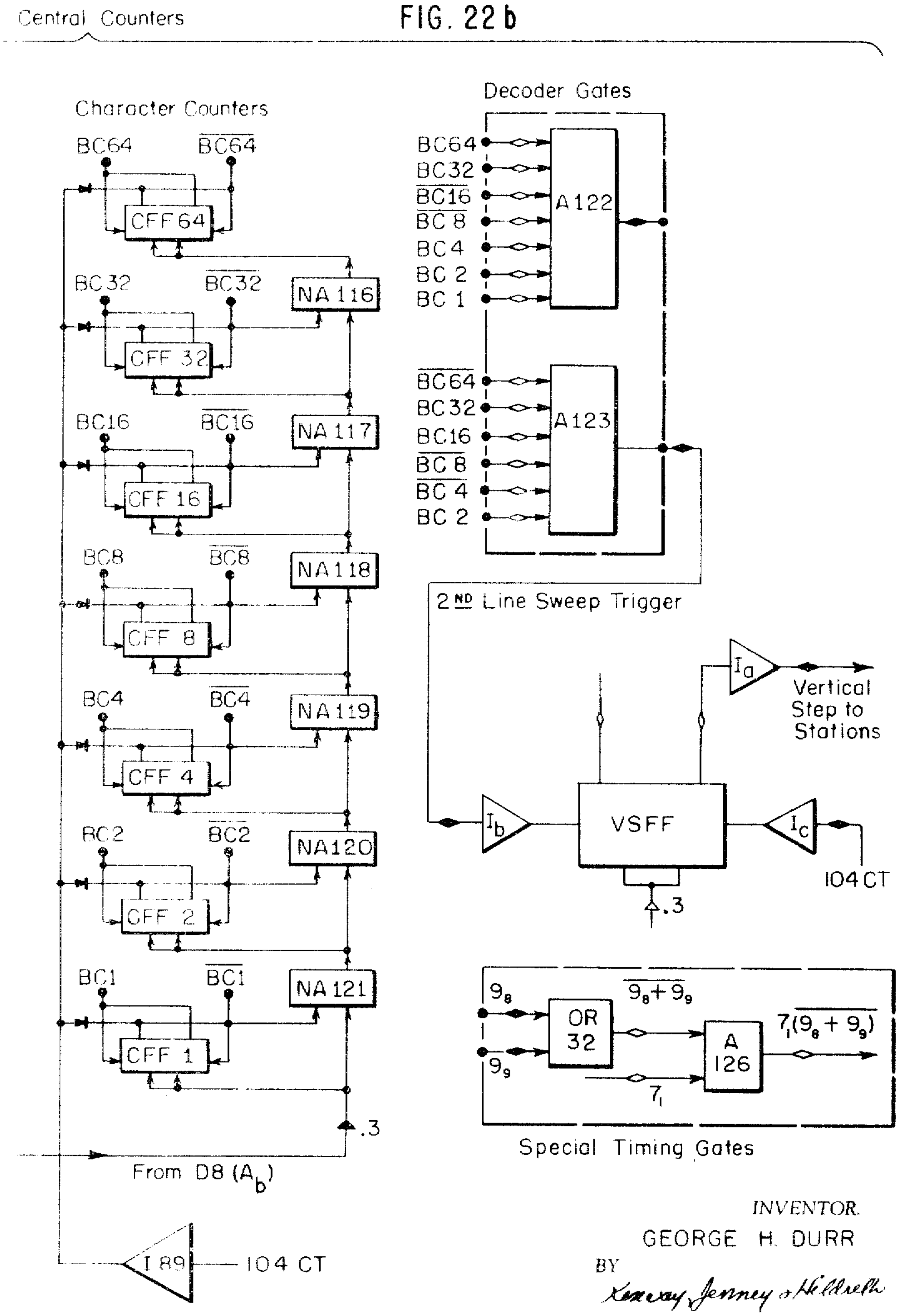
Figure 23A:
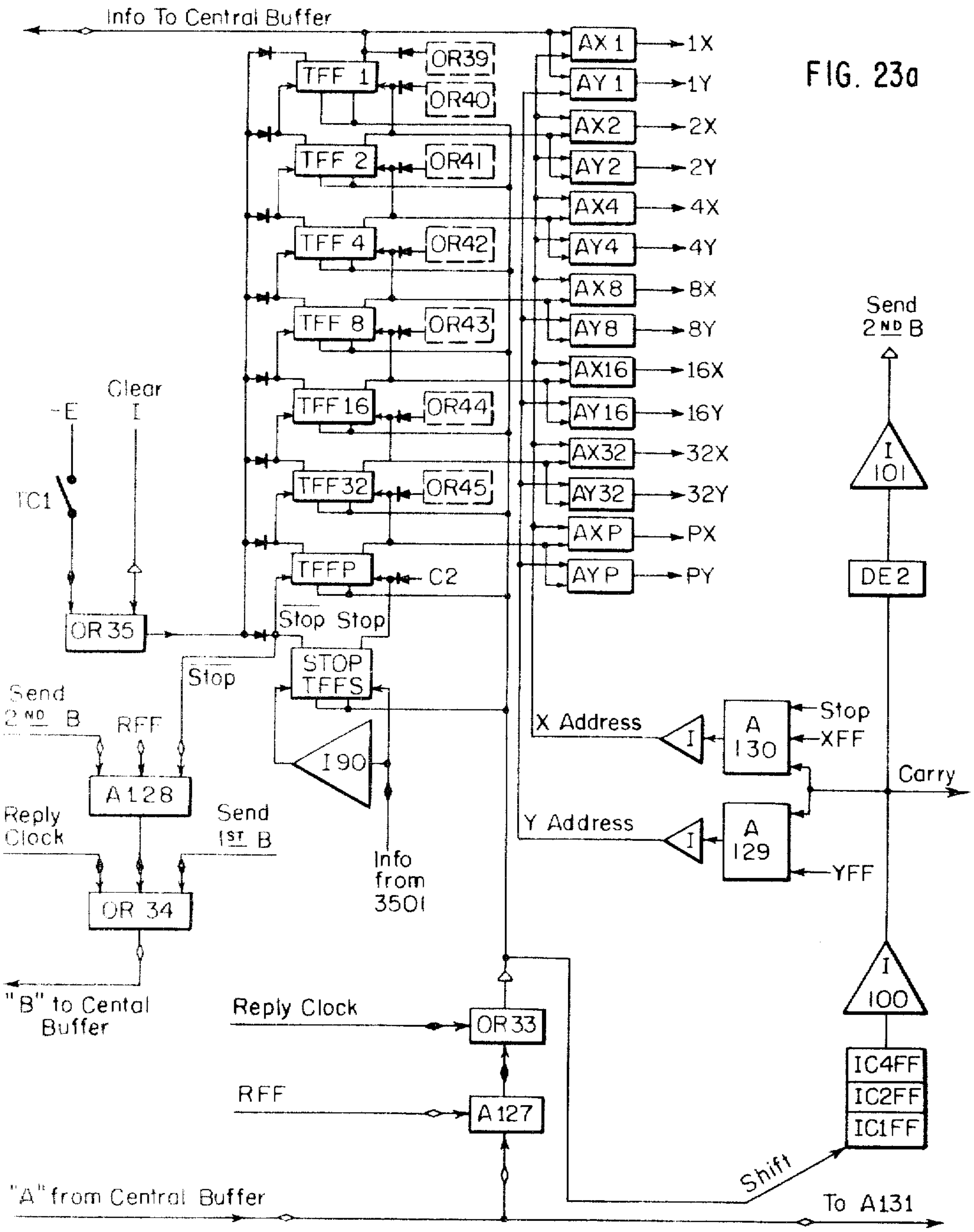
Figure 23B:
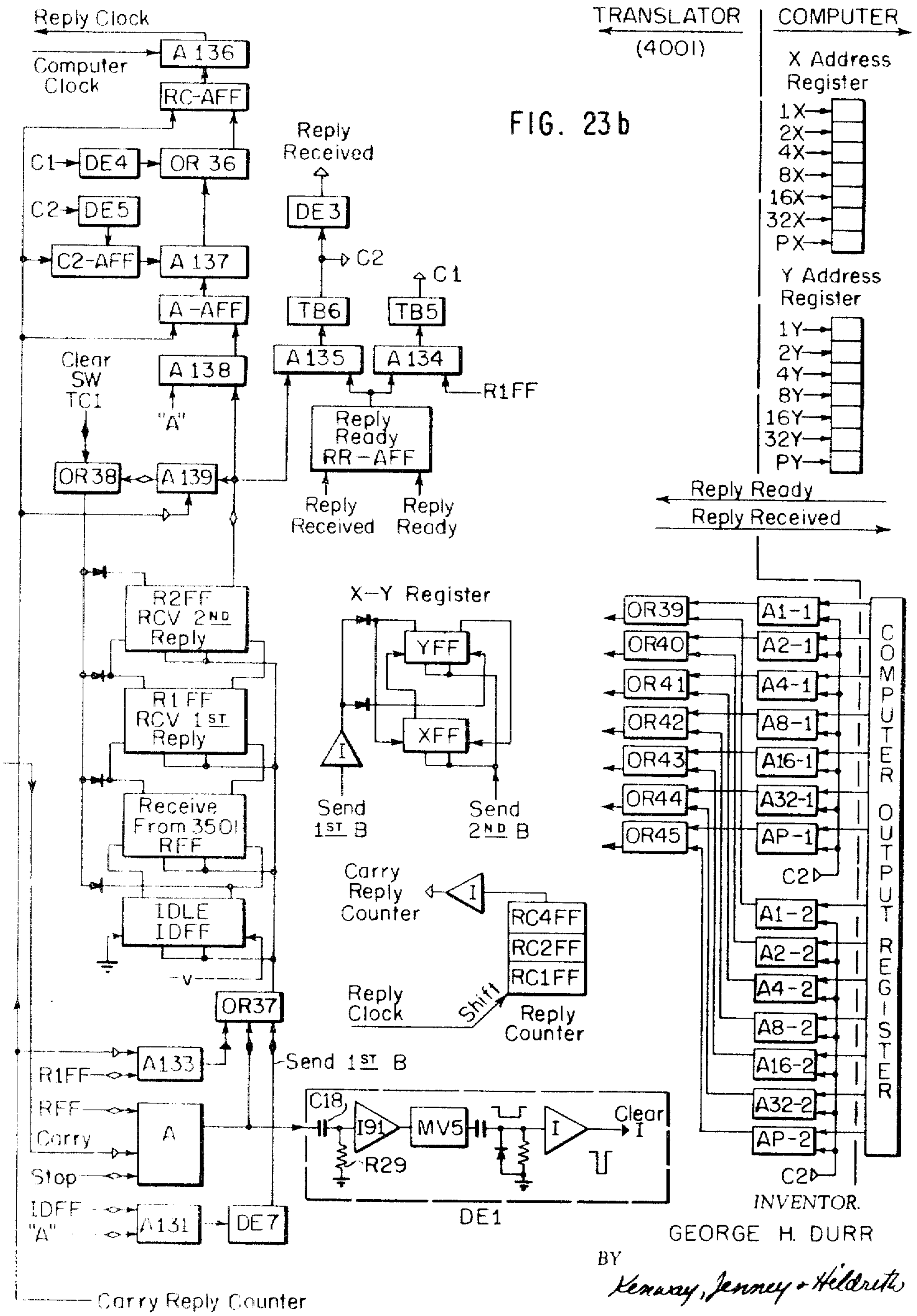
Figure 24:
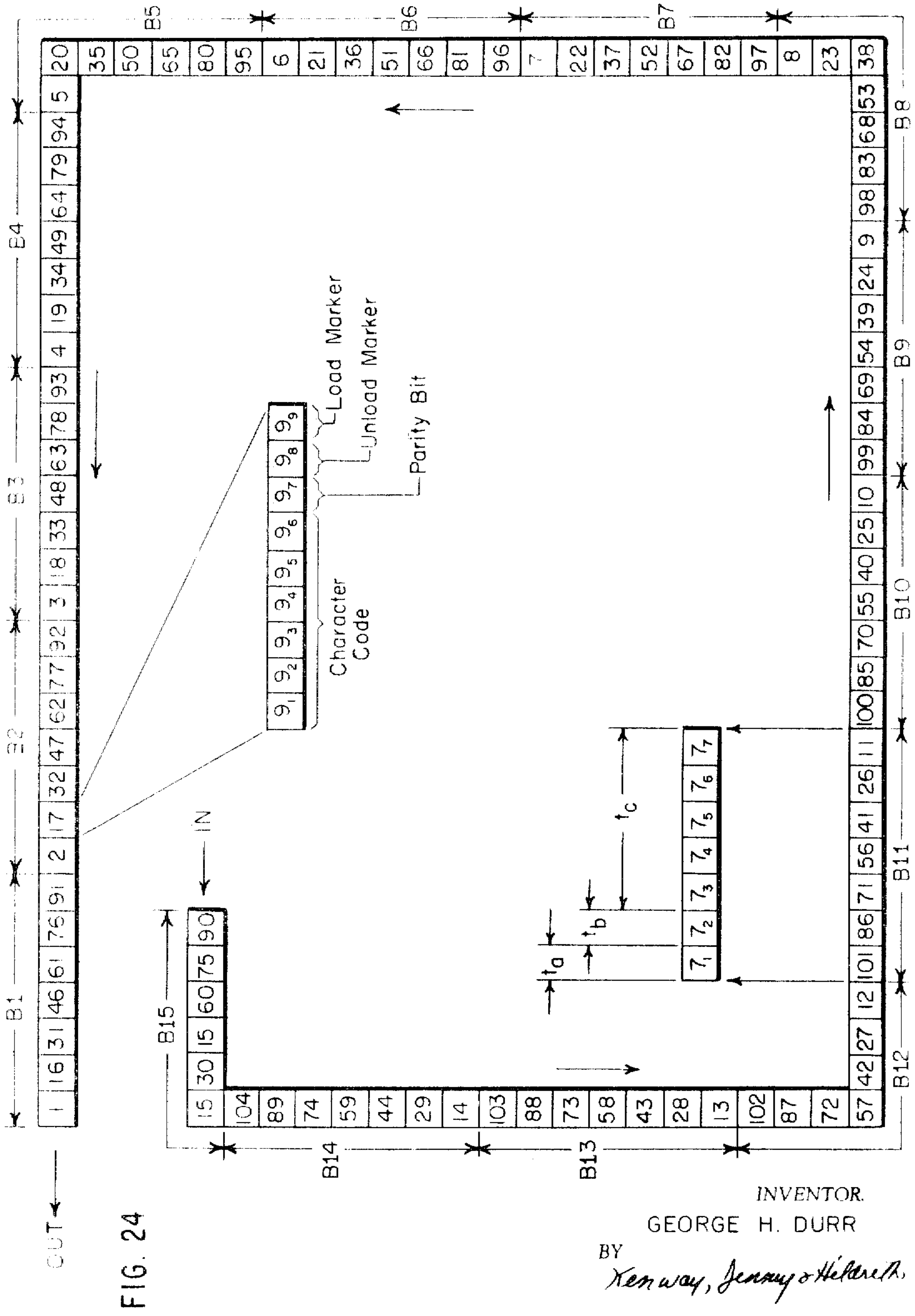
Figure 25:
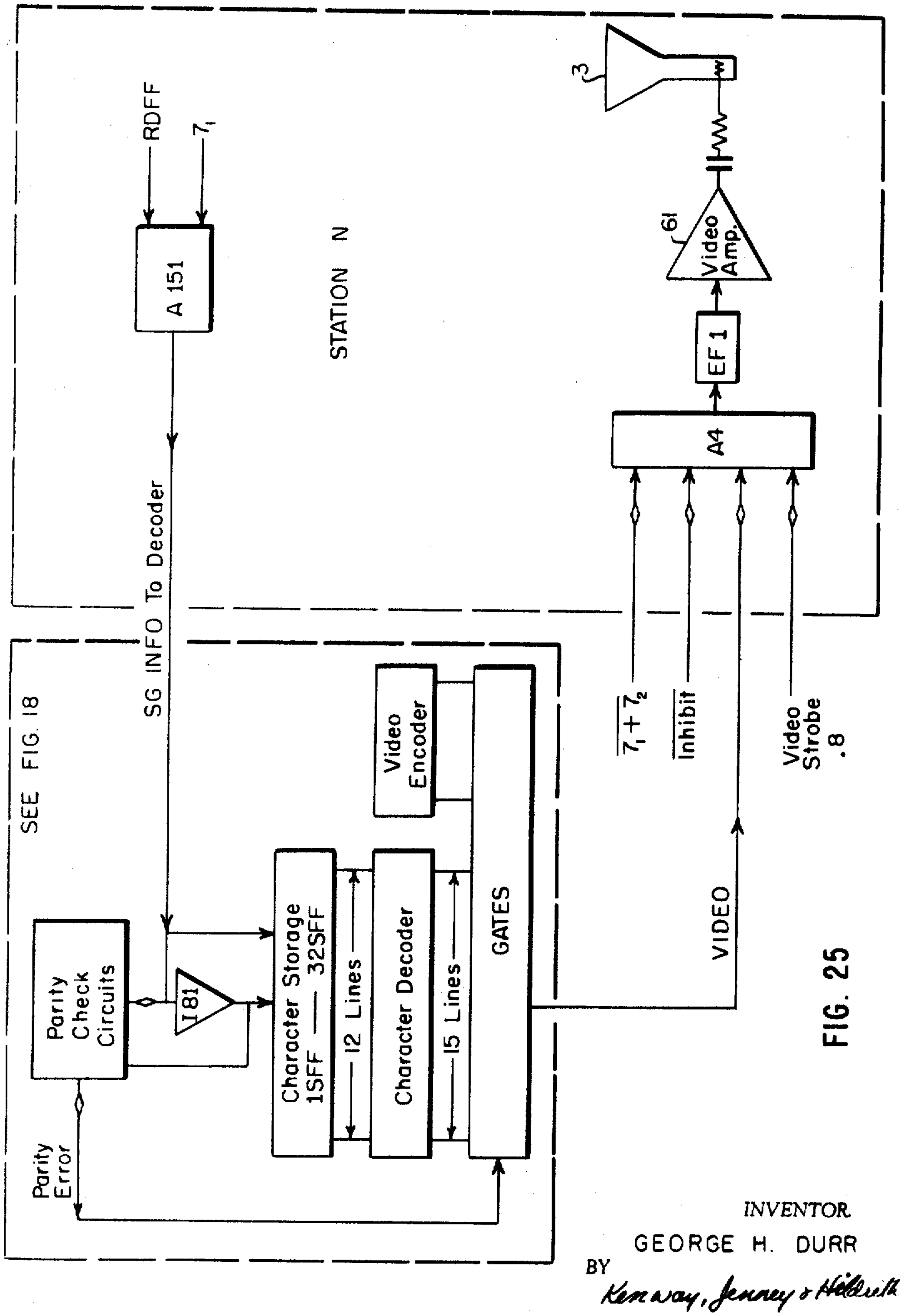

FIG. 4 comprises a series of diagrams showing the manner in which information is arranged for storage in the delay line of FIG. 3;

FIG. 5 is a schematic diagram showing the manner in which information is displayed on the cathode ray tube of the console shown in FIG. 1;

FIG. 6 is a schematic diagram showing the relationship between timing pulses employed in the apparatus of my invention and the vertical sweep voltage on the cathode ray tube of FIG. 1;

FIG. 7 is another schematic diagram relating the vertical sweep voltage on the cathode ray tube of FIG. 1 to a second group of timing signals;

FIG. 8 is a schematic diagram showing the manner in which a typical character is displayed on the cathode ray tube of FIG. 1;

FIG. 9 comprises a series of diagrams showing the manner in which various other typical characters are presented for display in the apparatus of my invention;

FIG. 10 is a table showing the times at which pulses appear to generate the typical characters shown in FIG. 8;

FIG. 11*a*, 11*b* and 11*c* are timing charts indicating the various timing signals supplied in the system of my invention;

FIG. 12 is a block diagram of a system for exchanging information between any one of a plurality of consoles and an information source;

FIG. 13 is a schematic wiring diagram of a flip-flop suitable for use in the system of my invention;

FIG. 14 is a schematic wiring diagram of a number of flip-flops of the type shown in FIG. 13 interconnected to form a binary counter;

FIG. 15 is a schematic wiring diagram of a number of flip-flops of the type shown in FIG. 13 interconnected to form a shift register;

FIGS. 16*a* through 16*f*, when arranged vertically side by side with FIG. 16*a* at the left, comprise a schematic wiring diagram of a console unit suitable for use in the system of FIG. 12 in accordance with a preferred embodiment of my invention;

FIGS. 17*a* through 17*c*, when arranged vertically side by side with FIG. 17*a* at the left, comprise a schematic wiring diagram of a central buffer system suitable for use with a console of the kind shown in FIGS. 16*a* through 16*f* in the system of FIG. 12;

FIG. 18 comprises a schematic wiring diagram of the symbol generator used in the system of FIG. 12;

FIG. 19 comprises a schematic wiring diagram of a character decoder for use with a system of FIG. 12;

FIG. 20 comprises a schematic wiring diagram of an encoder used in the symbol generator of FIG. 18;

FIG. 21 is a schematic wiring diagram of a pulse distributor used in the symbol generator of FIG. 18;

FIGS. 22*a* and 22*b*, when arranged vertically side by side with FIG. 22*a* at the left, comprise a schematic wiring diagram of the central counters used in the system of FIG. 12;

FIGS. 23*a* and 23*b*, when arranged vertically side by side with FIG. 23*a* at the left, comprise a schematic wiring diagram of a translator and an information source suitable for use in the system of FIG. 12;

FIG. 24 is a schematic diagram of a delay line used in an alternate embodiment of my invention; and FIG. 25 is a schematic wiring diagram of the alternate embodiment of my invention employing a delay line of the type diagrammed in FIG. 24.

Referring first to FIG. 1, the operator's console for use in a system in accordance with my invention is conveniently housed in a suitable cabinet 1. A cathode ray tube 3 is mounted in the housing 1 so that its screen is visible to the operator. A keyboard is provided for the operator, on which keys such as 5 are located, each labeled with an appropriate symbol in a selected alphabet. In the example shown, the information-representing characters available are A, B, C, the numbers from 0 to 9, and a period and comma. A space bar is provided to introduce a blank character space where desired. Two functional keys are also provided on the console, comprisilng a clear key 7 and a transmit key 9. Functions of these keys will be made to appear. A lamp 10 labeled "Enter" indicates when illuminated that the system is ready to receive a message from the keyboard.

Figure 2:
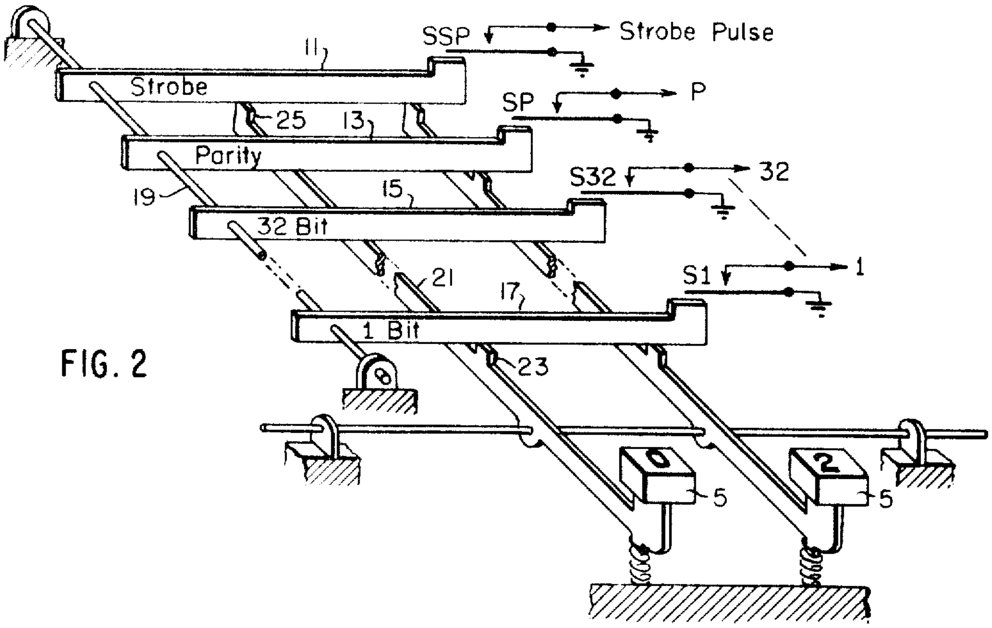
FIG. 2 is a fragmentary schematic diagram of a portion of the keyboard assembly of the console of FIG. 1, showing schematically the manner in which information entered by the operator at the keyboard is converted into binary code pulses.

Referring now to FIG. 2, the manner in which the keys 5 on the keyboard of the console shown in FIG. 1 are employed to generate a binary code is shown. A plurality of levers such as 11, 13, 15, and 17 are each journalled at one end on a suitable shaft such as 19. When raised, each of the levers will close an associated switch to provide a voltage level. In practice, I prefer to employ magnetically operated reed switches, and for this purpose the levers such as 11 would each actuate a magnet to move it into position to actuate an associated reed switch. In the system to be illustrated, it is assumed that information may be represented by six binary code bits, plus a parity bit for information checking. At the entry of each character, a strobe pulse is produced in addition to the information pulses. Accordingly, there are eight output lines, and these lines will correspond to the switch S1, the switches S2, S4, S8 and S16, not shown in FIG. 2, and the switches S32, SP and SSP.

As indicated for the 0 key, each key is journalled about a suitable shaft and is provided with an extended lever such as 21, which is provided with raised portions such as 23 and 25 adapted to engage selected ones of the transverse levers such as 11, when the key is depressed by the operator. Each key is provided with a projection such as 25 which will operate the lever 11 such that it will be operated at each character entry, to provide the character strobe pulse. The other transverse levers are operated or not according to the particular code that it is desired to enter. For example, unless it is not desired to use the binary 0 code as an information code, the code for 0 would be binary 0, which would be represented as 0000001. Since an odd parity check is desired, a parity bit is provided for this code sequence. In the sequence, the first six bits represent the characters in binary code, the last bit is the parity bit.

Since the manner in which the code is generated by the keyboard is one which is well known per se in the art, it is believed that it will be undertsood without further detailed description.

Referring now to FIG. 3, a central feature of the console units of my invention is a delay line into which information may be entered, either by the operator or from an external information source, as will appear. It will be assumed that this delay line provides a delay of 10 milliseconds in the system to be described, although other delays will obviously be perfectly satisfactory if the system timing is correspondingly adjusted. As shown in FIG. 3, the delay line 4 is provided with an input terminal *a* and an output terminal *b*. The input terminal *a* is connected through an input coil L1 to ground. This coil L1 surrounds a pair of elements 27 and 29, which are embedded at one end in a rubber block 31. A permanent magnet 33 is mounted adjacent to the coil L1 and the elements 27 and 29. The elements 27 and 29 are made of different materials which respond differently to applied magnetostrictive forces. Suitable materials for this purpose are well known.

The ends of the elements 27 and 29 are fastened to an elongated spiralled wire 35, such that in response to a pulse of electrical energy applied to the coil L1, a magnetostrictive force will be produced that will tend to make element 27 shorter than element 29, twisting the wire 35. This torsional deflection is propagated down the wire 35 at the speed of sound, and appears a predetermined time later as a torsional deflection at the opposite end. A second pair of elements 37 and 39, secured to the opposite ends of the wire 35 in the same manner as the elements 27 and 29, have their opposite ends imbedded in a rubber block 41. An output coil L2 surrounds the elements 37 and 39, and a permanent magnet 43 is disposed adjacent to the coil L2 in a manner similar to that in which the magnet 33 is arranged with respect to the coil L1. When a torsional deflection reaches the end of the wire 35 which is connected to the elements 37 and 39, these elements are moved in a manner which generates an electromagnetic pulse in the coil L2, which pulse appears at the output terminal *b*. The basic frequency at which information is gated to the delay line in accordance with the system of my invention, in a typical embodiment thereof, was at the rate of 655 thousand bits per second. Thus, the delay line, if adjusted to be of approximately 10 milliseconds in delay, has a capacity for approximately 6,550 bits. In practice, I prefer to adjust the delay line in accordance with the particular frequency of the basic oscillator employed such that if the oscillator is adjusted to approximately 655 kilocycles, the delay line is adjusted to hold exactly 6,552 bits of information. The reason for this number will be made to appear.

Referring now to FIG. 4, FIG. 4*a* shows the manner in which characters are arranged for storage in the delay line of FIG. 3. As indicated, each character has associated with it a time space; the time spaces for characters 1–104 are provided sequentially. As indicated in FIG. 4*a*, characters 51 and 52, and 103 and 104, occur during times corresponding to the horizontal retrace on the screen of the cathode ray tube of the console shown in FIG. 1. Accordingly, these characters are not used to represent information in the illustrated embodiment of my invention. However, if so desired, they may be employed to store a station identification code or other information to be used in the system but not displayed to the operator.

The time alotted for the storage of each character is further divided into seven equal shorter times, shown in FIG. 4*b*. For reference, these character times have been designated as $7_1$ through $7_7$. As will appear, pulses marking these times are generated in the apparatus of my invention. As shown in FIG. 4*b*, the $7_1$ time is used to store a character code representing a stored character. The $7_2$ time is not used in the illustrated embodiment of my invention, but may be used if desired to store an auxiliary character associated with the character stored in the $7_1$ time. The times from $7_3$ through $7_7$ are devoted to storing the video signals for displaying the character in the corresponding $7_1$ time on the screen of the console unit of FIG. 1.

Referring to FIG. 4*c*, the manner in which the $7_1$ time is divided into nine equal shorter times is indicated. As shown, these times are designated by the numbers $9_1$ through $9_9$, which correspond to pulses generated in the equipment. The times from $9_1$ through $9_6$ are filled by the character code, identifying the particular character to be stored, and are represented in the equipment by pulses which are present or not in the corresponding nine times. The $9_7$ time is provided for the storage of the parity bit associated with each character code. The $9_8$ and $9_9$ times are employed in the system to schedule loading and unloading of the delay line. The $9_8$ time, if occupied by a pulse, signals where to unload the next character in the delay line. A pulse in the $9_9$ time indicates where the next character should be loaded into the system.

Referring now to FIG. 4*d*, the times $7_3$ through $7_7$ are similarly broken down into 9 times, but these times are utilized differently. The first group of times from $9_1$ through $9_7$ is employed to store a video signal for displaying the character on the console. The $9_8$ and $9_9$ times correspond to the vertical fall time or retrace time on the cathode ray tube, and are not used to display information. The manner in which the video signal is stored will be made clear from a consideration of FIGS. 5–8.

FIG. 5 shows a diagram of the manner in which the electron beam is caused to scan the screen of the cathode ray tube in the console unit of my invention. As shown, the horizontal sweep may be divided into four strokes. Stroke 1 occurs during the time that the first line of characters from 1 to 50 is displayed on a selected top line on the tube. The second stroke is a retrace stroke during which character times 51 and 52 occur. The third stroke is made at a different vertical level setting, and during this time the characters 53 through 102 may be displayed. The retrace stroke 4 carries the beam back to the initial position, and occurs during the times that correspond to characters 103 and 104.

FIG. 6 shows the manner in which the 9 times are related to the vertical sweep voltage on the cathode ray tube in FIGS. 1 and 5. As shown, the vertical rise time corresponds to times $9_1$ through $9_7$, and the vertical fall time corresponds to times $9_8$ through $9_9$. During a particular one of the times $9_1$ through $9_7$ on a given vertical rise, if the grid of the cathode ray tube is supplied with an appropriate voltage to intensify the beam, a bright spot will appear on the screen at that point in the line. These bright spots are used in combination to display the various characters which may be stored in the system.

Referring now to FIG. 7, the relation of the vertical sweep voltage to the 7 times is shown. The $7_1$ and $7_2$ times contain no video information, so that these times define the space between characters. Each group of times $7_3$ through $7_7$ contains video information for a single character, and thus sets the width of the character. Obviously, the characters might be more closely spaced by omitting the $7_2$ time, or more widely spaced by adding an additional time period between the information presentations. Also, if more or less resolution were required, more or less than the 9 intermediate times might be employed for individual information display.

Referring now to FIG. 8, I have shown the manner in which a typical character, here shown as the numeral 6, is displayed. As will be apparent from a comparison of FIGS. 6 and 7, as the scale of the vertical voltage function is made more realistic, the rise times become more nearly vertical. These times are indicated in FIG. 8 by the vertical dotted lines $7_3$ through $7_7$. The regions in these times in which the various 9 times occur are indicated by the dotted horizontal lines $9_1$ through $9_7$. A large circle at the intersection of a 9 time and a 7 time indicates a bright spot on the screen at that time due to an applied pulse. As shown, these pulses are so arranged in time that the figure 6 is generated on the screen. FIG. 9 shows a group of other symbols which may similarly be provided, and it will be apparent that any other desired number of characters could be formed in the same way.

Referring to FIG. 10, a table is given in which the various pulses generated at the appropriate times to display the character 6 shown in FIG. 8 are indicated. The pulses are designated by logical 1's, and the absence of pulses by 0's, in a manner corresponding to the codes which are generated within the apparatus of my invention. As will appear, each pulse indicated by a logical 1 is applied to intensify the beam of the cathode ray tube to provide a light spot in the selected character display.

Referring now to FIG. 11, a chart of the various timing signals employed in the apparatus of my invention is given. As shown, the basic timing pulse is derived from an oscillator which provides a pulse of 0.3 microsecond duration at a 655 kc. repetition rate. Delay pulses of 0.1 and 0.8 microsecond are also employed as strobe signals in the equipment, as will appear. The timing of the system is taken from the 0.3 microsecond pulses, which operate a first shift register to generate the 9 time pulses, and this in turn operates a second shift register to generate the 7 time pulses. Characters are counted by a counter actuated by the output of the 7's timing shift register. Detailed circuits for performing these functions will be described below.

In FIG. 12, I have shown a block diagram of a system for exchanging information between a selected one of N operator's consoles and an information source. This block diagram indicates the basic equipment within each console, and the essential relationship between the consoles, the central buffer system, and the information source.

Station N is typical of the other stations indicated in FIG. 12. As shown, this station is provided with a delay line 4. The delay line is supplied by information from a write flip-flop WRFF through a write amplifier 47. The write flip-flop is controlled by the station information control gates 6 to supply a pulse indicating a logical 1, or no pulse indicating a logical 0, to the write amplifier at each time space in the machine cycle. During times when no information is supplied to the station or is stored therein, the write flip-flop WRFF is set to its 0 state. Information appearing at the output of the delay line 4 is applied to a read flip-flop RDFF through a read amplifier 53. The information represented by the state of the read flip-flop RDFF is channeled by the information control gates 6 to other parts of the system, and when it is desired to recirculate information in the delay line, it is supplied through the gates 6 from the read flip-flop RDFF to the write flip-flop WRFF.

When an operator desires to enter information at station N, to initiate a request for information from an information source 16, he enters the request manually at the keyboard 2, where it is converted to code which is applied through the information control gates 6 to the delay line 4. As characters appear at the output of the delay line, they are supplied through the read amplifier 53 and the read flip-flop RDFF to the information control gates 6, and are gated at the appropriate times through the station multiplex gates 10 to the central symbol generator 18. In the central symbol generator, a video encoder 59 continuously provides video information for all possible characters which may be displayed. The character supplied from the station is decoded in a character decoder 55, which operates through video gates 57 to select a line assigned to the particular character selected. The video information on this line is then fed back through the station multiplex gates 10 to the information control gates 6 of the station N. From the gates 6, the information is supplied to the write flip-flop WRFF.

The output of the write flip-flop WRFF is supplied to the write amplifier 47 to place the video information after the selected character in the delay line 4. At the same time, the output of the write flip-flop is applied through a video gate 24 to a video amplifier 61, where it is applied to modulate the intensity of the beam of the cathode ray tube 3.

The video information stored in the delay line 4 appears at the output after its associated character code appears at the output, and until the entire message has been entered, information is recirculated through the read flip-flop RDFF, the control gates 6, and the write flip-flop WRFF back to the input of the delay line 4 and to the video gate 24. Thus, the information is represented to the cathode ray tube once every cycle of the delay line, which in the illustrated embodiment will be at the rate of 100 times per second.

When the entire message has been entered, the operator may check it for accuracy by observing it on the cathode ray tube screen. Thereafter, in a manner to be described in detail below, he initiates a transmit operation in which the information in the delay line is still supplied to the write flip-flop WRFF, but is also channeled through the station multiplex gates 10 to the central buffer system 12. It is unnecessary to transmit the video information, so that it is simply erased from the system at this time.

When the central buffer system 12 has received a character from the station N, it transmits the character to a translator 14. The translator 14 converts the system time and information into suitable timing and information for any selected information source, here shown in block diagram form as an information source 16. If the information source has no prescribed timing, the translator 14 may be provided with its own timing source, or may be timed by the central counters and timing gates 20 of the information processing system of my invention. However, in general, the external equipment will be provided with its own clock, which is employed to time the translator during exchanges between the translator and the information source, and in transmission to the central buffer system. On the other hand, when receiving information from the central buffer system, the translator takes its timing from the central counters and timing gates 20.

When the translator has received a reply to the request sent to the information source 16, it is sent back to the central buffer system 12. From there, it is transmitted back to station N a character at a time, as each character is received from the translator 14, and entered into the delay line 4, through the information control gates 6. As before, as the information appears at the output of the write flip-flop WRFF, it is transmitted through the write amplifier 47 to the input of the delay line. As each character appears at the output of the delay line, it is channeled through the information control gates to the station multiplex gates, and thence to the symbol generator, wherein a video line is selected as before. When the line is selected, the video information is supplied back to the information control gates and channeled into the delay line 4 as before. At the same time, the video will be supplied through the video gate 24 to the video amplifier 61. The video information is also recirculated through the delay line so that the operator will see the reply information visually displayed on the cathode ray tube 3 for as long as may be necessary to interpret it. When the reply has been received, the station loses possession of the central buffer system 12. Thereafter, the reply is displayed until the operator cancels it by depressing the clear key on the console. In the meantime, another station may take possession of the central buffer system for an information exchange. As will appear, in the event of simultaneous requests by stations, a preference is enforced, but a request not simultaneous with another request is granted as soon as the central buffer system becomes available.

Before describing the details of a specific embodiment of my invention, I shall first describe various typical circuits which are employed in the system and are later shown in block diagram form.

Referring first to FIG. 13, I have shown a typical flip-flop, a number of which are used in the system of my invention. Shown within the outer block is a synchronous flip-flop FF. When used in this form, the flip-flop FF requires the application of both a negative pulse and a positive (or ground) level to change it from one state to another. Thus, if a ground level is applied to its input terminal *a* and a negative pulse is applied to its input terminal *b*, the output terminal *c* will be driven to ground potential. (In FIG. 13, and in other figures to be described, I have indicated the positive or ground level by an open diamond, and a negative pulse by a closed triangle. Also used are closed diamonds to indicate a negative level and open triangles to indicate positive pulses.) Within the synchronous flip-flop FF is shown an asynchronous flip-flop AFF. This may be of any suitable conventional construction, of the type which requires a positive pulse or level at either of its input terminals *a* or *b* to change the state of the circuit. If pulses are simultaneously applied to both input terminals *a* and *b*, the unit will change state. As shown, the asynchronous flip-flop AFF comprises a pair of transistors Q1 and Q2 which have their emitter terminals grounded. The collectors of the transistors are clamped to a negative potential of 5 volts or less by a pair of diodes D1 and D2, and are supplied with bias potential through resistors R1 and R2 from a negative 15 volt source. The voltage values are of course merely illustrative, and other values may be used with suitable transistors and circuit constants. If the transistors Q1 and Q2 are of the 2N1499 type, and the diodes are of the 1N281 type, convenient values for the resistors R1 and R2 are 1,000 ohms each. The remaining resistors might have the values of 12,000 ohms for R3 and R4, 2.0 thousand ohms for resistors R5 and R6. Capacitors C1 and C2 may each be 100 picofarads.

As will be apparent to those skilled in the art, assuming that transistor Q1 is conducting, its collector will be substantially at ground potential. This potential will be applied to the base of transistor Q2, reverse biasing it with respect to the emitter and causing it to cut off. The output terminal *c* of the unit AFF will then be at substantially ground potential, representing a logical 1. The output terminal *d* will be approximately minus 5 volts, since transistor Q2 is cut off, representing a logical 0.

If a positive pulse is applied to input terminal *a* of the asynchronous flip-flop AFF, no change in state will take place because the circuit is already in its logical 1 state. However, if a positive pulse is applied to input terminal *b* of the asynchronous flip-flop, the base of transistor Q1 will be reverse-biased with respect to the emitter, and the transistor Q1 will apply a negative potential to the base of the transistor Q2, causing it to go into conduction. As a result, the output termnal *c* of the unit AFF will go to a negative potential representing logical 0, and the output terminal *d* will go to ground, representing logical 1, which in this case means "not."

The inputs to the asynchronous flip-flop AFF are supplied by two delayed AND gates DA. These delayed AND gates each include a pair of diodes such as D3 and D4, a capacitor such as C3, and a resistor such as R7. At the frequencies and bit repetition rates used in the illustrated embodiment, suitable values for R7 and C3 are 4.7 thousand ohms and 180 picofarads, respectively. In operation, a ground potential level is applied to the input terminal *a* of the flip-flop FF, and a negative pulse is applied to the input terminal *b*, the leading edge of the negative pulse will not affect the circuit, but will merely begin charging the capacitor C3. However, the trailing edge of the pulse, which is positive-going, will apply a pulse above the ground level through the diode D3 to the input terminal *a* of the asynchronous flip-flop AFF. A delay in setting the flip-flop AFF is thus obtained, which is employed to prevent racing in the counting and shift register circuits to be described.

In any case in which it is desired to eliminate the delay in setting the flip-flop FF, this may be done by simply using a positive pulse as an input to the terminal *b*. If this is done, the output of the gate DA will be provided on the leading edge of the pulse instead of the trailing edge.

FIG. 14 shows the manner in which synchronous flip-flops of the type shown in FIG. 13 may be interconnected to form a binary counter. As will be apparent from a comparison of FIGS. 13 and 14, each stage of the counter comprises a synchronous flip-flop such as 1FF, 2FF, and 4FF, which may each be identical to the flip-flop FF in FIG. 13, and an AND gate, designated by NA plus a number denoting the counter stage, of the type which will produce a negative output in response to two applied negative inputs. As indicated in FIG. 14, this type of AND gate may be provided in a conventional manner by the use of a pair of diodes and a resistor connected to a suitable negative voltage source. With this construction, an applied negative input count pulse will change the state of the first stage of the counter. Thus, if the stages 1FF, 2FF, and 4FF are initially at logical 0, such that their "not" terminals (indicated by the barred numerals) are each at ground potential, the input count pulse will shift the state of the unit 1FF on the trailing edge of the count pulse to logical 1, at which time the $\overline{1}$ terminal will go negative. However, since the input count pulse is no longer present, no output pulse will be provided by the negative AND gate NA1. On the second input count pulse, the $\overline{1}$ terminal of the flip-flop 1FF will be negative, and the leading edge of the input count pulse will provide an output setting pulse from the negative AND gate NA1 to change the state of flip-flop 2FF. At the trailing edge of the count pulse, the flip-flop 1FF will be reset to logical 0. The count proceeds, by repeating the previous steps, through the usual binary sequence.

FIG. 15 shows a shift register constructed by properly arranging the wiring of three flip-flops of the synchronous type shown as FF in FIG. 13. As shown in FIG. 15, the shift line is connected to all of the pulse input terminals of the flip-flops. Thus, a ground level provided on either the one-set terminal *a* or the zero-set terminal *d* of any of the flip-flops will permit the shift pulse to set the flip-flops to the directed state. The output terminals of each flip-flop except the last are connected to the setting terminals of the next flip-flop, such that the state to which a given flip-flop is set at each shift pulse will depend upon the state of the previous flip-flop in the chain. As indicated in FIG. 15, the input to the shift register may be provided by a positive or ground level supplied directly to the one-set input terminal *a* of flip-flop 1FF and, through an inverter I, to the zero-set input terminal *d*.

The details of a typical station unit will next be described with reference to FIGS. 16*a* through 16*f*. Referring first to FIG. 16*a*, the gates for scheduling the assignment of the central symbol generator and the central buffer system to the individual stations are shown. Considering first the symbol generator possession unit, this comprises a shift register including a flip-flop for each of the stations from 1 to N. These flip-flops are designated respectively SGP1, through SGPN, with a typical intermediate station being designated as SGP*i*. The shift pulses are applied in the same manner as just described in connection with FIG. 15, and comprise a series of negative shift pulses indicated as "SGP shift," which are repeated in the system herein described at approximately 100 pulses per second. This time is related to the approximate 10 millisecond time of the delay line 4, and represents the time necessary to generate the video information for a line full of characters. As shown, the input to the shift register comprising the SGP flip-flops is supplied by an OR gate OR1 which has inputs connected to all of the logical 0 output terminals of the flip-flops except the last one. Thus, if there is a 1 in any of the flip-flops except the last, SGP1 will be set to 0 on the next SGP shift pulse. However, if there is no 1 in any of these flip-flops, SGP1 will be set to 1. The effect of this circuit connection is to keep a logical 1 circulating through the flip-flops, and this 1 indicates by its presence on the output terminals of the given flip-flop that the symbol generator is in the possession of the station associated with that flip-flop. Thus, the output SGPN for the Nth flip-flop indicates by a positive level that the station N has the symbol generator in its possession.

As will appear, an SGP shift pulse is formed during the 104th character time by the last pulse within that time; the $7_79_9$ pulse is employed in the illustrated embodiment. Thus, the possession of the symbol generator is shifted from one station to the next once every 10 milliseconds. The rate at which new video information may be obtained by each station depends on the number of stations; in practice, I have found that up to twenty-four stations may be used in the illustrated embodiment of the system of my invention. With twenty-four stations in the system, each station could obtain new video information approximately four times per second. It should be noted that the frame rate of the display of information at each station will be 100 frames per second regardless of the number of stations in use, because once the video signals for a line of characters has been supplied to the delay line 4 for the station, it is re-presented to the cathode ray tube 3 every ten milliseconds.

The central buffer is assigned to one of the stations by a shift register containing a flip-flop for each station. These are indicated as beginning with BPFF1 for station 1, to BPFFN for station N, with the flip-flop for any intermediate station being indicated as **BPFF*i***.

These flip-flops are interconnected to form a shift register of the same type as used for the symbol generator possession shift register. The shift pulses are supplied by a BP shift line, which is energized at times prescribed by the central buffer system program control with pulses occurring at a 655 kc. per second repetition rate. These pulses cause a logical 1 to circulate through the buffer possession flip-flops, and this action is continued until a station is found which has a message ready for transmission to the central buffer. A shown, the logical 1 output terminal of each buffer possession flip-flop except BPFFN is applied to one input terminal of an AND gate, the other terminal of the AND gate being supplied by an unload signal from the next succeeding station. Specifically, the AND gate A47 has one input terminal connected to the logical 1 output terminal of the flip-flop BPFF(N–1), not shown, and a second input terminal energized by a signal "unload N" which is supplied, when station N has a message to transmit, in a manner to be described below. The AND gate A49 for the typical intermediate station *i* has one input terminal connected to the logical 1 output terminal of the flip-flop BPFF(*i*–1), not shown, and the other input terminal energized by an "unload *i*" signal. The first station 1 is represented by an AND gate A51, which is supplied by a signal, corresponding to the logical 1 state of the flip-flop BPFFN, produced at the output of the inverter I36 when there is no logical 1 in any of the other flip-flops. The second terminal of the gate A51 is energized by an "unload 1" signal, as shown. The gates such as A47, A49 and A51 are connected through inverters, such as I30, I31 and I35, respectively, to a common line which is energized with a ground level to indicate "stop search" when any of the AND gates produces an output. Thus, the "stop search" signal for any station is generated when the "unload" signal for that station is generated and the buffer possession flip-flop for the next preceding station is in its logical 1 state. The reason for this arrangement is that there is a delay between the recognition of the fact that a station is ready to transmit and the interruption of the buffer possession shift pulses. As will appear, after a "stop search" signal is formed, the buffer possession shift pulses are interrupted, but not until one final pulse has been sent to step the shift register to its next state.

Referring to FIG. 16*f*, the control circuits for the cathode ray tube 3 will next be considered. These circuits are conventional, except in the timing of the horizontal and vertical sweeps, and in the manner in which the vertical step function is introduced.

As shown, the cathode ray tube 3 is of the electrostatic deflection type, being provided with horizontal deflection plates HP and vertical deflection plates VP. The cathode of the tube is supplied from the wiper of an intensity control potentiometer P1 which is connected in a voltage dividing circuit extending from a suitable source of negative voltage, of, for example, minus 1500 volts, through the resistance element of the potentiometer P1, a resistor R8, a focusing control potentiometer P2, and an additional resistor R9 to ground. An astigmatism correction potentiometer P3 is also provided, which has its resistance element connected across a suitable source of voltage as shown, and its wiper connected across a capacitor C5 to the control grids of the tube.

Grid bias is provided in a conventional manner by a circuit path connected between the cathode and the grid of the tube 3, this path comprising a capacitor C4, resistor R11 and resistor R10. The intensity modulating video input signal is supplied between the junction of resistors R10 and R11 and ground. As here shown, this input is provided from the output of the video amplifier 61 through a suitable coupling capacitor C6.

The vertical sweep voltage is supplied to the vertical deflection plates of the tube 3 by a vertical sweep generator and deflection amplifier VGA. As shown, the input to this unit comprises the vertical synchronization pulses, which are generated at $9_8$ and $9_9$ times, represented logically by the logical symbol $(9_8+9_9)$. The synchronization pulses are applied to a ramp generator SRO, which may be of any suitable conventional construction, and which supplies a cathode follower CF. The output of the cathode follower CF is supplied through a suitable coupling capacitor C7 to a phase splitting amplifier comprising a conventional triode T1. Plate voltage from a suitable voltage source B+ is supplied to the triode T1 through a conventional load resistor R13. The cathode is returned to ground through a suitable resistor R12. Grid bias is supplied by a grid resistor R11. The plate and cathode outputs of the phase splitting amplifier PSA, which are 180° out of phase, are applied to a pair of deflection amplifiers through suitable coupling capacitors C8 and C9.

The deflection amplifiers are symmetrical, except that one of them is supplied with the vertical step function input in its grid bias circuit. As shown, a first deflection amplifier comprises a triode T2 provided with a plate load resistor R14 and a cathode returned to ground through one side of a vertical centering control potentiometer P4 and a resistor R22. The grid bias is provided by a potential divider extending from the power supply terminal B+ through resistors R15, R16 and R17 to ground. The input from the phase splitting amplifier PSA is supplied to the junction of the resistors R15 and R16, and the vertical step voltage is applied to the junction of the resistors R16 and R17. As shown in FIG. 11*a*, the vertical step voltage provides for a first level during the time in which the characters 1–50 are written, and a second level during the time in which the characters 53–102 are written. The second deflection amplifier, comprising a triode T3, may be the same as the one comprising the triode T2, except that there is no vertical step input. The manner of vertical centering through the use of the potentiometer P4 is conventional, and, as will be apparent to those skilled in the art, the control consists in adjusting the relative cathode potentials of the triodes T2 and T3 to cause the beam to be centered on the tube face in the absence of an input signal from the phase splitting amplifier PSA.

The horizontal sweep generator and deflection amplifier HGA may be identical with the vertical sweep generator and deflection amplifier VGA, except for obvious differences in component values due to the different frequencies at which these circuits operate. Specifically, the vertical sweep voltage has a repetition rate of approximately 72.8 kc. per second, and the horizontal deflection voltage has a frequency of approximately 200 cycles per second. An additional difference is that there is no input corresponding to the vertical step input for the vertical unit VGA in the horizontal unit HGA. As indicated schematically, the horizontal synchronization pulses comprise the times in which characters 51, 52, 103 and 104 are assigned. These pulses are provided from the central character counters in a manner which will appear.

Considering now the circuits concerned with entering and extracting information from the delay line 4, the write flip-flop WRFF will first be considered. As shown in FIG. 16*f*, a strobe pulse comprising the clock pulses of 0.3 microsecond duration at 655 kc. per second is applied to the pulse input terminals of this flip-flop. A set level is supplied by a write signal applied to the right hand input terminal of the flip-flop WRFF directly, and through a conventional inverter I1 to the left hand input terminal. As shown in FIG. 11*b*, a delayed pulse of 0.8 microsecond duration is provided following each 0.3 microsecond pulse. The purpose of this delay is to give the write flip-flop WRFF time in which to be set.

Referring again to FIG. 16*f*, at each 0.8 pulse, an AND gate A1 is enabled to read the output of the write flip-flop WRFF into the write amplifier 47 through a conventional inverter I2.

The delay line output, labeled DLO, is supplied to the read amplifier 53 from the delay line 4. Depending upon the mode in which the station unit is operating, the delay line output DLO is gated either through a first AND gate A2 in FIG. 16*f* or a second AND gate A3 in FIG.16*e*. As indicated in FIG. 16*f*, the AND gate A2 is enabled at any time except when it is desired to look for a marker in the delay line. As will appear, these markers indicate either that the next character is to be loaded or unloaded. When the AND gate A2 is enabled, the delay line output is applied to set the read flip-flop RDFF by a direct connection to its right hand level input terminal and through an inverter 13 to its left hand input terminal. Actual setting of the read flip-flop occurs on the trailing edge of the read strobe pulses, which are of 0.1 microsecond duration.

As shown in FIG. 16*f*, the video information is applied to the video amplifier 61 from the output terminal of an emitter follower EF1. This emitter follower comprises a pair of transistors Q3 and Q4. Transistor Q3 is supplied by a suitable power supply having its negative terminal connected to the collector of the transistor Q3 and its positive terminal connected to the emitter through a suitable load resistor R10. The transistor Q4 has its collector connected to the negative terminal of the power supply, its base connected to the emitter of the transistor Q3 and its emitter connected to the input terminal of the video amplifier 61. As will be apparent to those skilled in the art, upon the application of a negative input pulse to the input terminal *a* of the emitter follower EF1, the transistor Q3 will be caused to conduct, lowering the potential at the base of the transistor Q4. The result of this will be that the emitter of the transistor Q4 will go negative, applying a negative input signal to the input of the video amplifier 61.

Negative pulses for the actuation of the emitter follower EF1 are supplied by an AND gate A4. This AND gate has four input terminals, and provides a negative output voltage when all of the input voltages are at ground or positive potentials. Since the video signal is stored and generated during the $7_3$ through $7_7$ times, one input to the AND gate A4 is the logical signal "not $7_1$ or $7_2$", shown as ($\overline{7_1+7_2}$). Also, it is desired to provide blanking of the screen during the horizontal retrace, while is accomplished during the character 51, 52, 103 and 104 times. Blanking is accomplished by providing an inhibit signal at these times, and the second input to the AND gate A4 is the logical signal "not inhibit." A third input to the AND gate A4 is the video strobe pulse, which comprises the 0.8 microsecond timing pulse also used as the write strobe pulse. The fourth input to the AND gate A4 is the "write" level, which provides the video code signals during the times $7_3$ through $7_7$.

Referring now to FIG. 16*e*, it will be recalled that the AND gate A3 has as one input the delay line output DLO. This AND gate is enabled when the station is not in a clear status and when a "look for marker" signal is applied.

The AND gate A3 controls the setting of a marker flip-flop MFF through a marker delay flip-flop MDFF. The necessity for the provision of the marker delay flip-flop will be made clear when the operation of the system is described.

As shown, an inverter I4 is provided between the output of the AND gate A3 and the input of the marker delay flip-flop MDFF. This inverter is provided simply to provide the proper polarity to set the flip-flop. The output of the marker delay flip-flop MDFF sets the marker flip-flop MFF as shown. The strobe for both flip-flops is the 0.1 microsecond pulse. Initially, the marker flip-flop is set to the logical 0 state by a clear pulse applied through a suitable isolating diode to its left-hand output terminal. During the operation of the equipment, a "marker gate" signal is applied to restt the flip-flops through an inverter I5.

The "look for marker" signal applied to the AND gate A3 is formed by a plurality of AND gates A5, A6, and A7 and two OR gates OR1 and OR2. The interconnections and functions of these gates will be described in connection with the operation of the system.

The functions performed by the keyboard of the console unit will next be considered. As shown in FIG. 16*e*, the strobe switch SSP, which is closed at every operation of a data entry key, actuates a triggered blocking oscillator TB1 of conventional design to provide a strobe pulse to set a keyboard load level applied to keyboard character flip-flop KCFF at its right hand input terminal. The keyboard character flip-flop is reset on the first 0.3 microsecond pulse occuring with the marker flip-flop MFF in its logical 1 state. The keyboard character flip-flop KCFF is also reset at times by a clear pulse provided by a clear flip-flop CFF in FIG. 16*c*, as will appear.

Referring again to FIG. 16*e*, the console is provided with an "enter" lamp 10, which is lit when the keyboard load level is applied to the keyboard character flip-flop KCFF. This indicates to the operator that he can enter data into the system.

The keyboard is also provided with a clear switch SC, which has one terminal connected to a minus 5 volt supply and the other terminal connected to a triggered blocking oscillator TB2. When actuated, this switch provides a negative clear pulse to begin the clear operation for the unit.

A transmit button is also provided on the keyboard. This button comprises a spring-returned push button TB, which is normally closed, and which when opened provides an open level to initiate the transmission of data from the console to the central buffer system.

The data entry switches S1 through SP have their output terminals connected to one input terminal of a set of AND gates A8 through A14. The other inputs to these AND gates are provided by lines energized at the particular 9 times indicated in FIG. 16*e*. In this manner, the parallel data from the keyboard is converted into serial form in the appropriate 9 times.

The output terminals of the AND gates A8 through A14 are applied in parallel to an OR gate OR3. The output of this OR gate is applied to an AND gate A15, together with a keyboard gate level provided through an inverter I6 from an AND gate A16. The operation of these gates will be considered in detail in connection with the operation of the system described below.

Referring now to FIG. 16*d*, a group of gates is shown for performing various functions in the system. First, an OR gate OR4 is shown, which is supplied with information from the keyboard, video information, information from the central buffer system, marker loading and gate signals, a clear gate, and information from the delay line 4 which is to be recirculated. The output of the OR gate OR4 represents information to be entered into the delay line 4 and supplied to the cathode ray tube 3.

The decision whether or not to recirculate information in the delay line 4 is made by an OR gate OR5 followed by an inverter I12. Various conditions under which the recirculate level is generated will be discussed below.

The recirculate level is applied to an AND gate A17, together with the output of the read flip-flop RDFF, and the output of the AND gate A17 is supplied to the OR gate OR4.

The command to apply new information to the OR gate OR4 is generated by an AND gate A18. The output of this AND gate is supplied through an inverter I10 to an AND gate A22, which is also supplied by information from the central buffer system. The output of the AND gate A22 is applied to the OR gate OR4. The AND gate A18 also provides an information gate input to the OR gate OR5.

A third output from the AND gate A18 is provided through an inverter I11 to indicate by a ground level the "internal unload buffer gate" state of the apparatus. An "internal load buffer gate" signal is formed by an AND gate A19, which is connected through an inverter I13 to provide a positive level gate signal.

An AND gate A20 provides video information to the OR gate OR4. The inputs to the AND gate A20 are video information from the central symbol generator and a "video gate" level formed by an AND gate A21 and applied through an inverter I9.

A clear gate signal is applied to the OR gates OR4 and OR5 from an AND gate A23. This signal is generated when the system is in a clear status and the time corresponds to $7_1$ or to $7_2$ and not the $9_8$ or $9_9$.

A "marker gate" level for turning off the marker flip-flop MFF and the marker delay flip-flop MDFF in FIG. 16*e* is formed by an AND gate A24 in FIG. 16*d*. The conditions under which this gate is operated will be discussed below.

FIG. 16*c* shows the program control system for the station N. The station has eight modes of operation, which are established by a counter comprising three flip-flops P1FF, P2FF and P4FF. These flip-flops are connected as a binary counter. Interconnection between the flip-flops P1FF and P2FF is provided by a negative diode AND gate NA3. The output of the flip-flop P2FF is connected to the input of the flip-flop P4FF through a negative diode AND gate NA4. These AND gates may be the same as those shown in FIG. 14. The binary states of the counter comprising the flip-flops P1FF, P2FF, and P4FF are represented by a series of AND gates A25, A26, A27, A28, A29, A30, A31 and A32. As shown, the outputs of the flip-flops are connected to the AND gates in such a way that at every state of the counter, one and only one of the AND gates provides an output. Reading from the top, these outputs indicate the program modes "clear I," "load 9I," "keyboard load," "load 8," "unload," "clear II," "load 9II," and "external load."

A clear flip-flop CFF is set on the first SGP shift pulse following the appearance of a negative level at the output of the clear I AND gate A25 or the clear II AND gate A30. These AND gates have their output terminals connected to the input terminals of an OR gate OR7, which has its output terminal connected to the set level input terminal of the clear flip-flop CFF. The clear flip-flop is reset to 0 on the next SGP shift pulse after the one that sets it. This function is accomplished by connecting the logical 1 output terminal of the flip-flop CFF to its logical 0 setting input terminal. When the clear flip-flop CFF is reset, a clear pulse is formed which resets the keyboard character flip-flop KCFF and the marker flip-flop MFF in FIG. 16*e* and 8=9 flip-flop 89FF in FIG. 16*b*.

The output terminals of the AND gates A26 and A31 are connected to the input terminals of an OR gate OR6, to form the level "load 9" in either the "load 9I" or "load 9II" operational modes of the system.

The output terminals of the AND gates A27 and A32 are connected to an OR gate OR8 to form a "load" level in either the "keyboard load" or "external load" modes of the system. The output of the AND gate A27 is also connected to the input terminal of an inverter I14, to form a positive "keyboard load" level for use elsewhere in the system. The output of the AND gate A32 is also connected to the input terminal of an inverter I17, to form an "external load" ground level signal.

The output terminal of the AND gate A28 is connected to an inverter I15, to provide a positive level indicating "load 8."

The output of AND gate A29 is connected through an inverter I16 to form an "unload" ground level.

The "load" and "unload" operational modes of the system as represented by the outputs of OR gate OR8 and AND gate A29 are used to form a "load marker gate" level. As shown, the "unload" level is applied to one input terminal of an AND gate A37, and the other input terminal is supplied by a ground level at the time $7_1 9_8$. The output of the AND gate A37 is connected to one input terminal of an OR gate OR9, to form a "load marker gate" signal in the "unload" mode. The "load" level is applied to an AND gate A38, which has another input terminal to which a ground level is applied at the time $7_1 9_9$. The output of the AND gate A38 is connected to the other input terminal of the OR gate OR9, and forms a "load marker gate" ground level in the "load" mode of operation.

A negative "central clear" pulse from the central buffer system is inverted in an inverter I20 to form a "central clear" positive pulse, which resets the counter flip-flops P1FF, P2FF and P4FF through diodes connected to their 0 output terminals. These counters are also cleared at times by a station "clear" pulse applied to an AND gate A33 when the central buffer is not in possession.

A "load new marker" signal is formed by a series of AND gates A34, A35 and A36 and an OR gate OR10. As shown, the "load new marker" negative level is formed by the AND gate A35 in character 104 time when the OR gate OR10 produces an output ground level. The OR gate OR10 produces an output ground level when it is operated either by the AND gate A34, which responds in the "load 8" mode of operation in the $7_1 9_8$ time, or by the AND gate A36, which responds during the "load 9" mode of the station in the $7_1 9_9$ time.

Referring now to FIG. 16*b*, the manner in which the "load stop" signal to the central buffer system is formed will next be described. This signal is directly provided by a positive level at the output of an inverter I26, which is supplied by a negative level from an AND gate A45. This AND gate is enabled by a ground level applied when the central buffer is in possession, a $9_8$ marker bit and a $9_9$ marker bit are located in the same $7_1$ time, indicating the last character of the message, and when the station receives a "send character" level from the central buffer system.

The location of $9_8$ and $9_9$ marker bits in the same character time is detected by an 8=9 flip-flop 89FF. This flip-flop is synchronized with the 0.3 microsecond clock pulses from the central counter. It is set by an 8=9 gate level from an inverter I22, which occurs when an AND gate A39 provides a negative level. As shown, this is accomplished by connecting the "write" level, the write flip-flop WRFF output, and a line energized with a ground level in $7_1 9_9$ time to the input terminals of the AND gate A39. Since there is a one bit delay between the "write" level and the write flip-flop output level, both levels will be at ground only when a $7_1 9_9$ bit has been found and a $7_1 9_8$ has preceded it.

The flip-flop 89FF is reset on the application of a clear pulse from the station to its logical 0 output terminal through a diode, as shown. It is also reset by a negative level appearing at the output of an inverter I21 in response to an "unload operation complete" negative level from an AND gate A40. This level is provided when the flip-flop 89FF is on, the station is in its "unload" mode, and a "send character" signal has been sent from the central buffer system.

Count pulses for stepping the counter comprising the flip-flops P1FF, P2FF and P4FF in FIG. 16*c* are provided by the output of an OR gate OR11 in FIG. 16*b*. As indicated, this OR gate may simply comprise a pair of diodes. One input to the gate OR11 is provided by the clear flip-flop CFF in FIG. 16*c*. This flip-flop provides a clear pulse when the station enters the "clear I" or "clear II" operational modes, as previously described. A second input to the OR gate OR11 is provided through an inverter I29 from a delayed AND gate DA41. This AND gate responds to the trailing edge of a 0.3 microsecond pulse if an OR gate OR12 is providing a ground level at that time.

The OR gate OR12 has three inputs; these are a negative level meaning "load new marker," a negative level meaning "unload operation complete," and a negative level from an AND gate A42. Inputs to the AND gate A42 are provided by a "keyboard load" mode level from the AND gate A47 in FIG. 16*a* and by a "transmit" level which is produced when the operator depresses the transmit button TB on the keyboard in FIG. 16*e*.

Comparing FIGS. 16*b* and 16*c*, the sequence of operation of the station program counters P1FF, P2FF and P4FF is as follows: The station will normally be in the "external load" program mode following the completion of the last operation. When the operator depresses the clear switch on the keyboard, all of the flip-flops P1FF, P2FF and P4FF are set to 0. This operation provides a "clear I" level from the AND gate A25 which is directed through the OR gate OR7 to set the clear flip-flop CFF. The clear flip-flop CFF is then reset on the next SGP shift pulse, and the clear pulse thus provided at the logical 1 output terminal of the flip-flop CFF provides a count pulse which steps the counter to the "load 9I" mode. The counter is stepped from "load 9I" to the "keyboard load" mode by the level "load new marker" provided by the AND gate A35 in FIG. 16*c*. The pulse to step the system from the "keyboard load" mode to the "load 8" mode is provided by the depression of the transmit button TB on the keyboard coinciding with the "keyboard load" mode state of the station as represented by the level provided by AND gate A27 in FIG. 16*c*. The station is stepped from "load 8" to "unload" status by the level "load new marker." Transition from the "unload' status to the "clear II" status occurs when the "unload operation complete" level is generated. This level is provided by the gate A40 in FIG. 16*b*. The system automatically steps from "clear II" to "load 9II" as a result of the set and reset of the clear flip-flop CFF in response to the "clear II" level provided by the AND gate A30. This operation also resets a number of the functional flip-flops in the system. The system is shifted from the "load 9II" mode to "external load" by the "load new marker" level. It remains in this mode of operation until the operator initiates another transmission by depressing the clear button on the console keyboard.

Also shown in FIG. 16*b* are three emitter followers EF2, EF3 and EF4. These emitter followers are employed to isolate the vertical and horizontal synchronization pulses and the vertical step function for the station N cathode ray tube 3 from other stations. They operate as shown in FIG. 16*b*, in response to the appropriate signals from the central counters.

Referring again to FIG. 16*a*, the manner in which the stations are notified of their buffer possession status will next be described. As shown, the logical 1 output terminal of each of the buffer possession flip-flops BPFFI–BPFFN is connected through an inverter to an AND gate. Thus, the AND gate A46 has one input terminal connected through an inverter I33 to the logical 1 output terminal of the buffer possession flip-flop BPFFN. The gate A46 and the inverter I33 correspond to those associated with the other flip-flops; thus, an AND gate A50 is connected to the output terminal of buffer possession flip-flop BPFF1 through an inverter I34, and an AND gate A48 is indicated as connected to the output terminal of the typical intermediate buffer possession flip-flop BPFFI through an inverter I32. All these gates perform the same function for their respective stations, so that only the gates for station N will be described.

The AND gate A46 essentially comprises an inverter of the collector-follower type, consisting of a single transistor Q5 which has its base returned to a suitable positive voltage through a load resistor R24. An input resistor R23 is bypassed by a capacitor C10. The emitter of the transistor Q5 is connected to the collector of a transistor Q6 of an inverter I37. This inverter is common to the other AND gates of the set comprising A50 and A46 and other similar AND gates The emitter of the transistor Q6 in the inverter I37 is connected to ground. An input circuit for the base of the transistor Q6 identical with that provided for the transistor Q5 in the AND gate A46 is provided. With these circuit connections, it is apparent that if a "BP gate" negative level is applied to the input terminal of the inverter I37, the collector of the transistor Q6 will go to ground potential and provide a ground "BP gate" level at the emitter of transistor Q5 in the AND gate A46. If at this time the inverter I33 provides a negative level from the logical 1 output terminal of the buffer possession flip-flop BPFFN, then the collector of transistor Q5 will go essentially to ground potential and the ground level signal "buffer in possession unit N," represented as "BIPN," will be generated.

The "stop search" signal for the central buffer system is provided by a plurality of AND gates connected to the logical 1 output terminals of the buffer possession flip-flops for the stations next preceding the stations which are affected. As pointed out before, this delay of one bit is provided to enable the "stop search" signal to actuate the central buffer system. As will appear, a final BP shift pulse is provided to step the buffer possession flip-flops one unit after the stop search signal is received.

The stop search signal for the unit N is formed by an AND gate A47. This AND gate receives an "unload" signal from the AND gate A29 operated by the program counters in FIG. 16*c*, and a positive level from the logical 1 output terminal of the buffer possession flip-flop next preceding BPFFN, which would be BPFF(N–1). The output of the AND gate A47 is applied to an inverter I30, where the ground level "stop search" signal is formed.

Referring next to FIGS. 17*a*–17*c*, the central buffer system will next be described.

Referring briefly to FIG. 17*c*, shown at the right are the terminals for the transmission and reception of information to and from the stations, respectively. The upper group of terminals connected to each station are supplied with energy by the central counters, to be described. The second group of terminals connected to each station are energized by the central buffer system, and comprise terminals energized by the signals "character ready," "send character" and "information." The "information" terminal is energized by character code signals representing the characters of a message transmitted to a selected station. The "central clear" pulse is also provided by the central buffer system and sent to each station. Video information is supplied to each station from the central symbol generator, to be described. Next are the "SGP shift," "BP shift" and "BP gate" signals, which are sent to the common buffer possession and symbol generator circuits shown on FIG. 16*a*. The next terminal is for the use of the central buffer system, and is supplied from the common buffer possession gates in the form of a "stop search" level.

The information provided to the central buffer system from each station is shown for station N, as comprising information to the buffer, "load stop," "internal load buffer gate" and "internal unload buffer gate" levels. Another signal from station N comprises the symbol generator character code information, labeled "SG information to decoder," which goes to the decoder in the central symbol generator shown in FIG. 18.

Referring next to FIG. 17*a*, the central buffer system terminates in lines connected to the translator, shown in FIG. 23, which adapts the central buffer system to any particular information source, and which is in turn connected to an information source. A typical information source in the form of a simple computer will be described in connection with FIG. 19.

The central buffer itself comprises eight flip-flops arranged in the form of a shift register. The first of these comprises the stop flip-flop S–AFF, which is an asynchronous flip-flop of the type described in connection with FIG. 13. Two delayed AND gates DA7 and DA8 are provided for setting this stop flip-flop S–AFF to its logical 1 level, and a second pair of delayed AND gates DA5 and DA6 are connected to set the flip-flop S–AFF to its logical 0 level. The remaining flip-flops CBFFP, CBFF32, CBFF16, CBFF8, CBFF4, CBFF2 and CBFF1 are synchronous flip-flops of the type described in connection with FIG. 13.

Basically, in the operation of the central buffer, information is shifted into it, either from a selected station which has the buffer in possession or from the translator a single character at a time in the form of six information bits, one parity bit, and a stop bit or not, the latter depending on whether the character is an intermediate character or the last character in the message, respectively.

When it is desired to transmit from the central buffer, the information is shifted out such that the one logical bit appears first, followed by the other bits in the message.

When a character has been received by the central buffer, the presence or absence of a stop bit in the stop flip-flop S–AFF determines the next step of operation. Thus, if there is no stop bit in the flip-flop S–AFF, a "not stop" level will be supplied to an AND gate A58. A second input to the AND gate A58 is provided through an inverter I50 from an AND gate A57. This AND gate provides a negative level when there is a character in storage, as indicated by the level CIS, and when the central buffer system is in the receive mode. At this time, a "character ready" level is sent to the station from the AND gate A58 through an inverter I51. If there is a stop bit present in the flip-flop S–AFF, a "stop" level is applied to an AND gate A56. If the central buffer system is not in the "external load buffer gate" mode, and the AND gate A57 just described is providing a negative level, a "receive operation complete" level is provided by the AND gate A56 and is applied through an inverter I47 to provide a level indicating that the receive operation is complete. The stop flip-flop S–AFF will be reset after the "receive operation complete" level is received, on the next 0.3 microsecond pulse, by operation of the delayed AND gate DA5. This operation merely clears the stop flip-flop, without effecting an information shift in the buffer. Accordingly, it may be omitted, if so desired, by omitting the connection between the output of the gate DA5 and the reset terminal of the flip-flop S–AFF without departing from the scope of my invention.

Conversely, when a "send character level" has been transmitted to the station after the last character in the message has been sent by the station, the station will transmit a "load stop" level. This level will enable the delayed AND gate DA7 to insert a stop bit into the stop flip-flop S–AFF at the trailing edge of the next 0.3 microsecond pulse. This operation is also carried out without effecting an information shift in the buffer. When the stop bit is inserted in this manner, a "stop" character consisting of seven logical 0 bits and the logical 1 stop bit is stored in the central buffer, which will be transmitted to the translator in the manner described below to step it to its next operational mode.

The buffer shift pulses are provided by the output of an OR gate OR13. The output of this gate is connected through an inverter I42 to the pulse inputs of the delayed AND gates DA6 and DA8, and to the pulse inputs of the synchronous flip-flops CBFFP, CBFF1, CBFF2, CBFF4, CBFF8, CBFF16, and CBFF32.

The OR gate OR13 may be operated, either in time with the external information source, as provided by B-shift pulses sent from the translator, or in station time provided by an AND gate A52. The AND gate A52 receives 0.3 microsecond clock pulses, and the output of an OR gate OR14.

The OR gate OR14 is operated in the "internal unload," "internal load," and "external unload" modes of the central buffer system. Negative input levels corresponding to these functions are provided by the inverters I43, I44 and I45, in response to positive levels applied to these inverters.

It will be noted that an inverter I46 is provided to convert the positive 0.3 microsecond pulses to negative pulses for operation of the delayed AND gates DA5 and DA8. The purpose of this construction is to enable the delayed AND gates to operate on the trailing edges of the 0.3 microsecond pulses.

Information may be supplied to the central buffer either from the translator or from a station which has the buffer in its possession. This information is supplied by an OR gate OR16 shown in FIG. 17*a*. This OR gate receives negative levels representing information from a station and external information from the translator. It also receives a "clear" negative level when the central clear switch, to be described, is depressed.

The output of the OR gate OR16 is supplied to an AND gate A55, to which a "not clear" level is also applied from the inverter I57. The purpose of this construction is to permit the depression of the central clear switch to clear the buffer without introducing any extraneous logical 1's.

The output of the AND gate A55 is supplied through an inverter I49 to the positive level input terminal of the delayed AND gate DA8. A complementary input to the level input terminal of the delayed AND gate DA6 is supplied through an inverter I48 from the output of the OR gate OR16. With this arrangement, the input to the delayed AND gate DA8 is inhibited when the central buffer system is not in a clear status, and at other times complementary inputs are provided to the gates DA6 and DA8 either by a station or by the translator.

The output of the central buffer may be channeled to either the translator or a selected station. The station information is supplied from the logical 1 output terminal of the flip-flop CBFF1 through an AND gate A54, which has one input terminal connected to the logical 1 output terminal of the flip-flop CBFF1, and a second input terminal energized by a "B-received" level, which is sent from the translator when it is in condition to receive information from the central buffer system.

The output of the AND gate A54 is supplied, through a delayed emitter follower DEF6, to the translator.

The proper information channel from the station which has the buffer in its possession is selected by an OR gate OR18. Each station information line, such as the information line from the station N labeled "INFO N," is connected to one input terminal of the OR gate OR18 through an inverter such as the inverter I52.

The output of the OR gate OR18 is supplied to one input terminal of an AND gate A61, the input terminal of which is supplied by a ground level representing "internal load buffer gate." The output of the AND gate A61 is supplied to an input terminal of the OR gate OR16.

External information from the translator is applied to the OR gate OR16 from an AND gate A53, which receives external information from the translator and is enabled by a ground level representing "external load buffer gate."

One of the lines extended to the translator of FIG. 23 is identified as a line A, which is supplied with either levels or pulses to perform various functions in the translator. When the central buffer system has a character which it desires to send to the translator, a level identified as "send first A" is applied through an OR gate OR17 to an AND gate A59. Except during the depression of the central clear switch, this AND gate is open, and supplies a negative level through an inverter I53 to provide a positive "A gate" signal, which is gated, in a manner to be described in connection with FIG. 17*c*, to the translator.

When a character is being transmitted to the translator, strobe pulses for the character code 1 or 0 level pulses are provided by the AND gate A59 in response to a second input supplied to the OR gate OR17. These pulses comprise the 0.8 microsecond pulses supplied to an AND gate A60, and are emitted in response to a ground level supplied to one input terminal of the AND gate A60 by an OR gate OR15. As indicated in FIG. 17*a*, this or gate is enabled either by a "last internal unload buffer gate" pulse, or by an "external unload buffer gate" level.

Referring now to FIG. 17*b*, an additional group of circuits for performing timing functions in the central buffer system of my invention is shown. The first of these to be considered comprises the character-in-storage flip-flop CIS–AFF. This is an asynchronous flip-flop of the type described in connection with FIG. 13. This flip-flop provides a logical 1 ground level labeled CIS when there is a character in storage in the central buffer, and a logical 0 ground level $\overline{CIS}$ to indicate there is no character in storage in the central buffer.

The flip-flop CIS–AFF is set to its logical 1 level by a variety of conditions. Basically, the operation depends on whether the character has been received from a station or from the translator, and whether or not it is the last character. When a "send character" has been sent to the station, and the last character in the message has already been transmitted, a "load stop" level will be applied by the station to one input terminal of an OR gate OR19. As indicated for station N, the "load stop" level from that station is applied through an inverter such as the inverter I58 to form a negative level. The output of the OR gate OR19 is applied through an inverter I59 to one input terminal of an OR gate OR21. The output of the OR gate OR21 is applied to the level input terminal of the delayed AND gate DA11, and this AND gate produces a positive output pulse at the trailing edge of the next 0.3 microsecond clock pulse. This positive pulse sets the flip-flop CIS–AFF to its logical 1 level.

If the character is a character in the message sent from the station, an input is provided to the OR gate OR21 by an AND gate A70. This AND gate is enabled in the $9_8$ time following the receipt of an "internal load buffer gate" level from the station having the buffer in possession. This level is provided by an OR gate OR22, which receives inputs from all of the stations. As shown for station N, this input is provided through an inverter such as I60 to provide a negative level indicating "internal load buffer gate" for station N.

In the case of a character received from the translator, the input for setting the flip-flop CIS–AFF to its logical 1 state is provided by a delayed AND gate DA10. This AND gate is provided with a setting pulse by a negative pulse B*p* which is produced at the output of a triggered blocking oscillator TB3 in response to a "B" pulse or level provided from the translator. The second input to the delayed AND gate DA10 is provided by an invetrer I63 from an AND gate A71. This AND gate is enabled by the eighth count of a counter, to be described, which is stepped by the strobe pulses provided with the information pulses from the translator. A second input to the AND gate A71 is provided by an "external load buffer gate" level from an inverter I62. This inverter is supplied with a negative level from an AND gate A69. The AND gate A69 is enabled when the flip-flop CIS–AFF is in its $\overline{CIS}$ state and a "receive" level is received from the central program counters.

The character-in-storage flip-flop CIS–AFF is reset by a pulse appearing at the trailing edge of a 0.3 microsecond pulse applied to a delayed AND gate DA9 in the presence of a ground level supplied from an OR gate OR20. This OR gate has two input terminals, the first comprising a negative level signifying "last internal unload buffer gate" and a second comprising the output of an AND gate A74. The inputs to the AND gate A74 are a ground level representing the eighth count of the station counter, to be described, which is received when the last strobe pulse for an information character is received. The second input to the AND gate A74 is an "external unload buffer gate" level, to be described.

The "last internal unload buffer gate" level is supplied to the OR gate OR20 by an AND gate A73. This level is formed in $9_8$ time by an "internal unload buffer gate" level supplied from one of the stations through an OR gate OR23. As indicated for station N, this input is provided through an inverter such as the inverter I65.

Next, the "B received" flip-flop BRFF will be described. This is a synchronous flip-flop of the type described in connection with FIG. 13. The level for setting this flip-flop to logical 1 is provided through an inverter I69 from an OR gate OR65. One input to this OR gate is labeled "send first A," which signifies that the central buffer system is prepared to transmit a character to the translator. The second input is provided by a level representing the "transmit" mode of operation of the central buffer system, which is provided through an inverter I68 from the central program counter, to be described.

The "B received" flip-flop is set to its logical 1 level at the trailing edge of the B*p* pulse received from the translator. The effective pulse is produced in response to a level supplied on a line B from the translator to a triggered blocking oscillator TB3.

The "B received" flip-flop BRFF may be cleared by a clear pulse applied to its logical 0 output terminal through a diode, as shown. This pulse is generated when the central clear switch is depressed. A second resetting pulse for the B-received flip-flop comprises a 0.3 microsecond negative pulse, received from the central counters through an inverter 161, occuring at the same time as a ground level supplied through an inverter 167 from the output of the AND gate A74. This pulse is employed to reset the flip-flop at the end of the transmission of each character to the translator.

An external unload buffer flip-flop XUFF is also a synchronous flip-flop. When the central buffer system is put into operation by the depression of the central clear switch, this flip-flop is set to its logical 0 state through a diode connected to its logical 0 output terminal, as shown. The level setting input terminals of the flip-flop XUFF are connected to ground, so that pulses applied to their pulse responsive input terminals are sufficient to change the state of the flip-flop. A logical 1 setting pulse is applied from the output of flip-flop 1 PFF. The AND gate A67 receives as inputs the logical 1 output of the B-received flip-flop BRFF, the logical 1 output of the CIS-AFF, a 0.3 microsecond timing pulse, and an "operation 8" pulse level Op8 from an inverter I70.

The external unload buffer XUFF is reset by a pulse supplied from an AND gate A68. Thus pulse occurs at the 0.3 microsecond pulse time when the character in storage flip-flop CIS–AFF is in its logical 0 state.

As shown in FIG. 17*b*, an eight-state binary counter is provided comprising three synchronous flip-flops 1PFF, 2PFF and 4PFF. In a manner previously described, these flip-flops are interconnected by negative AND gates NA5 and NA6 to form a binary counter. Count pulses are provided for the counter through an inverter I73 from the output terminal of an OR gate OR24. This OR gate receives, as one input, "B-shift" pulses produced at the output of the triggered blocking oscillator TB3 and supplied through an inverter I66 to one input terminal of an AND gate A72. The other input terminal of the AND gate A72 is supplied with a positive level representing the "external load buffer gate" signal.

A second input to the OR gate OR24 is provided by the AND gate A67. This AND gate is effective to produce an output pulse when the "B received" flip-flop and the CIS–AFF flip-flops are in their logical 1 states, a 0.3 microsecond clock pulse is received, and an "operation 8" signal OP8 is received from the inverter I70.

A third input to the OR gate OR24 is provided by an AND gate A64. This gate produces its pulse when an "operation 8 not" signal is supplied to it and a central clear pulse is provided by the clear switch, to be described.

A fourth input to the OR gate OR24 is provided by an AND gate A63. This AND gate produces a pulse in response to $\overline{OP8}$, the 0.3 microsecond pulse, and a "transmit" level received from the central buffer system program counters through an inverter I71.

Selected outputs of the counter flip-flops 1PFF, 2PFF and 4PFF are connected to inputs of an AND gate A62 and an OR gate OR25. The AND gate A62 produces a negative level when the seventh count is received. The OR gate OR25 operates when any of the counter flip-flops is not in its logical 0 state, to indicate by the level OP8 that the eighth pulse has not been received.

Basically, the OR gate OR24 produces a count pulse when it is desired to time either the reception or the transmission of a character.

Referring next to FIG. 17*c*, I have shown the program counters for the central buffer system as comprising a pair of synchronous flip-flops MPC1 and MPC2. These flip-flops are interconnected by a negative AND gate NA7 to form a four-state binary counter.

The outputs of the counter flip-flops MPC1 and MPC2 are decoded in a group of AND gates A75, A76, A77, A78 and A79. The AND gates A75–A78 each produces an output in a different one of the states of the counter. Thus, the gate 75 is energized in the binary 0 state, and provides a negative "buffer possession gate" level. The AND gate A76 is energized in the 11 condition of the counter, and provides a negative "receive" level. The AND gate A77 is energized in the 10 state of the counter, and provides a negative "transmit" level. The AND gate A78 is energized in the 01 binary state, and provides a negative level identified as "ready A."

The AND gate A79 provides the buffer possession shift pulses for the common station buffer possession circuits. These pulses are timed by the 0.3 microsecond clock pulses, and are produced when the counter is in its binary 0 state. The output pulses are converted from negative to positive pulses by an inverter I78.

Count pulses are supplied to the binary counter flip-flops MPC1 and MPC2 by an AND gate A80, which has as one input the 0.3 microsecond timing pulses. The second input to the AND gate A80 is provided by an OR gate OR27.

In the normal cycle of operation of the central buffer system, assuming that the counter is in its binary 0 state, the first input to the OR gate OR27 is provided by a "stop search" level from the common station gates shown in FIG. 16*a*. This level is inverted in an inverter I79, and operates through the gate OR27 and the AND gate A80 to step the counter to its 01 state, identified as the "ready A" mode of operation. At the same time, the "buffer possession gate" level is turned off. In this mode of operation, an "A" level is sent to the translator, and is left on until a "B" level is received from the translator. This "B" level together with the "send first A" level is applied to an AND gate A81 to provide the second input level to the gate OR27 to step the counter to its 10 state. This is identified as the "transmit" mode of operation. During this time, the central buffer successively takes characters from the station in possession and then transmits them to the translator. This is continued until the last character is received from the station, at which time the station is sent a "send character" level and returns a "load stop" level. A "stop" character containing a 1 bit in the eighth position is then sent to the translator. When the "stop" character has been sent to the translator, a "transmit operation complete" level is supplied to the gate OR27 to step the counter to the 11 or "receive" state. The apparatus is maintained in this state until a message has been received from the translator and sent to the station in possession. When this has been accomplished, a "receive operation complete" level is supplied to OR gate OR27 which is applied to A80 to provide a 0.3 microsecond pulse. This pulse sets the flip-flops MPC1 and MPC2 from the 11 state to reset them to their 0 state, in which the "buffer possession gate" level is sent out and the search begins again for a station having a message to transmit.

The symbol generator possession shift pulses for the stations are provided by an AND gate A82 in FIG. 17*c* in response to timing signals in $7_7 9_9$ time occurring during the character 104 time. These timing signals are provided by the central counters. The output of the AND gate A82 is supplied through an inverter I80 to the stations. It is also supplied to an AND gate A83. This AND gate is energized during the closing of a central clear switch SCC, to provide a central clear pulse for use by the stations and the central buffer system.

As shown, the switch SCC is provided with a pair of contacts, one for supplying a "clear" pulse when the station is first put into operation, and one for energizing a relay CTR. The relay CTR is provided with a holding circuit which is maintained energized until the power supply is disconnected from the system, or fails. The "A" gate level is supplied over the A line to the translator over a front contact of this relay CTR, as shown.

The "send character" level is provided for transmission to the stations by an inverter I260 and an AND gate A84. The inverter I260 provides a positive level in the "transmit" state of the central buffer system. The AND gate A84 is operated by the inverter I260 when there is no character in storage, as indicated by the $\overline{CIS}$ input. The output of the AND gate A84 is supplied through an inverter I74 to the stations.

Referring now to FIG. 18, the central symbol generator will next be described. Symbol generator information from the stations in the form of the character codes for the set of characters to be displayed is supplied to the symbol generator by an OR gate OR30, which responds to the symbol generator information provided by any of the stations. As indicated in FIG. 18, this OR gate may simply comprise a plurality of transistors with their collectors connected together, their emitters grounded, and their bases returned to a positive potential through suitable resistors. In response to a ground level logical 1 applied to any base, it will cause conduction, bringing the collector of the transistor, and thus the collectors of all of the other transistors, to ground level.

In formation from the OR gate OR30 is supplied to a shift register comprising six synchronous flip-flops 1SFF, 2SFF, 4SFF, 8SFF, 16SFF and 32SFF. The output of the OR gate OR30 is directly connected to the set 1 input level terminal of the flip-flop 32SFF, and is supplied through an inverter I81 to the set 0 input level terminal.

The pulses for shifting information from the OR gate OR30 to the shift register are provided by an AND gate A101, which is supplied with 0.3 microsecond timing pulses, and with a ground level during the $7_1$ time but not including the $9_7$, $9_8$ or $9_9$ times. Thus, six shift pulses are supplied during each $7_1$ time, and the information entered into the flip-flop 32SFF is then placed in the flip-flop 1SFF by the sixth shift pulse occurring at the $9_6$ time.

The shift pulses are also supplied through an inverter I82 to one input terminal of an AND gate A103. This AND gate has a second input terminal connected to the output terminal of the OR gate OR30. Thus, a pulse is provided by the AND gate A103 for each decoder shift pulse in which a 1 bit was in the character sent from the station. The output of the AND gate A103 is connected to the pulse input terminals of an odd flip-flop OFF. This flip-flop is of the synchronous type described in connection with FIG. 13, and has its level input terminals connected to its opposed logical output terminals. Thus, if the flip-flop OFF is in its even state, with a ground level appearing at the upper left hand output terminal, it is in condition to be set to the odd state on the next decoder shift pulse. However, this will only happen if there is a 1 at this time in the information code pulse sequence. At the end of the sixth decoder shift pulse, the odd flip-flop OFF thus indicates whether the number of 1's in the information portion of the character is odd or even. This information is used as a parity check. As shown, the odd output of the flip-flop OFF is connected to one input terminal of an AND gate A104. The other input terminal of the AND gate A104 is connected to the output of the OR gate OR30. The even output terminal of the flip-flop OFF is connected to one input terminal of an AND gate A102, and another input terminal of the AND gate A102 is connected to the output of the inverter I81. The outputs of AND gates A102 and A104 are connected to the input terminals of an OR gate OR28. The output of the OR gate OR28 is connected to one input terminal of an AND gate A105. The second input terminal of the AND gate A105 is energized by a level applied during the $7_19_7$ time. With these connections, it will be apparent that if the flip-flop OFF is in its odd state when a seventh pulse, comprising the parity bit, appears as the logical 1, the gate A105 will produce an output pulse. Similarly, if the flip-flop OFF is in its even state and no parity bit is received during the $9_7$ time, the gate A105 will produce an output pulse. Since either of these events represents an even parity condition that signifies an error in the message, the output of the AND gate A105 represents a parity error. This output is applied through an inverter I83 to the set 1 input terminal of an asynchronous flip-flop P-AFF, and is connected directly to the set 0 input. Thus, if a character is received which has an error in parity, a parity error level is applied to one input terminal of an OR gate OR29 for purposes which are to appear.

At the end of the $7_1$ time, all of the bits in the character are stored in the shift register comprising the flip-flops 1SFF–32SFF. The outputs of these flip-flops are connected to a character decoder, comprising a plurality of gates shown in FIG. 18. Basically, these gates respond to the character code by energizing one and only one of a group of lines, one for each character, with a ground level. In the example here illustrated, the available characters comprise the numerals from 0 to 9, the letters A, B, and C, and a period and a space indication.

The outputs of the character decoder are each applied to one input terminal of an AND gate of the group A86–A100. A second input to each AND gate is supplied by a video encoder, shown in detail in FIG. 20. This encoder is provided with thirty-five input wires, which are energized in succession in times beginning at time $7_39_1$ and continuing through time $7_79_7$. Thus, at each $9_1$ through $9_7$ in the region from $7_3$ to $7_7$, one of these lines will be energized. The lines are interconnected within the encoder to video output lines, one for each character to be displayed. The connection is such that on each line there is generated, beginning with the $7_39_1$ time, the video signal for the character to be represented.

The one of AND gate A86–A100 which is enabled by the character decoder will supply its video signal to an OR gate OR29. Should a parity error exist, however, the OR gate OR29 will be continuously energized, and will provide an uninterrupted stream of logical 1's to the cathode ray tube video amplifier 61. The result of this signal will be the display of a bright rectangle, occupying the space allotted by a character. This display will notify the operator visually that there is an error in the character.

Referring next to FIG. 19, the principle of operation and the mode of construction of the character decoder CD1 shown in FIG. 18 will next be described. As indicated, the character decoder 1 comprises a plurality of six-input AND gates. The manner in which the AND gates for the characters corresponding to the numerals 0 and 1 and the letter C are wired is shown in detail, and the manner in which other AND gates for the characters representing the numerals from 2 through 9, the letters A and B, and the period and comma indications are wired will be apparent from the description of those shown.

The code for the numeral 0 is taken as binary 0, or 000000. The AND gate A106 has its input terminals connected to ones of the logical 1 and the logical $\bar{1}$ terminals of the flip-flops 1SFF–32SFF in FIG. 18 to provide for its operation on this code sequence. Thus, the $\bar{1}$ terminal is connected to the gate A106, and the $\bar{2}$, $\bar{4}$, $\bar{8}$, $\overline{16}$, and $\overline{32}$ input terminals are also connected to this gate. In order to provide for proper output polarity, the output of the gate A106 is connected to the input terminal of an inverter I84. In a similar manner, the AND gate A107 is connected to respond to the input code for binary 1; that is, $\overline{32}$, $\overline{16}$, $\bar{8}$, $\bar{4}$, $\bar{2}$ and 1. Its output terminal is connected to an inverter I85. The AND gate A108 responds to the code for the space, here shown as the binary code 001111. Its output terminal is connected to an inverter I86. The remaining AND gates in the decoder CD1 are wired in the manner indicated by the corresponding code in the following table.

| Character | Code | Parity |
|---|---|---|
| 0 | 000000 | 1 |
| 1 | 000001 | 0 |
| 2 | 000010 | 0 |
| 3 | 000011 | 1 |
| 4 | 000100 | 0 |
| 5 | 000101 | 1 |
| 6 | 000110 | 1 |
| 7 | 000111 | 0 |
| 8 | 001000 | 0 |
| 9 | 001001 | 1 |
| A | 001010 | 1 |
| B | 001011 | 0 |
| C | 001100 | 1 |
| . | 001110 | 0 |
| Space | 001111 | 1 |

Obviously, the code shown is capable of representing a larger number of characters, and where a larger number is employed, additional gates will be provided connected in the manner dictated by the selected code for the characters to be employed. To make full use of the code illustrated, additional keys would be provided on the keyboard of the console unit, corresponding to additional characters. In this manner, up to 63 usable characters could be provided without increasing the length of the code.

Referring now to FIG. 20, the video encoder of FIG. 18 is shown to comprise a video distributor VD1 and a video encoder matrix VM1. The video distributor will be described in detail in connection with FIG. 21. For present purposes it is sufficient to note that it has an output comprising 35 lines, each energized at a specific one of the times from $7_39_1$ through $7_79_7$. As shown, only the $9_1$ through $9_7$ times of each 7 time are represented, since the $9_8$ and $9_9$ times are the periods corresponding to the vertical fall time of the vertical sweep voltage on the station console display tubes. Thus, the lines associated with the time $7_3$, for example, comprise seven lines energized at different ones of the times from $7_39_1$ to $7_39_7$. The distributor VD1 functions to sequentially energize these lines at the appropriate times.

The video encoder matrix VM1 comprises a conventional matrix, which may be a resistor matrix or a diode matrix or other suitable network suitable for gating pulses appearing on the lines provided by the distributor to selected ones of a plurality of output lines. As shown, the output lines are designated by the numerals from 0–9, the letters A, B, and C, and a period and comma line. Each of these lines receives pulses at the proper times to generate the display of the associated character.

In effect, each of the output lines is connected to a selected group of the input lines by an OR gate. In practice, for example, each of the input lines such as the input line $7_79_7$ may be connected to ground through a suitable load resistor R25. Similar resistors would be connected to the other input lines, but have been omitted for the sake of clarity. Each of the circles joining one of the input lines to one of the output lines represents a logical OR connection to the output line, which may be made by any suitable isolating device such as a resistor R26, shown connected between the input line $7_79_6$ and the output line for the character C. A diode may also be employed instead of the resistor R26 if so desired. It will be apparent that at any time when an input line is energized that is connected to one of the output lines, in the manner diagrammatically indicated by the circle at their intersections, a pulse of energy will appear on the output line. For example, the output line for the letter C is energized at the times $7_39_2$, $7_39_3$, $7_39_4$, $7_39_5$, $7_39_6$, $7_49_1$, $7_49_7$, $7_59_1$, $7_59_7$, $7_69_1$, $7_69_7$, $7_79_2$, and $7_79_6$. The resulting character display is shown in FIG. 9.

Referring next to FIG. 21, the distributor BD1 is shown to comprise 5 groups of 7 2-input AND gates. Each of the AND gates of each group has one input terminal connected to a line which is energized at a particular one of the 7 times $7_3$ through $7_7$. Each of the AND gates of each group also has a second input terminal connected to a line which is energized at a particular one of the 9 times from $9_1$ through $9_7$. As a specific example, each of the AND gates A109–A115 have one input terminal energized at the $7_3$ time, and each has one input terminal energized by one of the lines energized at the times $9_1$ through $9_7$. In this manner negative output pulses corresponding to the times $7_39_1$, $7_39_2$, $7_39_3$, $7_39_4$, $7_39_5$, $7_39_6$, and $7_39_7$ are generated. It is believed that the manner in which the other pulses are generated by the distributor VD1 will be apparent from the description of the manner in which the pulses from $7_39_1$ through $7_39_7$ are generated.

Referring next to FIG. 22, a central counter for the central buffer system of my invention will next be described. As shown, the basic clock rate of the system may be established by an oscillator OSC1, of any suitable conventional construction, which is constructed to produce an alternating voltage having a frequency of, for example, 655 kc. per second. The output signal from the oscillator OSC1 is applied through a suitable coupling capacitor C11 to a squaring circuit such as a Schmidt trigger ST1. This squaring circuit may be of the well known type shown for example in FIG. 205 on page 210 of TM11–690, Basic Theory and Application of Transistors, published in March 1959, by Headquarters, Department of the Army. The purpose of this circuit is to provide a rectangular train of pulses at a repetition rate corresponding to the frequency of the oscillator OSC1. These pulses, which are negative with respect to ground, are differentiated in a differentiator comprising a capacitor C14 and a resistor R27. A train of positive pulses corresponding to the trailing edge, and negative pulses corresponding to the leading edge, of each rectangular pulse supplied by the Schmidt trigger ST1 thus appears across the resistor R27. The negative pulses are supplied through a diode D5 to a monostable multivibrator MV1, of any suitable conventional construction. For example, this multivibrator may be of the type shown in FIG. 194 on page 200 of the above-cited TM11–690. This circuit functions to provide a negative output pulse, of a duration controlled by the circuit constants selected, at each applied negative trigger pulse. The multivibrator MV1 has its circuit constants selected to supply negative output pulses of 0.2 microsecond duration, at a repetition rate of 655 kc. per second. These pulses are differentiated in a differentiator comprising a capacitor C15 and a resistor R28. A negative pulse corresponding to the leading edge, and a positive pulse corresponding to the trailing edge, of each 0.2 microsecond pulse therefore appears across the resistor R28. The negative pulses are supplied through a diode D9 to a monostable multivibrator MV2, which may be the same type as the monostable multivibrator MV1 except that its circuit constants are selected to provide output pulses of 0.3 microsecond duration. These pulses may be used directly as the positive 0.3 microsecond clock pulses in the system of my invention, and are applied through an inverter I88 to supply negative 0.3 microsecond pulses for use in the system.

The positive voltage pulses appearing across the resistor R28 are supplied through a diode D10 and an inverter I87 to a monostable multivibrator MV3, which may be of the same construction described previously except that its circuit constants are selected to provide pulses of 0.1 microsecond duration. These pulses each occur in the last 0.1 microsecond of a corresponding 0.3 microsecond pulse.

The positive voltage pulses appearing across the resistor R27 are supplied through a diode D6 and an inverter I86 to a monostable multivibrator MV4, which may be the same as those previously described except that it has its ciruit constants selected to provide an output pulse of 0.8 microsecond duration. Each pulse from this multivibrator occurs following a corresponding 0.3 microsecond timing pulse, as shown in FIG. 11*b*.

The 0.3 microsecond negative pulses from the inverter I88 in FIG. 22 are supplied to step a shift register comprising nine synchronous flip-flops 9FF–1 through 9FF–9. These flip-flops are interconnected to form a shift register in the manner described for the symbol generator possession shift register shown in FIG. 16*a*. The logical 0 output terminals of each of the flip-flops except 9FF–9 is connected to one input terminal of an OR gate OR31. The output of this OR gate is connected directly to the logical 0 set input terminal of the flip-flop 9FF–1, and is supplied through an inverter I85 to the logical 1 set input terminal of this flip-flop. The purpose of this arrangement is to cause a logical 1 to circulate through the flip-flops, going from 9FF–1 to 9FF–2, and so on to 9FF–9, and then back to the flip-flop 9FF–1. Assuming for the purposes of illustration that all of the flip-flops are initially in their logical 0 states, the logical 0 output terminals of each of the flip-flops 9FF–1 through 9FF–8 will be at ground potential, so that the OR gate OR31 will produce no output. Accordingly, the inverter I85 will have its output terminal at ground potential, and at the first 0.3 microsecond timing pulse, the flip-flop 9FF–1 will be set to logical 1. When this occurs, a negative potential will be applied from the logical 0 output terminal of the flip-flop 9FF–1 to one input terminal of the OR gate OR31, causing the flip-flop 9FF–1 to be reset to its logical 0 state at the next shift pulse. At the same time, the flip-flop 9FF–2 will be set to its logical 1 state. This action will continue until a logical 1 is stored in the flip-flop 9FF–9. At this time, there will be no input to the OR gate OR31, and the next shift pulse will shift a 0 into the flip-flop 9FF–9 and a 1 into the flip-flop 9FF–1.

When the flip-flop 9FF–9 is shifted into its logical 1 state, its logical 1 output terminal goes from a negative potential to ground, and this change of voltage is applied to the AND gate A which has the 0.3 microsecond clock pulse applied to the other input terminal. The output of $9_9$ (0.3) is used to step a sevens-counting shift register comprising seven synchronous flip-flops 7FF–1 through 7FF–7. These flip-flops are interconnected to form a shift register in which a logical 1 is continuously circulated in the same manner as the nines-counting register. For this purpose, the logical 0 output terminals of the flip-flops 7FF–1 through 7FF–6 are connected to the input terminals of an OR gate OR32. The output terminal of this OR gate is connected directly to the logical 0 setting input terminal of the flip-flop 7FF–1, and through an inverter 189 to the logical 1 setting input terminal of this flip-flop. Thus, at the tenth 0.3 microsecond pulse, the flip-flop 7FF–1 will be set to its logical 1 state. Thereafter, each of the succeeding flip-flops in the shift register will be set to logical 1 while the preceding one is set to logical 0.

The output terminals of the flip-flops comprising the 9's counting shift register and the 7's counting shift register are used to supply the timing pulses corresponding to the respective 9 times and 7 times indicated adjacent the respective terminals. The logical 1 or logical 0 output terminal of each flip-flop may be employed for this purpose, depending on the polarity of the desired level.

The transition of the flip-flop 7FF–7 from its logical 0 to its logical 1 state is employed to produce a positive level which is supplied to AND gate A*b* which has the pulse $9_9$ (0.3) applied on its other terminal to produce a $7_7 9_9$ (0.3) output to step a character counter comprising seven synchronous flip-flops CFF1, CFF2, CFF4, CFF8, CFF16, CFF32, and CFF64. These flip-flops are interconnected, in the manner previously described, by negative AND gates NA116 through NA121, to form a binary counter.

The output terminal of the flip-flops CFF1–CFF64 are connected to AND gates A122 and A123. Seven input AND gates are provided, which are connected to the appropriate output termnials of the flip-flops CFF1–CFF64 to cause an output to be produced when the count corresponding to the particular function is reached. As shown, the output terminals of the flip-flops are indicated by the letters BC followed by a number corresponding to the binary order of the counter flip-flop, and barred or not accordingly as the terminal represents the 0 or 1 state, respectively, of the flip-flop.

The output or AND gate A122 is used for several functions. It sets the flip-flop VSFF to its logical state of 1. This sets the trace into the upper line 1 as shown in FIG. 5. Also, the output is gated by A82 in FIG. 17*c* with $7_7 9_9$ to form the SGP shift pulse. Also, this gate output is used to trigger the horizontal sweep of line 1 in FIG. 5.

The output of the AND gate A122 is used elsewhere in the system as previously described, but is also used to reset the character counter when the counter is in its binary 103, or character 104 state. For this purpose, the output of the AND gate A122 is applied through an inverter 189. The output of inverter 189 clears all of the flip-flops by applying a positive pulse through diodes connected to their logical 0 output terminals, as shown.

The output of the AND gate A123 is used to reset the flip-flop VSFF to its logical state of 0 and move the sweep presentation to lower line 3 in FIG. 5. The output level of AND gate A123 is used to trigger the horizontal sweep line 3, FIG. 5. The inputs of this gate are shown in a 50 character setting, however, the connections may be changed for shorter line of character in the top line of the presentation.

The central counters of FIG. 22 also comprises a group of special timing gates, which are provided to recognize specific time groupings for particular gating functions in the system. The manner in which these combined timed signals are formed is believed to be sufficiently apparent from the previous discussion of gating, together with the following detailed description of the manner in which the negative level representing times $7_1$ and $9_{1-6}$, which may be represented logically by $7_1(\overline{9_8+9_9})$. This level is provided by an AND gate A126. One input terminal of the AND gate A126 is supplied by the logical 1 output terminal of the $\mathbf{7_1}$ flip-flop 7FF–1. The other input terminal is connected to the output terminal of an OR gate OR32, which forms the level $(\overline{9_8+9_9})$ in response to negative levels supplied at times other than $\mathbf{9_8}$ and $\mathbf{9_9}$ by the logical 1 output terminals of the flip-flops 9FF–8 and 9FF–9, respectively. In a similar manner, the level $\mathbf{7_1 9_8}$ may be formed by an AND gate to which the $\mathbf{7_1}$ and $\mathbf{9_8}$ levels were supplied, and so on.

Referring next to FIGS. 23*a* and 23*b*, I have shown a typical translator for use with the system of my invention which is adapted to cooperate with an information source of the class which comprises apparatus for supplying information from a memory output register in response to a request for the information from a memory address register. Such systems are normally complicated by requirements for specific voltages, codes, mode of transmission of information, and various other detailed matters which it is unnecessary to consider in order to understand my invention, and which are readily taken care of in practice. For simplicity, although my system is by no means limited to a message of any particular length, I have shown this information source in FIG. 23*b*, as a computer adapted to receive a two-character message, one in each of the two memory address registers X and Y. These characters X and Y may be thought of either as numbers to be operated upon mathematically to produce an answer, or as the coordinates of the address of a register in the computer or in a storage system which will send its contents to the output register in response to the address coordinates. The computer is shown as comprising a memory output register which stores a two-character response. These registers may comprise individual flip-flops for each bit in the character to be stored, and these are to be assumed to be set, reset, and cleared in the manner described previously for various flip-flops used in the system of my invention. In addition to the memory address registers and output register, the computer is assumed to be provided with a clock oscillator for producing its own timing signals. These signals are used in the translator of my invention when it is necessary to synchronize with the computer. Also, the computer is assumed to be provided with a line which is energized when a reply or answer to a request for information is available, and to have input and output register clearance circuits provided for actuation in response to a voltage pulse supplied to it by a "reply received" line. While the assumption that the computer language is the same as the code used in the system of my invention, and that the computer receives and delivers information in parallel form, greatly simplify the circuits, it will be apparent that any other computer language could be dealt with by simply providing a conventional code converter and that the translator of my invention could equally well supply and receive information to and from the information source in serial form.

The translator itself comprises a shift register for storing information, a number of programming counters, and various gates, which will next be described. Referring to FIG. 23*a*, the storage register for the translator unit comprises eight synchronous flip-flops TFFS, TFFP, TFF32, TFF16, TFF8, TFF4, TFF2 and TFF1. The numbered flip-flops from TFF1 to TFF32 are adapted to store the correspondingly ordered bits of a binary code representing a character. The flip-flop TFFP is employed to store a parity bit indication. The flip-flop TFFS is employed to store a stop bit which is provided in the last character of a message which is sent or received.

The flip-flops TFF1–TFF32, TFFP and TFFS are interconnected to form a shift register in a manner previously described. Additional connections are made from an OR gate OR35 through isolating diodes to the logical 0 output terminals of each flip-flop, to reset them to 0 at prescribed times. Additional connections are made to the logical 1 output terminals of each flip-flop to set these flip-flops in parallel in response to an output received from the output register of the computer. Thus, the gates OR39–OR45 are connected to the 1 output terminals of the flip-flops TFF1–TFF32, and TFFP, respectively, through isolating diodes, such that when one of these gates produces an output, the corresponding flip-flop is set to logical 1.

The shift register is provided with a shift line connected to the output terminal of an OR gate OR33. This OR gate is energized upon the receipt of information from the central buffer system by the output of an AND gate A127, which receives a level labeled RFF from the logical 1 output terminal of a flip-flop RFF (FIG. 23*b*) in the "receive-from-central-buffer" mode of operation of the translator. This gate A127 also has an input terminal connected to a line labeled A from the central buffer system, which is energized at times by a series of strobe pulses corresponding to bits of a character transmitted to the translator, and which at other times may carry a steady voltage signifying that the central buffer system is ready to transmit information to the translator.

Character information from the central buffer system is supplied to the shift register by an information line to the translator which is directly connected to the set input terminal of the stop flip-flops TFFS and connected through an inverter I90 to the reset input terminal. Information is supplied from the logical 1 output terminal of the flip-flop TFF1 over an information line to the central buffer system when a message is being sent from the translator to the central buffer.

The translator is provided with a clear switch TC1, which comprises a spring-returned switch which is momentarily depressed at the beginning of operations to initially clear the system. This switch has its terminals connected between a negative voltage source −E and an input terminal of the OR gate OR35. A second input terminal of the OR gate OR35 is provided by a line energized by a level labeled "clear I" from a delay unit DE1 (FIG. 23*b*).

The fourth line extending between the translator of my invention and the central buffer system is a line labeled B, which extends from the output terminal of an OR gate OR34 to the central buffer system. This OR gate has three input terminals, one labeled "reply clock," which is energized at times with strobe pulses coinciding with information pulses of a character sent from the translator to the central buffer system; a second line energized by a level labeled "send first B" which is energized when the translator is ready to receive a message from the central buffer system; and a third input terminal energized when an AND gate A128 produces an output pulse. The AND gate A128 has three input terminals. The first comprises a line connected to the logical 0 output terminal of the stop flip-flop TFFS, and is energized with ground potential when the stop flip-flop is in its logical 0 state. The second input terminal of the gate A128 comprises a level labeled RFF, corresponding to the logical 1 output terminal of a flip-flop RFF, to be described. The third input terminal of the gate A128 comprises a line energized by a level identified as "send second B," produced as will be described below.

The logical 1 output terminals of the flip-flops TFF1 through TFF32 and TFFP are each connected to a pair of AND gates providing access to the X address register and the Y address register of the computer. As shown, there is an X gate and a Y gate for each bit of the character and for the parity bit. Thus, the AND gate AX1 is provided to direct the 1 bit of a stored message to the X address register of the computer, and AND gate AY1 is provided to direct the 1 bit of a character to the second or Y address register of the computer. While only two characters are shown, it will be apparent that additional characters could be sent to appropriate address registers in the computer if so desired by simply duplicating the same apparatus.

An inquiry counter is provided for the translator of my invention which comprises three synchronous flip-flops IC1FF, IC2FF and IC4FF, interconnected in a manner previously described to form a binary counter. This counter is stepped by shift pulses from the OR gate OR33, and produces a carry pulse at the end of each eighth shift pulse. This pulse indicates that a complete character has been received by the translator, and is employed to perform various functions in the system.

Referring now to FIG. 23*b*, the translator of my invention is provided with a programming unit comprising four synchronous flip-flops IDFF, RFF, R1FF and R2FF. These flip-flops are interconnected to form a shift register. As shown, the level input terminals of the flip-flop IDFF are connected with the reset input terminal connected to ground and the set input terminal connected to a negative potential. Thus, an applied shift pulse can only shift it to the logical 0 state. The other flip-flops have their input terminals connected to the output terminals of the preceding flip-flops in such a manner that upon the application of a shift pulse, these flip-flops are each set to the state of the next preceding flip-flop. Shift pulses for the programming shift register are provided by a series of AND gates A131, A132 and A133, and an OR gate OR37. The AND gate A131 has two input terminals. The first is connected to the A line from the central buffer system. The second input terminal is connected to the logical 1 output terminal of the idle flip-flop IDFF. The output of the AND gate A131 is applied to a delay unit DE7 to produce a negative level labeled "send first B," which is used in a manner to be described to signal to the central buffer system that the translator is ready to receive the first character in a message. This output is also applied to the OR gate OR37 to step the programming shift register from its "idle" state to its "receive-from-central-buffer" state in which the flip-flop RFF is in its logical 1 state.

The AND gate A132 has three input terminals. The first is connected to the logical 1 output terminal of the receive flip-flop RFF. The second is connected to the logical 1 output terminal of the stop flip-flop TFFS. The third is connected to receive a carry pulse from the inquiry counter at the eighth count. Thus, this gate produces an output when the translator is in condition to receive a message from the central buffer system and the "stop" bit of the last character of such a message has been received. The output of this gate is a pulse which is applied to the OR gate OR37 to shift the programming shift register to the state in which the flip-flop R1FF is in its logical 1 state. In this state, the translator is in condition to receive the first character of a reply message from the computer.

The output of the AND gate A132 is also employed to provide a clear signal for the character storage register comprising the flip-flops TFF1 through TFF32, TFFP and TFFS. This signal is provided a delayed time after the reception of the stop character from the central buffer system in order to allow time for the flip-flop R1FF to be set to its logical 1 state. To provide the necessary delay, I have shown a delay unit DE1 which may be considered typical of the other similar delay units to be described. This unit comprises a differentiator consisting of a capacitor C18 and a resistor R29. This differentiator produces a negative pulse across the resistor R29 at the leading edge of the output pulse of the gate A132, and a positive pulse corresponding to the trailing edge. The negative pulse will have no effect on the system, but the positive pulse is inverted in an inverter I91, to produce a negative trigger for the actuation of a monostable multivibrator MV5, which may be the same as those previously described, except that its circuit constants are selected to provide a negative output pulse of sufficient duration to insure the completion of the setting of the flip-flop R1FF and the resetting of the flip-flop RFF. The output pulse from the multivibrator MV5 is differentiated and inverted forming a delayed negative trigger, which is applied to the OR gate OR35 to set the character storage shift register to its 0 state.

A third input to the gate OR37 is provided by the AND gate A133. This gate has two input terminals, a first being connected to the logical 1 output terminal of the flip-flop R1FF, and a second terminal being connected to receive a carry pulse from a reply counter, to be described. As will appear, this gate produces an output pulse when the last bit of the first reply character has been transmitted from the translator storage register to the central buffer system. This pulse is applied through the OR gate OR37 to step the programming shift register to the state in which the flip-flop R2FF is in its logical 1 state, in which condition the translator is ready to receive the second character of a reply message from the computer.

The translator also comprises an X–Y register consisting of two flip-flops XFF and YFF. The states of these flip-flops are employed in the translator of my invention to direct a character stored in the translator storage register to either the X address register or the Y address register of the computer. The flip-flops XFF and YFF are basically connected to comprise a shift register, and are additionally provided with connections between the logical 1 output terminal of each flip-flop and the logical 1 level set input terminal of the other flip-flop.

A shift line is provided for the register which is connected to a terminal energized by a level identified as "send second B," produced as will be described. The level "send first B" provided by the AND gate A131, is inverted and is connected to the logical 1 output terminal of the flip-flop XFF through a suitable isolating diode, and to the logical 0 output terminal of the flip-flop YFF through a second isolating diode, as shown. Thus, when the level "send first B" is received, the flip-flops will be set with the XFF flip-flop in its logical 1 state, and the flip-flop YFF in its logical 0 state. When the level "send second B" is received, these states will be reversed.

The logical 1 output terminal of the flip-flop XFF is connected to one input terminal of an AND gate A130. A second input terminal of this AND gate is connected to receive the carry pulse from the inquiry counter comprising the flip-flops IC1FF–IC4FF. The logical 0 output terminal of the stop flip-flop TFFS is connected to a third input terminal of the gate A130. The output of the gate A130 is labeled "X address" and used to actuate the X set of AND gates at the output of the character storage register, to direct the contents of this register to the X address register of the computer.

The logical 1 output terminal of the flip-flop YFF is connected to one input terminal of an AND gate A129. The second input terminal of this AND gate is also connected to receive the carry pulse from the inquiry counter. The output of the gate A129 is labeled Y address, and is applied to enable the Y AND gates at the output of the character storage register of the translator, to channel the contents of the translator storage register to the Y address register of the computer.

The carry pulse from the inquiry counter is also employed to actuate a second delay unit DE2, which forms a level "send second B" a delayed time after the second character of a message has been received to allow time for this character to be transferred to the Y address register of the computer. It will be apparent that other address registers could be supplied by a simple extension of the same procedure.

The programming shift register is cleared by an OR gate OR38 having its output terminal connected through suitable isolating diodes to the logical 0 output terminals of each of the flip-flops RFF, R1FF and R2FF, and to the logical 1 output terminal of the idle flip-flop IDFF. Thus, an output pulse from the gate OR38 will step the programming register to its idle state. The gate OR38 is provided with two input terminals. The first is energized by a negative voltage upon closing of the clear switch TC1. The second input terminal is connected to the output terminal of an AND gate A139. This gate has two input terminals. The first is connected to the logical 1 output terminal of the flop-flop R2FF, and the second is connected to the carry pulse output terminal of the reply counter, to be described. The gate A139 produces an output pulse to reset the programming shift register in its idle state when the translator is in condition to receive the second character from the computer and the last bit of this character has been transmitted to the central buffer system.

The reply counter of the translator of my invention comprises three flip-flops RC1FF, RC2FF, and RC4FF. These flip-flops are interconnected to form a binary counter in a manner previously described. The logical 1 output terminal of the flip-flop RC4FF produces a negative-going pulse in the transition from the logical 1 state to the logical 0 state, which is used as previously described to produce various gating levels in the translator.

The B line to the central buffer system is energized by an OR gate OR34. This OR gate receives a first input in the form of a reply clock, which constitutes strobe pulses for characters sent from the translator storage register to the central buffer system. A second input to the OR gate OR34 is the level "send first B," formed as previously described. A third input to the gate OR34 is provided by an AND gate A128. This gate has three input terminals. The first is connected to the line energized by the "send second B" level, previously described. The second input terminal is connected to the logical 1 output terminal of the receive flip-flop RFF. The third input terminal is connected to the logical 0 output terminal of the stop flip-flop TFFS, indicating that there is no stop bit in the last character received. Thus, the gate A128 will produce output pulses after each character has been received from the central buffer system and transmitted to the computer, to signal to the central buffer to send another character until the last character in the message has been received.

The reply clock pulses for transmission to the central buffer system are provided by an AND gate A136. This gate has one input terminal connected to the output terminal of the computer clock pulse generator. If the computer does not have its own clock, a suitable clock oscillator may be provided for the translator, or the central buffer system clock may be employed. The second input terminal of the gate A136 is provided by the logical 1 output terminal of a character-in-storage asynchronous flip-flop RC–AFF. This flip-flop is set to its logical 1 state a delayed time after the first character of a reply message from the computer has been stored in the translator storage register, and at least a delayed time after the second character of the reply message has been stored in the translator storage register and an A level has been received from the the central buffer system. For this purpose, I have provided an OR gate OR36 which has two input terminals, one energized by a delay unit DE4, of the type previously described, which has an input terminal to which a pulse C1 is applied when the first reply character is shifted into the translator storage register. A second input terminal of the gate OR36 is energized by the output of an AND gate A137.

One input terminal of the gate A137 is connected to the logical 1 output terminal of an asynchronous flip-flop C2–AFF. This flip-flop is set to its logical 1 state by a delay unit DE5, of the type previously described, in response to a pulse C2, which is supplied to gate the second character of a reply message to the translator storage register.

The second input terminal of the gate A137 is connected to the logical 1 output terminal of an asynchronous flip-flop A–AFF. This flip-flop is set to its logical 1 state by an AND gate A138 when the flip-flop R2FF is in its logical 1 state and a level on the A line is sent from the central buffer system requesting the second character in the reply message.

It will be apparent that the provision of the flip-flop C2–AFF and R–AFF, for the storage of the C2 pulse and the A level, respectively, makes it immaterial which signal occurs first in the operation of the system. Thus, any timing requirements that the computer or other information source employed may have do not impose timing requirements in the central buffer system of my invention.

The flip-flops RC–AFF, C2–AFF and A–AFF are all reset by the carry output pulse of the reply counter, as shown. Thus, the gate A136 emits eight reply clock pulses each time it is enabled.

The levels C1 and C2 for gating reply characters to the translator storage register are provided by a pair of triggered blocking oscillators TB5 and TB6. The blocking oscillator TB5, which may be of any suitable conventional construction, has an input terminal connected to the output terminal of an AND gate A134. This gate is provided with two input terminals, the first of which is connected to the logical 1 output terminal of the flip-flop R1FF, the second being connected to the logical 1 output terminal of an asynchronous "reply-ready" flip-flop RR–AFF. This flip-flop is set to its logical 1 state upon the reception of a "reply-ready" level from the computer.

The logical 1 output terminal of the reply-ready flip-flop RR–AFF is also connected to one input terminal of an AND gate A135. The second input terminal of this AND gate is connected to the logical 1 output terminal of the flip-flop R2FF. The output of the gate A135 is connected to a second triggered blocking oscillator TB6, of any suitable conventional construction, which produces a pulse C2 when the reply-ready flip-flop RR–AFF is in its logical 1 state and the flip-flop R2FF is set to its logical 1 state.

It will be apparent that following the reception of a "reply-ready" signal from the computer, with the flip-flop R1FF already set to the state for receiving the first character, the setting of the reply-ready flip-flop RR–AFF will produce a pulse through the AND gate A134 to provide the signal C1, and thereafter when the flip-flop R2FF is set to its logical 1 state, a pulse will be supplied through the gate A135 to provide the signal C2. These signals are employed to gate characters from the computer output register to the translator storage register, as will next be described.

The computer output register is assumed to comprise a series of flip-flops or other suitable storage devices having output terminals, one for each bit in the two characters of a reply message. The output terminals of these flip-flops or other storage devices are connected to one input terminal of a first group of two-input AND gates A1–1, A2–1, A4–1, A8–1, A16–1, A32–1 and AP–1, which are associated with corresponding bits of the reply character plus the parity bit. Each second input terminal of this group of AND gates is connected to a line energized by the signal C1 when the first character is to be shifted into the translator storage. A second group of gates corresponding to the second character also has one input terminal connected to one of the output terminals of the computer output register for the second character, and has a second terminal energized by the signal C2.

The outputs of the AND gates receiving the computer reply characters are connected in pairs to a series of seven OR gates OR39–OR45. Each of these gates has two input terminals, one connected to the output terminal of one of the AND gates in the first character group, and the other connected to the output terminal of the AND gate for the corresponding bit of the second character. The output terminals of these gates are connected through suitable isolating diodes to the corresponding logical 1 output terminals of each of the flip-flops TFF1–TFF32 and TFFP. Thus, at the reception of either the character 1 loading pulse C1, or the character 2 loading pulse C2, the translator storage register is parallel-loaded with the code comprising the corresponding character.

It is desired to provide a stop bit for transmission to the central buffer system when the last character of the reply message is transmitted. For this purpose, the pulse C2 is employed to load a stop bit into the stop flip-flop TFFS at the time when the second character, comprising the last character in the message in the simple example here considered, is entered. Of course, if the information source has provision for supplying a stop bit, it may be employed instead for this purpose.

*The operation of the first embodiment*

In order to illustrate the operation of the system of my invention, it will be assumed for simplicity that the information source comprises a source of information concerning the number of available seats remaining on thirty trains identified by letters and numbers as A0–A9, B0–B9, and C0–C9. The console unit for use by the operator will be conceived for purposes of description as an interrogator for use by the operator in requesting information as to the amount of space available on a given train, by sending a message comprising the train designation, which will be used as an address to select the appropriate register in the information source. The information source will then respond by sending a message of two characters in length comprising a number from 0 to 99 representing the number of seats on the particular train addressed.

To begin the discussion, let it be assumed that the central buffer system has just been placed in operation, and it is desired to initiate operation by depressing the central clear switch SCC in FIG. 17*c*. It will be assumed that the central counters described in connection with FIG. 22 are in operation, and are sequentially producing the 9's pulses, 7's pulses, character counts, and special timing pulses required in the system.

When the central clear switch SCC is momentarily depressed, the relay CTR will be picked up, and held up over its own front contact until the power to the system is again interrupted. The second front contact of the relay CTR will close at the same time, connecting the A line from the central buffer system to the translator to supply "A gate" pulses from the system when the occasion demands. A second contact on the central clear switch SCC will provide a central clear level to the gate A83, which will pass a group of SGP shift pulses to the stations. The first of these pulses acts as the "central clear" pulse for the stations, and the others have no effect. These pulses will also be applied through the inverter I75 to clear the central buffer program counters MPC1 and MPC2. At the same time, the external unload buffer flip-flop XUFF, the B-received flip-flop BRFF, and the CIS flip-flop CIS–AFF, all in FIG. 17*b*, will be cleared; that is, reset to their logical 0 states.

The central clear switch SCC is preferably mechanically designed to be maintained closed for at least 0.1 of a second, but in any event should be depressed for at least this lenth of time to permit at least eight SGP shift pulses to be passed by the gate A83 in FIG. 17*c*. Referring to FIG. 17*a*, these pulses are applied to the OR gate OR13 as a series of clear pulses, which serve to shift the central buffer, comprising the flip-flops CBFF1–CBFF2 and CBFFP, at a time when no information is being applied, to shift any residual 1's out of the flip-flops. At the same time, the buffer shift pulses are applied to the delayed AND gate DA6, together with the clear pulses from the inverter I57, the latter being supplied through the OR gate OR16 and the inverter I48 to step the stop flip-flop S–AFF to its logical 0 state.

Referring now to FIG. 17*b*, the clear pulses occurring in SGP shift time are also supplied to the AND gate A64, together with the level $\overline{\text{Op8}}$, the latter representing that the counter flip-flops 1PFF, 2PFF, and 4PFF are not in their binary 0 state. These pulses operate to set these flip-flops to their binary 0 or "operation 8" state, at which time the AND gate A64 is disabled.

The initial clear operation at each station is the same for all the stations. Accordingly, only the central clear operation for station N will be considered, with reference to FIGS. 16*a*–16*f*. First, the central clear pulses from the gate A83 in FIG. 17*c* are applied to clear the station program counters P1FF through P4FF in FIG. 16*c* through the inverter I20 and the isolating diodes shown. At the same time, referring now to FIG. 17*c*, with the station program counters MPC1 and MPC2 in their logical 0 states, the gate A79 is enabled to pass 0.3 microsecond timing pulses, which constitute the B*p* shift pulses. These B*p* shift pulses are applied to begin circulating a 1 through the buffer possession flip-flops BPFF1–BPFFN in the manner previously described. This action will be continued until a station in the "unload" mode of operation is encountered.

Next, assume that the operator desires to ascertain the number of seats still available on the train B8. Referring to FIG. 16*e*, his first step in this operation is to temporarily depress the clear switch SC on the keyboard in FIG. 16*e*. This operation will have no effect if the station already has the central buffer in possession, but assuming that it does not, as will be the case of the beginning of operations, the clear pulse produced by the triggered blocking oscillator TB2 in FIG. 16*e* will be applied to the AND gate A33 in FIG. 16*c*, which will be enabled at this time by the level $\overline{\text{BIPN}}$ from the output terminal of the gate A46 in FIG. 16*a*, which is at a negative potential when the buffer possession flip-flop BPFFN is in its logical 0 state. A second clear pulse will be applied from the output of the gate A33 to clear the station program counters P1FF–P4FF. At the beginning of operations, this pulse will have no effect, because the central clear operation initially clears these flip-flops. However, this pulse is required when at any later time a new message transmission is initiated.

With the station program counters in their logical 0 state, the AND gate A25 in FIG. 16*c* will produce a "clear I" level, which will be applied to the OR gate OR7 to set the clear flip-flop CFF in FIG. 16*c*. The clear level appearing at the logical 1 output terminal of the clear flip-flop CFF is applied to disable the AND gate A3 in FIG. 16*e*, which prevents the setting of the marker delay flip-flop MDFF and the marker flip-flop MFF. It is also applied to the gate A24 in FIG. 16*d* to disable the AND gate A24, and to enable the gate A23 in FIG. 16*d* to pass a clear gate level at the $9_1$ through $9_7$ times within the 7 times $7_1$ and $7_2$. This "clear gate" is applied to the write gate OR4 to provide a "write" level to set the write flip-flop WRFF in FIG. 16*f* to its logical 1 state. The gate A1 in FIG. 16*f* is thereby enabled to pass 0.8 microsecond write strobe pulses to the write amplifier 47 to insert logical 1's in the $9_1$ through $9_7$ times of each $7_1$ and $7_2$ code storage time. This will comprise each of the $7_1$ and $7_2$ times of all of the character times from 1 to 104. Since the SGP shift pulse which set the clear flip-flop occurs at the end of the 103rd character time, the first $7_1$ time to be thus filled will be the $7_1$ time in character 104 time.

The output of the read flip-flop will be applied at this time to the gate A17 in FIG. 16*d*, but this gate will be disabled because the recirculate level will not be applied from the inverter I12. This action occurs because the clear gate level applied to the gate OR5 produces a ground output level meaning "not recirculate," which is inverted in the inverter I12 to form a negative level to disable the AND gate A17.

At the end of the 104th character time following the one in which the clear flip-flop was set, the clear flip-flop CFF in FIG. 16*c* will be reset as previously described, producing a clear pulse at the output terminal of the flip-flop CFF. This pulse will operate to set the marker delay flip-flop MDFF and the marker flip-flop MFF in FIG. 16*e* to their logical 0 states, and also to set the keyboard character flip-flop KCFF to its logical 0 state. Referring next to FIG. 16*b*, the pulse CFF will also operate to set the flip-flop 89FF to its logical 0 state, and will be applied through the OR gate OR11 in FIG. 16*b* to provide a counting pulse to step the station program counter flip-flop P1FF in FIG. 16*c* to its logical 1 state. In this state, the AND gate A26 in FIG. 16*c* is enabled to begin the "load 9I" mode of operation.

During the "load 9I" mode of operation, a logical 1 bit is loaded into the delay line in the $7_19_9$ time during the character 104 time. This operation is carried out as follows: The "load 9I" level from the gate A26 in FIG. 16*c* is applied through the OR gate OR6 to enable the AND gate A36 to pass the next $7_19_9$ pulse. This pulse may be provided by a two-input AND gate connected to the $7_19_9$ central counter terminals. The pulse appearing in $7_19_9$ time from the AND gate A36 is applied through the OR gate OR10 to the AND gate A35. At this time, the character 104 level is on, so that the AND gate A35 passes the applied pulse, in the form of a level labeled "load new marker."

The "load new marker" level performs three functions in the system. First, referring to FIG. 16*d*, it is applied to the gate OR4 to produce a "write" level which is applied to set the write flip-flop WRFF to its logical 1 state at the trailing edge of the concurrent 0.3 microsecond clock pulse to enable the gate A1 in FIG. 16*f* to pass the next 0.8 microsecond strobe pulse to write a 1 in the $7_19_9$ time of character 104 time in the delay line. It may be noted at this point that none of the write levels so far produced have affected the video gate A4 in FIG. 16*f*, since this gate is disabled during the $7_1$ and $7_2$ times of each character.

Second, referring again to FIG. 16*d*, the "load new marker" level operates the gate OR5 to produce a positive "$\overline{\text{recirculate}}$" level. This level disables the gate A17 and cuts off the output of the read flip-flop RDFF in FIG. 16*f*.

Third, referring now to FIG. 16*b*, the "load new marker" level actuates the gate OR12 to enable the delayed AND gate DA41 to supply a pulse at the trailing edge of the concurrent 0.3 microsecond clock pulse through the inverter I29 to the gate OR11. This pulse steps the program counters in FIG. 16*c* to the state in which the P1FF flip-flop is in its logical 0 state, and the flip-flop P2FF is in its logical 0 state. In this state, the gate A27 is enabled to produce the "keyboard load" level.

In the "keyboard load" mode of operation of the station, the "keyboard load" level is applied to enable the AND gate A42 in FIG. 16*b*. This AND gate will not yet produce a pulse, however. The "keyboard load" level is also applied to enable the AND gate A16 in FIG. 16*e*, to apply a set level to the keyboard character flip-flop KCFF, and to light the "enter" lamp 10 through the inverters 17 and 18. However, the AND gate A16 will not yet respond, and the flip-flop KCFF is not yet set.

When the "enter" lamp is lit, the operator is made aware that the system is in condition for the entry of a message. In the case here considered, the message would be entered by the operator by actuating the keys B and 8 in that order. Since the speed of acceptance of the system here described is at least 33 characters per second, the operator need not be concerned about the speed of operation of the keys so long as they are depressed in the proper order. As previously stated, the code and strobe contacts closed by the keys are each maintained closed for at least 20 and less than 30 milliseconds, to effect temporary storage of each character.

When the first key is depressed, assuming the code sequence previously described, the switches S4, S8, SP and SSP will be energized, to provide the character code for the letter B, together with a parity bit to insure odd parity, and the strobe pulse which is generated for each character. The strobe pulse will be applied through the triggered blocking oscillator TB1 to set the keyboard character flip-flop KCFF in FIG. 16*e* to its logical 1 state. The negative potential now appearing at the logical 0 output terminal of the flip-flop KCFF is used as a logical 1 indication for application to the OR gate OR2, to form the "look for marker" level. This level A6 to pass the next $\mathbf{7_1 9_8}$ timing pulse to the OR gate OR2, to form the "look for marker" level. This level is formed in the $\mathbf{7_1 9_8}$ time, even though it is desired to find the marker in the $\mathbf{7_1 9_9}$ time, because the delay line output is sampled in this instance directly from the output of the read amplifier 53, which is one bit behind the output of the read flip-flop RDFF. Accordingly, the sampling will actually take place in the $\mathbf{9_9}$ time of the system. Referring to FIG. 16*e*, the "look for marker" level is applied to enable the AND gate A3. Since the station is no longer in its clear status, the "clear not" level is also applied at this time. Thus, the delay line output DLO appearing at the output of the read amplifier 53 in FIG. 16*f*, in what is actually the $\mathbf{7_1 9_9}$ system time space, will be gated to set the marker delay flip-flop MDFF through the inverter I4. The marker delay flip-flop will enable the marker flip-flop MFF to be set on the next 0.1 microsecond read strobe pulse. The reason for the delay is now apparent; it is necessary to actually set the marker flip-flop in the system $\mathbf{7_1 9_9}$ time, rather than the $\mathbf{7_1 9_8}$ system time in which the sampling was done.

It will be recalled that characters 51, 52, 103 and 104 are inhibited, since they occur during the horizontal retrace time. Since the initial marker was located in the character 104 time, the next $\mathbf{7_1}$ time will occur when the "inhibit not" level is applied to the gate A16 in FIG. 16*e*. The marker flip-flop now set to its logical 1 level, and the "keyboard load" level is applied. When the $\mathbf{7_1}$ time of character 1 occurs during the $\mathbf{9_1}$ through $\mathbf{9_7}$ times in this 7 time, the AND gate A16 will be enabled to supply a "keyboard gate" level to the AND gate A15 through the inverter I6. The code for the character B now waiting at the gates A8 through A14 will be strobed to the gate A15 by the successive 9's pulses $\mathbf{9_1}$ through $\mathbf{9_7}$. The output of the gate A15 is supplied to the gate OR4 in FIG. 16*d*, to supply a series of write pulses to set the write flip-flop and write the character code into the $\mathbf{9_1}$ through $\mathbf{9_7}$ spaces of the $\mathbf{7_1}$ time of the character 1 time. At the same time, the output of the gate A16, which is a negative "keyboard gate" level, is applied to the gate OR5 to prevent recirculation of the 1's written into the $\mathbf{7_1}$ spaces in the delay line in the previous operation.

When the marker flip-flop MFF was initially set, it reset the keyboard character flip-flop KCFF. At the same time, the "marker" level is applied to enable the AND gate A24 in FIG. 16*d*. This gate has also applied to it at this time the "$\overline{\text{clear}}$" and "$\overline{\text{inhibit}}$" levels. In the $\mathbf{7_1 9_9}$ portion of the character 1 time, a "load marker gate" signal is applied to the gate A24 from the gate OR9 in FIG. 16*c*. The gate OR9 is actuated in response to a pulse appearing from the gate A38 in $\mathbf{7_1 9_9}$ time with the "keyboard load" level applied through the OR gate OR8 to the other input terminal of the gate A38.

Referring again to FIG. 16*d*, the output of the gate A24, which comprises a 1 bit in the $\mathbf{7_1 9_9}$ time of the first character, is applied to the gate OR5 in FIG. 16*d* to inhibit recirculation, to reset the marker flip-flop MFF and the marker delay flip-flop MDFF to logical 0 through the inverter I5, and to set the gate OR4 in FIG. 16*d* to provide a write level for actuating the write flip-flop WRFF in FIG. 16*f* to write the desired load marker bit in the $\mathbf{9_9}$ time of the $\mathbf{7_1}$ time in character 1. This marker now forms a basis for the loading of the next character into the system. When the second character, which is the numeral 8 in the example here considered, is typed into the keyboard, it is loaded into the delay line into the $\mathbf{7_1}$ time of character 2 in the same manner as character 1 was loaded, by first looking for the 9 bit and finding it in the $\mathbf{7_1}$ time of character 1, and then proceeding to load it into the following $\mathbf{7_1}$ time in the manner previously described. As noted above, the marker bit will be taken out of the $\mathbf{7_1}$ time of character 1 and loaded into the $\mathbf{7_1 9_9}$ position of the character 2 time to provide the basis for a next character to be loaded. Assuming that only two characters are to be entered at this time, the operator may now refer to the display of these characters on the screen as a final check before transmitting the message to the central buffer system.

When the first character emerges from the delay line 4 in FIG. 16*f* after having been loaded in, the generation of video signals begins. The "$\overline{\text{look for marker}}$" level will now be applied to the AND gate A2, so that the delay line output DLO from the read amplifier 53 will be applied to set the read flip-flop RDFF, setting it on the trailing edge of each 0.1 microsecond read strobe pulse if the corresponding bit of the character is a 1, and setting it to logical 0 if the bit is 0. The output of the read flip-flop RDFF is applied to the gate A43 in FIG. 16*b*. Whether or not the information is transmitted to the decoder at this time, however, will depend on whether or not the symbol generator is in possession of unit N. Assuming for the moment that it is not, and referring to FIG. 16*d*, the output of the read flip-flop RDFF will be recirculated at this time through the gate A17 and the OR gate OR4. If the maximum of 20 stations are employed, it will be no more than a fifth of a second before the symbol generator becomes available, so that the operator will not have an appreciable wait before seeing the information displayed on the screen of the cathode ray tube at his console unit.

Referring now to FIG. 16*b*, assuming that the symbol generator possession flip-flop SGPNFF is now in its logical 1 state, the AND gate A43 will be enabled to supply the symbol generator information to the decoder. Referring to FIG. 18, this information will be supplied in the manner previously described through the OR gate OR30 to store the character, which in this case will be the letter B, in the flip-flops 1SFF through 32SFF. The code state of these flip-flops will determine which of the character decoder CD1 output lines is energized, and in this case the B line will be energized to enable the AND gate A97. The video encoder is continuously producing the train of pulses corresponding to the video signals for the character B on its output line B, and this information is now gated through the gate A97 and the OR gate OR29 to the video line, which is applied to the AND gate A20 as shown in FIG. 16*d*. With the symbol generator in possession, and in the appropriate 7 times $\mathbf{7_3}$ through $\mathbf{7_7}$, the AND gate A21 will be enabled to supply a video gate level to the gate A20 through the inverter I9. The gate A20 supplies the video information to the write gate OR4, from which it is supplied to the write flip-flop WRFF to write it into the character 1 time in the spaces $\mathbf{7_3}$ through $\mathbf{7_7}$ and in the 9 times $\mathbf{9_1}$ through $\mathbf{9_7}$. Video information is also supplied to the video gate A4. Through this gate, it is strobed by the video strobe 0.8 microsecond timing pulses to actuate the emitter follower EF1 and thereby energize the video amplifier 61 to intensify the trace on the screen of the cathode ray tube 3 at the appropriate times to produce the display of the character B in the first character space on the first line on the tube. The second character 8 will be similarly displayed after it emerges from the delay line and is sent to the symbol generator.

When the operator is satisfied with his message on the cathode ray tube 3, he initiates the next step in operation by depressing the transmit button TB on the keyboard in FIG. 16*e*. The transmit level so produced is supplied through the AND gate A42 in FIG. 16*b*, which is enabled in the "keyboard load" mode of operation of the station, to produce an output pulse through the OR gate OR12 which is gated at the trailing edge of the next 0.3 microsecond clock pulse through the delayed AND gate DA41 and the inverter I29 to the OR gate OR11. A count pulse is thus produced which steps the station program counters in FIG. 16*c* to the 011 state, in which the "load 8" gate A28 is enabled to produce the level "load 8."

The "load 8" level is applied through the inverter I15 in FIG. 16*c* to enable the AND gate A34 to pass the next $7_1 9_8$ timing pulse to the OR gate OR10. The gate OR10 enables the gate A35 to supply a "load new marker" level at the next character 104 time. Although the gate will be enabled at each $7_1 9_8$ time, it will not actually be effective except during the $7_1 9_8$ time in character 104 time.

The "load new marker" signal from the gate A35 in FIG. 16*c* is employed to perform three functions. First, it is applied to the gate OR5 in FIG. 16*d*, to inhibit circulation of any previous 0 in the $7_1 9_8$ time space of the character 104 time. Second, it is applied to the write gate OR4 in FIG. 16*d* to form a write level to set the write flop-flop to load the unload marker into the $7_1 9_8$ position of character 104 in the delay line 4. Third, it is applied to the gate OR12 in FIG. 16*b* to enable the delayed AND gate DA41 to produce a pulse at the trailing edge of the next 0.3 microsecond clock pulse which is supplied through the inverter 129 to the gate OR11. The gate OR11 provides a counting pulse to step the station program counters in FIG. 16*c* to their 100 or "unload" state, at which time the gate A29 is enabled to produce the "unload" level.

The first step in the unload mode of station operation is to secure possession of the central buffer. For this purpose, the output of the gate A29 is applied through an inverter I16 to provide a ground potential "unload" level. This level is applied to the gate A47 in FIG. 16*a*. When the buffer possession flip-flop for the station next preceding station N is set to its logical 1 state, the gate A47 will produce a pulse which is applied through the inverter I30 to send a "stop search" level to the central buffer system. Referring next to FIG. 17*c*, the "stop search" level is supplied through an inverter I79 to an OR gate OR27 to enable the AND gate A80 to pass the next 0.3 microsecond timing pulse to step the central buffer program counters to their logical 1 state. In the logical 1 state of the program counters, the gate A78 is enabled to provide the negative level "ready A," the gate A79 is disabled, but not before it has emitted one final BP shift pulse which is supplied through the inverter I78 to the station, and the gate A75 is enabled to produce the "BP gate" level for transmission to the station.

Referring again to FIG. 16*a*, the final BP shift pulse is applied through the inverter I38 to set the flip-flop BPFFN to its logical 1 state. The BP gate pulse is applied through the inverter I37 to enable the AND gate A46 to produce the level "BIPN" when the buffer position flip-flop BPFFN goes to its logical 1 state.

Referring again to FIG. 17*c*, the "ready A" level provided by the gate A78 is supplied through the OR gate OR26 to the AND gate A84. Referring now to FIG. 17*b*, it will be recalled that the character in storage flip-flop CIS–AFF was initially set to its logical 0 state. Its logical 0 output terminal, labeled $\overline{CIS}$, is connected to one input terminal of the gate A84 in FIG. 17*c* to enable this gate to pass the "transmit" level from the OR gate OR26 used as an inverter to form a level "send character." This level is inverted in the inverter I74 and sent to the stations.

In station N, referring first to FIG. 16*e*, the "send character" level enables the gate A7. This gate has applied to it at this time the levels "$\overline{\text{marker}}$," "$\overline{8=9}$" from the flip-flop 89FF in FIG. 16*b*, and the "BIP" or buffer in possession level from the buffer in possession flip-flop BPFFN in FIG. 16*a* through the AND gate A46. The gate A7 is thus enabled to pass the next $7_1 9_7$ timing pulse to the OR gate OR2 to form a "look for marker" level. As previously described in the operation in which the $9_9$ marker bit was located, the unload bit in the $9_8$ space is sought directly at the output of the read amplifier, which is one bit in system time behind the output of the read flip-flop RDFF. Accordingly, the $9_8$ bit is sought in the system $9_7$ time as previously explained.

The "look for marker" indication from the gate OR2 is applied to enable the gate A3 to receive the delay line output DLO from the read amplifier 53 in FIG. 16*f*. When the unload bit has been located, in this instance in the $7_1 9_8$ time of character 104, the marker delay flip-flop MDFF is set as before, and marker flip-flop MFF will be set on the next following 0.1 mircosecond read strobe pulse. With reference to FIG. 16*f*, note that at the time that the "look for marker" level is applied, the gate A2 is disabled and the read amplifier is effectively disconnected from the read flip-flop RDFF. Accordingly, this unload bit is erased from the delay line.

When the marker flip-flop is set, it enables the gate A19 in FIG. 16*d*. At this time, this gate also receives ground levels from the buffer in possession gate A46 in FIG. 16*a*, the "$\overline{\text{inhibit}}$" level, and and the "unload" level from the station program counters. The gate is therefore opened during the next $7_1$ time in the times $7_1$ through $9_8$ to form the level "internal load buffer gate." Referring to FIG. 17*a*, this level is applied to the central buffer system to enable the AND gate A61 to pass character data from the station, and through the inverter I44 and the OR gate OR14 to enable the AND gate A52 to pass a series of eight 0.3 microsecond clock pulses to the OR gate OR13. The output of this gate is applied through the inverter I42 to begin shifting the first character into the central buffer.

Referring to FIG. 16*b*, the gate A44 is enabled at this time by the levels BIP and $\overline{9}_8$ to pass the output of the read flip-flop RDFF through an inverter I25 to the central buffer. Thus, the pulses comprising the character code in the times $9_1$ through $9_7$ of the time $7_1$ in the character 1 time will be gated to the central buffer. Referring again to FIG. 17*a*, this information will be applied through an inverter I52 and the OR gate OR18 to the AND gate A61. The output of the gate A61 is supplied through the OR gate OR16 and the AND gate A55 and the inverters I48 and I49 to step the delayed AND gates DA6 and DA8 to shift the first character into the central buffer. After the first character has been shifted in, the stop flip-flop S–AFF will be in its logical 0 state.

Referring now to FIG. 17*b*, the "internal load buffer gate" level is applied to the AND gate A70. At the $9_8$ time during the $7_1$ time in which this operation occurs, the gate A70 produces a negative level which causes the gate OR21 to produce a positive level to enable the delayed AND gate DA11 to set the character in storage flip-flop CIS–AFF to its logical 1 state at the trailing edge of the concurrent 0.3 microsecond timing pulse. With the CIS flip-flop in its logical 1 state, the gate A84 in FIG. 17*c* is disabled and the "send character" level is no longer sent to the station. At the same time, the gate A85 is enabled to transmit the "ready A" level through the inverter I76 to form a "send first A" level, which is applied through an inverted I54 and an OR gate OR17 in FIG. 17*a* to actuate the gate A59. The gate A59 which is enabled at this time with the station not in its clear mode of operation. The "A gate" level so formed is applied through an inverter I53 and over the front contact of the relay CTR to the A line to the translator. This level requests the translator to notify it when it is in condition to receive a character from the central buffer.

Referring now to FIG. 23, the level on the A line is applied to the AND gate A131, which is enabled at this time by the idle level from the logical 1 output terminal of the flip-flop IDFF. The output of the gate A131 steps the translator program shift register to the state in which the flip-flop RFF is in its logical 1 state, and at the same time the "send first B" level formed at the output of the gate A131 is applied to the OR gate OR34. This level is sent on the B line to the central buffer system.

Referring now to FIG. 17*b*, the B level received from the translator is applied to the trigger blocking oscillator TB3 to produce a B*p* pulse, which sets the B received flip-flop BRFF to its logical 1 state. The BRFF flip-flop is enabled at this time by a ground level applied to its 1 level set terminal to the inverter I69 and the OR gate OR65, to which the "send first A" level is now applied.

Referring now to FIG. 17*b*, when the B received flip-flop BRFF is set to its logical 1 state, the AND gate A67 will be enabled to pass a series of 0.3 microsecond clock pulses. The gate is enabled at this time because the character in storage flip-flop CIS–AFF is in its logical 1 state, state, and the counter flip-flops 1PFF, 2PFF and 4PFF are in their logical 0, or OP8 state. The first pulse passed by the gate A67 operates to set the flip-flop 1PFF to its logical 1 state. This removes the level OP8 from the gate A67, so that it can no longer pass pulses. However, the gate A63 is now enabled to pass the next 7.3 pulses. When flip-flop 1PFF is set, it causes flip-flop XUFF to be set.

Referring now to FIG. 17*c*, the levels "B received" and "send first A" enable the gate A81 to actuate the OR gate OR27 to enable the gate A80 to pass a 0.3 microsecond pulse to step the central program counters MPC1 and MPC2 to their binary 10 (or decimal 2) state. In this state, the gate A77 is enabled and a "transmit" level is formed. Referring again to FIG. 17*b*, the gate A63 is now enabled, because the counters 1PFF through 4PFF are not in their logical 0 state, to pass a series of 0.3 microsecond timing pulses through the gate OR24 and the inverter I73 to step the counters 1PFF through 4PFF through their sequence from binary 1 back to binary 0. At the same time, the "external unload buffer gate" level from the logical 1 output terminal of the flip-flop XUFF is applied through the inverter I43 in FIG. 17*a* to the OR gate OR15. The output of the gate OR15 enables the AND gate A60 to pass a series of 0.8 microsecond strobe pulses, which are applied through the OR gate OR17 to the AND gate A59. With the station not in its clear mode of operation, "A gate" pulses are thus produced which are applied through the inverter I53 and over a front contact of the relay CTR in FIG. 17*c* to the A line, and thence to the translator in FIG. 23. These pulses serve as strobe pulses for the character information to be supplied from the central buffer, and are limited to eight by the fact that the character in storage flip-flop CIS–AFF will be set to its logical 0 state on the eighth pulse, which will reset the external unload buffer XUFF to its logical 0 state in a manner which will next be described.

The AND gate A74 in FIG. 17*b* is enabled in the logical 1 state of the external unload buffer flip-flop XUFF. When the counters 1PFF through 4PFF reach their binary 7 indication, gate A62 will be enabled to pass a pulse labeled 8P8 through an inverter I72 to gate A74, causing the delayed AND gate DA9 to be actuated through the OR gate OR20 at the end of the next 0.3 microsecond timing pulse. Thus, at the end of the eighth strobe pulse transmitted over the A line, the character in storage flip-flop will be restored to 0.

With the flip-flop CIS–AFF reset, the AND gate A68 will be enabled to pass the next 0.3 microsecond timing pulse to reset the external unload buffer flip-flop XUFF to its logical 0 state. Referring now to FIG. 17*a*, the resetting of the flip-flop XUFF will remove the "external unload buffer gate" level from the gate OR14, stopping the buffer shift pulses, and will disable the AND gate A60, stopping the 0.8 microsecond strobe pulses.

During the interval just described, the eight buffer shift pulses have shifted the stored character in the central buffer out through the AND gate A54, which is enabled by the B received flip-flop BRFF in FIG. 17*b*, and through the delayed emitter follower DEF6 and over the information line to the translator. At the same time, the "A gate" pulses from the gate A59 in FIG. 17*a* have been supplied to the translator over the front contact of the relay CTR in FIG. 17*c*. Returning now to the translator in FIG. 23, the manner in which the information thus transmitted is received by the translator will next be described.

Information from the central buffer in the form of the character code, plus the parity bit and the time in which the stop pulse is transmitted if the stop character is being transmitted, is supplied to the input of the stop flip-flop TFFS. At the same time, the first shift pulse on the A line is supplied through the AND gate A127 to the OR gate OR33 and from the gate OR33 is applied to the shift line of the translator storage shift register through inverter Iª to shift in the character information from the central buffer. The AND gate A127 is enabled at this time by a ground level supplied from the logical 1 output terminal of the translator program shift register flip-flop RFF.

At the same time that the translator storage shift register is receiving the character information, the shift pulses from the gate OR33 are applied to step the inquiry counter comprising the flip-flops IC1FF, IC2FF and IC4FF. At the eighth pulse, the inquiry counter will be reset to its 0 state and emit a carry pulse which will be applied through the inverter I100 to the AND gate A130. The gate A130 is enabled at this time by the ground level supplied from the logical 1 output terminal of the flip-flop XFF. The level "X address" is then applied to enable the AND gate AX1, AX2, AX4, AX8, AX16, AX32, and APX. These gates then transfer the information stored in the translator storage register to the X address register of the computer.

A sufficient time after the information has been supplied to the address shift register, the delay unit DE2 will produce a level, in response to the previously applied carry pulse labeled "send second B." This level will be applied to the AND gate A128. Since the character B which was just received by the translator was an information character and not the "stop" character in the message, the stop flip-flop TFFS will be in its logical 0 state and the flip-flop RFF will still be in its logical 1 state. Accordingly, the level "send second B" will be applied to the gate OR34 and supplied to the central buffer system over the B line. At the same time, the level "send second B" will be applied to set the X flip-flop XFF to its logical 0 state and the Y address flip-flop YFF to its logical 1 state.

Referring now to FIG. 17*b*, as previously described, the B received flip-flop BRFF was reset to its logical 0 state by the pulse produced by the gate A74 with the external unload buffer XUFF in its logical 1 state and the 8P8 pulse applied from the gate A62. When the "send second B" level is received by the triggered blocking oscillator TB3 in FIG. 17*b*, the B received flip-flop BRFF will be set. It will be recalled that the gate OR65 is still enabled to produce an output level through the inverter I69 which will permit the flip-flop BRFF to be set, since the central buffer is still in its "transmit" mode. Note that the gate A67 will not be enabled at this time, because the character in storage flip-flop CIS–AFF is in its logical 0 state. Accordingly, the external unload buffer flip-flop XUFF will not be set at this time.

Referring now to FIG. 17*c*, when the character in storage flip-flop CIS–AFF is restored to its logical 0 state, the gate A84 will be enabled to pass the positive level from the gate OR26 provided by the "transmit" level supplied to that gate. Accordingly, the level "send character" will be transmitted to the station N.

Referring next to FIG. 16*e*, the operation of the station in response to the send character level will be considered. The level "send character" will enable the gate A7 in FIG. 16*e* to pass the next $7_1 9_7$ pulse. This gate is enabled because the buffer is in possession, the marker flip-flop is in its logical 0 state, and the 8=9 flip-flop 89FF is in its logical 0 state. Accordingly, the level "look for marker" is provided by the gate OR2. This level is applied to the gate A3 to sample the delay line output at the read amplifier location to find a bit in what is actually the $7_1 9_8$ time. When this pulse is located in the $7_1$ portion of the character 1 time, the marker delay flip-flop MDFF will be set to its logical 1 state. As before, the eight bit so located will be erased from the delay line in FIG. 16*f* by disabling the gate A2 between the read amplifier and the read flip-flop by the level "look for marker."

At the next 0.1 microsecond timing pulse after the marker delay flip-flop MDFF is set, the marker flip-flop MFF will be set to its logical 1 state. Referring now to FIG. 16*d*, with the marker flip-flop in its logical 1 state, the station in its unload mode of operation, and the central buffer in possession, the gate A19 will be enabled to provide an internal load buffer gate during the next $7_1$ time except for the $9_9$ portion. Thus, an eight bit duration internal load buffer gate level will be formed. Since the marker gate was set on the trailing edge of the $9_9$ pulse in the $7_1$ time of the first character location, the next $7_1$ time will be the $7_1$ time for the second character in the delay line, which in the example here under consideration is the numeral 8. Referring now to FIG. 17*a*, the gate A61 will be enabled by the internal load buffer gate level to pass the next 8 character pulses from the gate OR18. This information is supplied from station N through the inverter I52, and, referring now to FIG. 16*b*, the information originates at the output of the read flip-flop RDFF applied through the AND gate A44 and the inverter I25.

The character information from the gate A61 is supplied through the gate OR16 to the inverter I48 and the AND gate A55, which is enabled at this time because the central buffer system is not in its clear mode of operation. The inverter I48 performs the function of logically complementing the information. At the output of the gate A55, the inverter I49 does not logically complement the information supplied to it, but merely inverts the polarity. Two complementary inputs are thereby provided to the delayed AND gates DA6 and DA8. This information is shifted into the central buffer storage by buffer shift pulses provided by the internal unload buffer gate level supplied through the inverter I44 and the gate OR14 to the gate A52, to pass eight 0.3 microsecond timing pulses. These pulses are applied to the gate OR13 and through the inverter I42 to actuate the delayed AND gates DA6 and DA8 and to shift the synchronous flip-flops in the central buffer. Referring now to FIG. 17*b*, in the $9_8$ time when the internal load buffer gate level is applied, the gate A70 is enabled to actuate the delayed AND gate DA11 through the OR gate OR21. This gate accordingly sets the character in storage flip-flop CIS–AFF to its logical 1 state at the trailing edge of the next 0.3 microsecond timing pulse. With the character in storage flip-flop set to its logical 1 condition, the gate A84 in FIG. 17*c* is disabled and the "send character" level is turned off.

Referring now to FIG. 16*c*, the gate A37 will be enabled, with the station in its unload mode, and the marker flip-flop in its logical 1 state, to pass the next $7_1 9_8$ pulse. This will enable the gate OR9 to provide the "load marker gate" level. Referring now to FIG. 16*d*, the gate A24 will be enabled, with the marker flip-flop in its logical 1 state, to pass the "load marker gate" level and provide a "marker gate" level. This marker gate level will interrupt the circulation of the $7_1 9_8$ unload pulse in the character 2 time. At the same time, it will be applied to the write gate OR4 to supply a write level to the write flip-flop WRFF. This will write an unload pulse into the $7_1 9_8$ time of the second character. It will be recalled that the $7_1 9_9$ load pulse is in the same character $7_1$ time, and this indication is employed to indicate the last character, in a manner which will next be described.

Referring now to FIG. 16*b*, at $7_1 9_9$ time the gate A39 is enabled. At this time, the write gate OR4 in FIG. 16*b* provides a level to write the $7_1 9_8$ unload pulse into the $7_1$ time of character 2, and the write flip-flop WRFF is then in the logical 1 state to write the load indication in the $7_1 9_9$ time. The presence of both of these levels indicates that the last character is present, and the gate A39 will produce a level through the inverter I22 to set the flip-flop 89FF to its logical 1 state.

Returning now to FIG. 17*b*, with the character in storage flip-flop CIS–AFF in its logical 1 state, the gate A67 is now enabled to step the flip-flop 1PFF to its logical 1 state through the gate OR24 and the inverter I73. The output of the gate A67 also sets the external unload buffer flip-flop XUFF to its logical 1 state. The gate A63 in FIG. 17*b* is now enabled to pass eight 0.3 microsecond timing pulses through the gate OR24 and the inverter I73 to step the counters 1PFF, 2PFF and 4PFF through their eight logical states.

In the meantime, referring now to FIG. 17*a*, the "external unload buffer gate" level is applied through the inverter I43 and the gate OR14 to the AND gate A52 to enable eight 0.3 microsecond pulses to pass through the OR gate OR13 and the inverter I42 to shift out the information for the second character to the translator. At the same time, the "external unload buffer gate" level at the output of the inverter I43 is applied to the OR gate OR15 to generate a positive level which enables the gate A60 to pass eight 0.8 microsecond timing pulses through the gate OR17 and the gate A59 in FIG. 17*a*, over the front contact of the relay CTR in FIG. 17*c*, to the translator in FIG. 23. These pulses act as strobes for the information pulses from the central buffer, which are also supplied to the translator.

As the information is shifted out of the central buffer, it is applied through the gate A54 in FIG. 17 and through the delayed emitter follower DEF6 to the information line to the translator.

Referring now to FIG. 23, information comprising the second character is shifted into the translator storage register in time with A pulses received on the A line applied to the AND gate A127. At this time, the translator program shift register flip-flop RFF is still in its logical 1 state, so that the AND gate A127 applies the shift pulses through the gate OR33 to step the inquiry counter and to step the translator storage register. At the eighth pulse the inquiry counter will emit a carry pulse and, with the Y flip-flop YFF in its logical 1 state, will enable the gate A129 to form the level "Y address" to enable the gates AY1, AY2, AY4, AY8, AY16, AY32 and AYP. These gates will then transmit the second character, comprising the numeral 8, to the Y address register of the computer. After a sufficient time delay, the unit DE2 will form the level "send second B," which will again be applied through the AND gate A128 and the OR gate OR34 and over the line B to the central buffer system. Referring again to FIG. 17*b*, this level will actuate the triggered blocking oscillator TB3 to set the B received flip-flop BRFF to its logical 1 state.

Referring again to FIG. 17*b*, at the seventh pulse applied from the gate A63 through the OR gate OR24 and the inverter I73 to the flip-flop 1PFF, the counter comprising this flip-flop and the flip-flops 2PFF and 4PFF will be set to its 111 state, corresponding to the 8P8 level. The gate A62 will accordingly produce a pulse which is applied through the inverter I72 to the gate A74. With the external unload buffer flip-flop XUFF in its logical 1 state, this gate will pass a pulse to the gate OR20 to enable the delayed AND gate DA9 to reset the character in storage flip-flop CIS–AFF to its logical 0 state at the end of the next 0.3 microsecond shift pulse, corresponding to the eighth pulse transmitted to the translator.

With the character in storage flip-flop set to its logical 0 state, and referring now to FIG. 17*c*, the gate A84 will form the level "send character" and transmit it to the station N. Referring now to FIG. 16*b*, with the 8=9 flip-flop 89FF set as previously described to its logical 1 state, and with the station in the unload mode of operation, the gate A40 will produce a level "unload operation complete." This level will be applied through an inverter I21 to reset the flip-flop 89FF on the trailing edge of the concurrent 0.3 microsecond clock pulse. In the meantime, the "unload operation complete" level is also applied to the gate OR12, which enables the delayed AND gate DA41 to produce a count pulse supplied through the inverter I29 and the gate OR11 to step the station program counters in FIG. 16*c* to their "clear II" mode of operation, in which the gate A30 is enabled.

Prior to the time that the delayed AND gate DA41 in FIG. 16*b* produces its output pulse, the gate A45 in FIG. 16*b* is enabled by the "send character" level from the central buffer system, and the flip-flop 89FF in its logical 1 state with the buffer in possession, to send a "load stop" level through the inverter I26 to the central buffer system.

Referring first to the operation within the station, in the "clear II" mode of operation the AND gate A30 produces a level applied through the gate OR7 to set the clear flip-flops CFF in FIG. 16*c*. It will be recalled that this flip-flop will be reset on the next SGP shift pulse following the one in which it is set. These shift pulses will occur at the end of the character 103 times. As previously described, the pulse produced when the clear flip-flop is reset will set the marker flip-flop MFF and the marker delay flip-flop MDFF to their logical 0 states, will set the flip-flop 89FF in FIG. 16*b* to its logical 0 state, although this will presumably already have been accomplished by the "unload operation complete" level, and will supply a count pulse to the gate OR11 to step the program counters in FIG. 16*c* to their "load 9I1" mode of operation.

Prior to the pulse produced by the clear flip-flop CFF in FIG. 16*c* which is produced when it is reset, 104 character times intervene, in which time the "clear" level is applied to the gate OR5 in FIG. 16*d* to interrupt the recirculation of information in the delay line and thereby erase the information on the line. When the program counter is shifted to the "load 9I1" state, a pulse is loaded into the $7_19_9$ time of character 104 in the manner previously described in detail for the "load 9I1" mode of operation, which is identical. Thus, the level "load new marker" is formed by the gate A35, to write the load bit in the $7_19_9$ position of the character 104 time. Referring now to FIG. 16*b*, the "load new marker" level is transmitted through the gate OR12 to the delayed AND gate DA41, which provides a count pulse through the inverter I29 to the gate OR11 to step the station program counters in FIG. 16*c* to their "external load" mode of operation. The station will remain in this state until otherwise directed by the operator.

Returning now to the central buffer system, the "load stop" level, sent from the station in the manner previously described, is applied through the inverter I58 and the gate OR19 in FIG. 17*b* and through the inverter I59 to the gate OR21. The gate OR21 enables the delayed AND gate DA11 to pass the trailing edge of the next 0.3 microsecond timing pulse to step the character in storage flip-flop CIS–AFF to its logical 1 state. Referring now to FIG. 17*c*, with the flip-flop CIS–AFF in its logical 1 state, the AND gate A84 is disabled, and the "send character" level is turned off.

Referring back to FIG. 17*b*, it will be recalled that the B received flip-flop BRFF is in its logical 1 state at this time, and with the pulse counters 1PFF through 4PFF returned to their 0 or OP8 state, the gate A67 will be enabled to shift the pulse counters to their logical 1 state, with the flip-flop 1PFF set to binary 1. Next, the external unload buffer flip-flop XUFF will be set to its logical 1 state by the flip-flop 1PFF from the 1 output side. Referring now to FIG. 17*a*, the "load stop" level is also applied to the delayed AND gate DA7 to set the stop flip-flop S–AFF to its logical 1 state the next 0.3 microsecond timing pulse. It will be recalled that the other central buffer flip-flops are in their logical 0 states, as the information previously stored in them was shifted out to the translator.

The external unload buffer flip-flopXUFF will now enable the gate A52, through the inverter I43 and the gate OR14 in FIG. 17*a*, to pass a series of eight 0.3 microsecond clock pulses through the OR gate OR13 and the inverter I42 to shift the central buffer information out. At the same time, the gate A60 in FIG. 17*a* will be enabled to pass eight 0.8 microsecond strobe pulses to the translator over the A line as previously described. Referring now to FIG. 23, the seven logical 0's followed by the logical 1 of the stop bit comprising the stop character now sent to the translator is stored in the translator shift register. At the eighth shift pulse, the stop flip-flop TFFS is in its logical 1 state. When the inquiry counter produces its carry pulse at the end of the eighth pulse, the gate A132 will be enabled to pass a pulse through the gate OR37 to step the translator program shift register from the state in which the flip-flop RFF is in its logical 1 state to the state in which the flip-flop R1FF is in its logical 1 state. This is the state in which the translator is enabled to receive the first character of the reply message from the computer.

The carry pulse from the inquiry counter will form the level "send second B" through the delay unit DE2 as previously described, but with the stop flip-flop TFFS in its logical 1 state, the AND gate A128 will be disabled and no B level will be sent back to the central buffer system. The translator will remain in this mode of operation until it receives a "reply ready" indication from the computer. When this is received, the reply ready flip-flop RR–AFF is set to its logical 1 state. Thus, with the program shift register flip-flop R1FF in its logical 1 state, the gate A134 is enabled to actuate the triggered blocking oscillator 5 to produce a character loading strobe pulse C1. This pulse enables the AND gates A1–1 through A32–1 and AP–1 as previously described, to load the first character into the translator storage register through the gates OR39 through OR45, as previously described. Prior to this operation, however, the pulse output of the gate A132 has actuated the delay unit DE1 to produce a "clear I" pulse, which has cleared the translator program shift register. Thus, the stop bit initially located in the stop flip-flop TFFS is erased.

A delayed time after the character loading strobe pulse C1, the delay unit DE4 produces an output through the gate OR36 to set the reply clock flip-flop RC–AFF to its logical 1 state and enable the AND gate A136 to pass the computer clock pulses. The pulse output of the gate A136, labeled "reply clock," is applied to shift the reply counter comprising the flip-flops RC1FF, RC2FF, and RC4FF. At the same time, it is applied through the gate OR33 to shift the information out of the translator storage register to the central buffer, and is also supplied over the B line to the central buffer to serve as strobe pulses for the outgoing information. The central buffer system will be in its "receive" mode of operation by this time, as will appear.

Referring now to FIGS. 17*a* and 17*b*, as the stop character including the stop bit is shifted out of the central buffer, it will finally appear in the flip-flop CBFF1. The output of this flip-flop, labeled "buffer," is applied to enable the AND gate A66 in FIG. 17*b*. With the external unload buffer flip-flop XUFF still in its logical 1 state, the eighth strobe pulse which acts to strobe the stop bit to the translator shift register also actuates the gate A66 in FIG. 17*b*, to form a level "transmit operation complete."

Referring now to FIG. 17*c*, this level is applied through the gate OR27 to the AND gate A80 to enable the next 0.3 microsecond timing pulse to step the central buffer program counters to the "receive" state in which the AND gate A76 produces a level labeled "receive."

Referring to FIG. 17*b*, the seventh strobe pulse occurring during the transmission of the load character to the translator, labeled 8P8, will actuate gate A74 to set the delayed AND gate DA9 through the gate OR20 to reset the character in storage flip-flop CIS–AFF on the next clock pulse.

With this flip-flop reset, the flip-flop XUFF is reset to its logical 0 state. Referring now to FIG. 17*b*, the gate A69 is enabled by the "receive" level and the character in storage flip-flop is in its logical 0 state to form the "external load buffer gate" level. This level is applied to the inverter I62 to enable the gate A53 in FIG. 17*a* to admit the external character information from the translator through the gate OR16 to set either the delayed AND gate DA6 or DA8 according as the transmitted bit is a logical 1 or a logical 0. Referring again to FIG. 17*b*, the "external load buffer gate" level also enables the AND gate A72 to pass the B pulses B*p* produced by the triggered blocking oscillator TB3 in response to the strobe pulses sent from the translator. The pulse output of the gate A72, labeled "B shift," serves as the shift pulses for shifting the external character data into the central buffer shift register.

Referring again to FIG. 17*b*, the B shift pulses are applied through the gate OR24 to step the pulse counter flip-flops 1PFF, 2PFF and 4PFF through their eight states. At the seventh count, the gate A71 will be enabled by the pulse 8P8, and will actuate the delayed AND gate DA10 to set the character in storage flip-flop CIS–AFF to its logical 1 state at the end of the next 0.3 microsecond timing pulse.

With the character in storage flip-flop in its logical 1 state, the "external load buffer gate" level is turned off by disabling of the AND gate A69. Thus, the supply of B shift pulses to the pulse counters is interrupted by the disabling of the gate A72 in FIG. 17*b*. Normally, of course, no such pulses would be received at this time.

Referring now to FIG. 17*a*, the "receive" state of the central buffer system is represented by a negative level which is applied through an inverter I55 to enable the AND gate A57. With the character in storage flip-flop set to its logical 1 state, an output level is provided by the gate A57 which is supplied through the inverter I50 to enable the gate A58 to supply a "character ready" level to the station through the inverter I51. The gate A58 is enabled at this time by the fact that there is no stop bit in stop flip-flop S–AFF.

Considering next the operation in the station, which is in its "external load" mode of operation reference will first be made to FIG. 16*e*. As there shown, the "character ready" level, together with the "buffer in possession" indication and the indication that the marker flip-flop is in its logical 0 state, enables the AND gate A5 to commence a "look for 9" operation by supplying a level through the gate OR1 to the gate A6. The gate A6 will then pass succeeding $7_1 9_8$ pulses through the gate OR2 to form the level "look for marker" in each $7_1$ time until the load marker is found. As before, the $7_1 9_8$ pulse is used because the output of the delay line is checked at the read amplifier time, and not at the read flip-flop time.

As before, the gate A3 is enabled by the "look for marker" indication, and sets the marker delay flip-flop when the bit in the $7_1 9_9$ position of the character 104 is found. The marker flip-flop MFF is actually set in $7_1 9_9$ time, since the system timing corresponds to the read flip-flop output.

The "internal unload buffer gate" level is now formed by the gate A18 in FIG. 16*d*. This gate is enabled in the next $7_1$ time for each bit except the $9_9$ bit, when the buffer is in possession, the station is in its "external load" mode, the marker flip-flop is in its logical 1 state, and the system is not inhibited because of the presence of characters 51, 52, 103, and 104.

The "internal unload buffer gate" level is applied through the inverter I11 to the central buffer system. As shown in FIG. 17*b*, it is transmitted through the inverter I65 and the gate OR23 to enable the gate A73. It is also supplied through the inverter I45 in FIG. 17*a* and through the gate OR14 to enable the gate A52 to transmit eight clock pulses through the OR gate OR13 and the inverter I42 to step the stored character out of the central buffer through the emitter follower EF5. As the information is shifted out, it is received by the station N. Referring now to FIG. 16*d*, the "internal unload buffer gate" level formed the output of the inverter I11 occurs at the same time as an information gate level supplied to the gate OR5 to stop recirculation of old information. Also, a ground potential "information gate" level is formed at the output of the inverter I110 and supplied to enable the gate A22 to pass the information from the central buffer to the write gate OR4. This information is supplied to the write flip-flop WRFF to write the new character into the character 1 position in the delay line. In the manner previously described, when this character emerges from the delay line, and the symbol generator comes into possession, its video signal would be generated by the symbol generator in FIG. 18 and sent back to the delay line and to the cathode ray tube 3. Thus, the operator is able to observe the first character of the reply message almost immediately after it is sent to the station.

Referring now to FIG. 16*c*, with the station in its "external load" mode, the gate OR8 enables the gate A38 to pass the next $7_1 9_9$ pulse, which occurs at the end of the $7_1$ time in the character 1 position, to energize the gate OR9 to form the "load marker gate" ground level. As shown in FIG. 16*d*, this enables the gate A24 to form the "marker gate" level. This level is applied to the gate OR5 to block the recirculation of video at this time, to the write gate OR4 to write the load bit into the $7_1 9_9$ position in the delay line, and to reset the marker flip-flop in FIG. 16*e* through the inverter I5. The station is now in condition to receive another character, with the first character circulating through the delay line 4 and being displayed on the screen of the cathode ray tube 3.

Returning now to the central buffer system, as the last pulse of information is shifted to the station, the "internal unload buffer gate" level from the gate OR23 in FIG. 17*b* enables the gate A73, during the $9_8$ timing pulse, to form the level labeled "last internal unload buffer gate." This level operates through the gate OR20 to set the delayed AND gate DA9 to reset the character in storage flip-flop CIS–AFF to its logical 0 state. With the character in storage flip-flop set to its logical 0 state, the external unload buffer gate flip-flop XUFF is reset to its logical 0 state through the gate A68 on the next clock pulse.

The "last internal load buffer gate" level is also applied to the gate OR15 in FIG. 17*a*, which enables the gate A60 to transmit a 0.8 microsecond timing pulse through the gate OR17, the gate A59, the inverter I53 and over the front contact of the relay CTR in FIG. 17*c* to the A line connected to the translator in FIG. 23.

Referring now to FIG. 23, the description of the operation of the translator unit above was left at the time when the reply counter had just produced its carry pulse. This carry pulse operates to reset the flip-flop RC–AFF to its logical 0 state and turn off the reply clock. It is also applied through the gate A133, with the program shift register flip-flop R1FF in its logical 1 state, to supply a signal through the gate OR37 to step the translator program shift registers to the state in which the flip-flop R2FF is in its logical 1 state. The logical 1 output terminal of the flip-flop R2FF is connected to enable the AND gate A135. With the reply ready flip-flop RR–AFF still in its logical 1 state, this action enables the triggered blocking oscillator TB6 to produce a second character strobe pulse C2. This pulse enables the computer output register to apply the second character to the translator storage register. First, the pulse C2 enables the gates A1–2 through A32–2 and AP–2 to apply the corresponding bits of the reply character to the gates OR39–OR45. These gates load the character into the translator shift register in the manner previously described.

With the flip-flop R2FF in its logical 1 state, when the A level is received from the central buffer system, the gate A138 operates to set the flip-flop A–AFF to its logical 1 state. A delayed time after the generation of the character load strobe pulse C2, provided by the delay unit DE5, the flip-flop C2–AFF is set to its logical 1 state. The reason for the storage of both the C2 and the A indication is that either may occur first. After both have occurred, the gate A137 will produce a pulse which is applied through the gate OR36 to set the flip-flop RC–AFF to its logical 1 state, enabling the gate A136 to pass eight computer clock pulses as "reply clock" pulses.

As before, the reply clock pulses step the reply counter, shift the second character out of the translator storage register into the central buffer system, and provide strobe pulses for the shifted character information through the gate OR34 on the line B connected to the central buffer system.

At the eighth reply clock pulse, the reply counter will produce a carry pulse which will actuate the gate A139, already enabled by the logical 1 output terminal of the flip-flop R2FF, to set the translator program shift register back to its idle state. At the same time, the flip-flops RC–AFF, C2–AFF, and A–AFF are reset to their logical 0 states.

When the character strobe pulse C2 is generated, it sets the stop flip-flop TFFS to its logical 1 state. This represents a stop bit in the character transmitted to the station. A delayed time after the pulse C2 is generated, the delay unit DE3 will produce a "reply received" pulse to signal the computer to erase its output register and prepare for the next request. The translator portion of the system is now restored to its initial condition.

Turning now to the central buffer system, and referring first to FIG. 17*b*, with the character in storage flip-flop CIS–AFF set to its logical 0 state, and the central buffer system in its "receive" mode of operation, the gate A69 is enabled to supply the level "external load buffer gate" through the inverter I62. Referring to FIG. 17*a*, this level enables the gate A53 to pass the external information from the translator through the gates OR16, the inverter I48, the gate A55, and the inverter I49 to set the delayed AND gates DA6 and DA8 in accordance with the logical state of the bit transmitted. At the same time, the B shift pulses received from the translator are applied to the triggered blocking oscillator TB3 in FIG. 17*b*, and thence through the inverter I66 and the gate A72 in the "external load buffer gate" state, to supply B shift pulses to the gate OR13 in FIG. 17*a*. The output of the gate OR13 is applied through the inverter I42 to shift the information from the translator into the central buffer.

At the same time, in FIG. 17*b* the B shift pulses operate through the gate OR24 to step the pulse counters 1PFF through 4PFF through their eight logical states. At the binary 7 state of these counters, the pulse 8P8 is applied to the gate A71, which is enabled by the "external load buffer gate" level, and which operates through the inverter I63 to set the delayed AND gate DA10 to set the character in storage flip-flop CIS–AFF to its logical 1 state on the trailing edge of the first received B*p* pulse from the triggered blocking oscillator TB3. The gate A69 in FIG. 17*b* is now disabled.

Referring to FIG. 17*a*, with the character in storage flip-flop set to its logical 1 state, the gate A57 is enabled to provide a negative level, which is supplied through the inverter I50 to the AND gates A58 and A56. The gate A58 is disabled at this time because the stop bit sent from the translator has been loaded into the stop flip-flop S–AFF. Now, the gate A56 is enabled to produce the level "receive operation complete." This level is supplied through the inverter I47 to the delayed AND gate DA5. On the trailing edge of the next clock pulse, the stop flip-flop S–AFF remains in its logical 1 state. The AND gate A58 in FIG. 17*a* will now be enabled to provide a "character ready" level which is transmitted to the station through the inverter I51.

Referring now to FIG. 16*e*, the "character ready" level provided by the central buffer system is applied to the gate A5, which is enabled by the "buffer in possession" level and the level provided by the marker flip-flop MFF in its logical 0 state. The "look for 9" operation is now begun by a level supplied from the gate A5 through the gate OR1 to enable the gate A6 to pass the next $7_19_8$ pulse. The gate A6 then applies a level to the gate OR2 to form the level "look for marker," which will enable the gate A3 to pass the next 1 bit located in the $7_19_9$ (system) time at the output of the read amplifier.

The load pulse in the $7_19_9$ system time will be located in the $7_19_9$ time of the character 1 previously loaded. When this character emerges from the delay line, the marker delay flip-flop MDFF will be set as before, and the marker flip-flop MFF will then be set on the next 0.1 microsecond clock pulse to provide the "marker" level at the proper system time. As before, referring now to FIG. 16*d*, the gate A18 will be enabled to provide the "internal unload buffer gate" level through the inverter I11. At the same time, the "information gate" level will be applied to the gate OR5 to block recirculation of the spaces while the new information is being written into the character 2, $7_1$ time, and an "information gate" ground level will be applied through the inverter I10 to enable the information from the central buffer to be supplied through the gate A22 to the write gate OR4.

Referring again to FIG. 17*b*, the "internal unload buffer gate" level from the station will be supplied through the inverter I65 to the gate OR23 and thence to the gate A52 in FIG. 17*a* through the inverter I43 and the gate OR14. A series of buffer shift pulses will then be provided to shift the information out of the central buffer system into the station. It will be noted that the eighth bit located in the stop flip-flop S–AFF will now be 0, because of the clearing operation previously described.

The last character is transmitted to the station and loaded into the character 2 time in the manner previously described. Referring to FIG. 16*c*, in the $7_19_9$ time of the character 2, the gate A38 will be enabled to supply a "load marker gate" level through the gate OR9. Referring to FIG. 16*d*, this level will enable the gate A24 to provide the "marker gate" level. This level will write a $7_19_9$ load pulse into the character 2, through the write gate OR4. At the same time, the connection from the read flip-flop will temporarily be interrupted by the gate OR5, and, referring to FIG. 16*e*, the marker delay flip-flop MDFF and the marker flip-flop MFF will be restored to 0 through the inverter I5. The station will remain in the "external load" mode of operation, with the two reply characters circulating through the delay line and displayed on the cathode ray tube, until the operator desires to begin a request for new information by depressing the clear button, in the manner previously described.

Referring now to FIG. 17*b*, at the $9_8$ time in the transmission of the last character to the station, the gate A73 is enabled to provide a level "last internal unload buffer," which is supplied through the gate OR20 to set the delayed AND gate DA9 to reset the character in storage flip-flop to its logical 0 state. When the character in storage flip-flop goes to its logical 0 state, and referring now to FIG. 17*c*, the "receive operation complete" level, is generated to produce a negative level which is supplied to OR gate OR27 to reset the central buffer program counters MPC1 and MPC2 to their logical 0 states.

The output of A75, BP gate, in FIG. 17*c* is fed to an AND gate A86 which is fed by a 0.3 microsecond pulse on the other terminal. The output of (0.3) *Bp* gate is fed to the transistor base of the CIS flip-flop on the zero set side. The purpose is to reset the CIS flip-flop when the MPC is advanced into the BP shift mode by the "receive op comp" level.

The gate A79 in FIG. 17*c* is now enabled to provide B*p* shift pulses through the inverter I78 to the stations, to begin a new search for a station in the "unload" mode of operation. Referring to FIG. 16*a*, a logical 1 will continue to circulate through the buffer possession flip-flops BPFF1–BPFFN until such a station is found. At the same time, the symbol generator possession flip-flops will continue to cycle, assigning one complete delay line time cycle to each station in turn.

While I have described the operation of the system of my invention for a single simple case, involving request and reply messages of only two characters each, it is believed that the operation of the system for larger messages of various lengths will be apparent from the description of operation given.

I will next describe an embodiment of my invention especially for use in systems in which messages of considerable length are encountered, or in which a large alphabet is employed. In accordance with this embodiment of my invention, the symbol generator possession flip-flops and their function are omitted, and a single symbol generator is assigned to each station. The video information generated by the symbol generator is no longer stored in the delay line, but is supplied directly to the video gate for the video amplifier of the cathode ray tube at each station.

Since the delay line is not employed to store the video information, additional space is available for the storage of characters. The manner in which this additional storage is utilized may best be understood by a consideration of FIG. 24.

In FIG. 24, one manner in which characters may be stored in a delay line in accordance with the second embodiment of my invention is schematically indicated. The delay line is shown as a series of rectangles, each corresponding to a time space in the delay line. If a delay line of the length chosen for description in connection with the first illustrated embodiment of my invention was employed, storage space for 728 characters represented by six bits plus a parity bit could be provided at the frequency assumed. However, as will appear, delay lines of any desired length may be employed, and, for convenience in illustrating the second embodiment of my invention in terms of the circuits employed in the first, I have shown an embodiment using a shorter delay to store 104 characters as before. In this shorter delay line, as illustrated in FIG. 24, assuming a bit repetition rate of 655 kc., storage for 936 bits is available. In a delay line of this length, 104 characters may be stored, in an interlaced manner to be described below.

Since video information is no longer stored in the delay line, each 7 time may be employed to store a single character in this embodiment of my invention. As before, each 7 time is divided nine 9 times. However, the 7 times are no longer grouped in the same manner to form character times. In the embodiment illustrated in FIG. 24, they are grouped into 15 blocks, each of the blocks B1–B14 comprising seven 7 times in the same manner as the character times were assigned in the previous embodiment, but the block B15 including only six 7 times. Thus, when the system time indicates that the various $7_1$ times occur, the 16th $7_1$ time will occur in what would correspond to the $7_2$ space in the delay line, because the delay line has been thrown one 7 time off the system time at each revolution.

In order to allow time for the display of each character on the cathode ray tube, a delay sufficient to provide the desired character spacing and the time necessary to generate the video information must be allowed between each character code sent to the symbol generator and the next. Accordingly, the second character bit cannot be loaded into the 7 time next to the $7_1$. For the first 15 characters, loading proceeds in the same manner as in the previous embodiment, in the $7_1$ spaces of the blocks B1–B15. As shown in FIG. 24, loading the system $7_1$ time will place the character 1 code in the first space of block B1, character 2 code in the first space of block B2, and so on, until the character 15 code has been placed in the $7_1$ time of the block B15. The next $7_1$ system time will occur during the second 7 time in the block B1. Accordingly, the 16th character code will be loaded adjacent the first character code. Similarly, the 17th character code will be loaded after the second character code, the 18th character code will be loaded after the third character code, etc. Loading will continue in this manner until the 104th character code has been loaded in the seventh 7 time in the block B14. It will be apparent that if the characters are written out of the delay line in $7_1$ system times, they will appear in the order 1, 2, 3, 4, etc. with six 7 times intervening after each character code appears. It will be apparent that access to each character thus require an average time of one revolution of the delay line as before, but although the delay line is shorter, the same number of characters require the same amount of processing time. Seven revolutions of the delay line will be required to unload all of the characters. With the constants assumed, the frame rate of display on the cathode ray tube will be 100 frames per second. Thus, over 300 characters could be displayed, by increasing the delay line length, without bringing the display rate below 30, and more could be employed by using a higher system frequency.

The arrangement of the characters and the length of the delay line indicated in FIG. 24 is typical, but many variations may be made. A more general discussion of the interlacing system illustrated by the particular interlacing scheme shown in FIG. 24 will be given after the structural modifications of the system of the first embodiment of my invention necessary to convert it for use with the delay line shown in FIG. 24 have been considered.

Referring now to FIG. 25, the modified system is shown in block form with the changes indicated. The symbol generator of FIG. 18 may be employed, with the exception that the OR gate OR30 in FIG. 18 is no longer required, because each station has its own symbol generator. As shown in FIG. 24, the output of the read flip-flop RDFF is now gated to the symbol generator in $7_1$ time by the AND gate A151. The video output is now supplied directly to the gate A4 of FIG. 16*f*, in place of the write gate output line shown in FIG. 16*f*. As before, the output of the gate A4 is supplied to the video amplifier 61 through the emitter follower EF1, and energizes the grid of the cathode ray tube 3 to display the generated character. The rest of the circuits for the cathode ray tube may be the same. Referring to FIG. 16*d*, the gates A20, A21 and the inverter I9 may be omitted, since the video information is no longer supplied to the write gate OR4. Referring to FIG. 16*b*, the gate A43 may be omitted, because the symbol generator possession system is no longer employed, and the output of the read flip-flop, applied to the gate A43 in FIG. 16*b*, is now applied to the gate A151 as indicated in FIG. 25. The rest of the station circuits, the central buffer system, the translator circuits, and the central counter system, may be the same.

As stated above, the method of interlacing illustrated by FIG. 24 is considerably more general than has been so far described. This may be shown in the following manner, having reference to FIG. 24. As shown in FIG. 24, each block such as the block B11 comprises seven 7 times. For each character stored, a time $ta$ must be provided in which to store a character code. The length of this time $ta$ will be determined by the number of bits required to store the character code, which in turn depends upon the total number of characters in the alphabet and upon the time required for each bit; thus, it is basically determined also by the system frequency or bit repetition rate. A second time $tb$ must be provided which determines the spacing between characters. The number of bits allotted to this time is determined primarily by the nature of the display and the form of characters. In the illustrated embodiments, it has been selected to be equal to the character storage time, but this is obviously not necessary.

A third time $tc$ must be associated with each character which is long enough to permit the generation of the video code for displaying the character. This time $tc$ is basically determined by the system operating frequency and by the resolution and size of the character which it is desired to display. While it has been illustrated as being five times the length of the character code storage time, this is not a necessity, and other relative times may be provided if desired. However, in accordance with the second embodiment of my invention, there is a limitation on the relationship between the times $ta$, $tb$ and $tc$ which must be observed if the entire storage capacity of the delay line is to be utilized.

Specifically, (1) $$tb+tc=kta$$

Here, $k$ is an integer; if it were not, the times $tb+tc$ would not include an equal number of whole character code storage times. However, there need be no special relationship between $tb$ and $tc$.

Since (2) $$Bi=ta+tb+tc$$

where $$i=1, 2 \ldots n-1$$

and

B$i$ is the duration of each block except the last block B$n$, then (3) $$Bi=ta(k+1)$$

The last block in the line has a duration B$n$ given by:

(4) $$Bn=ta(k-p)$$

where $p$ is a positive integer such that (5) $$Bi>Bn>0$$

The total duration D of the delay line is then given by:

(6*a*) $$D=Bi(n-1)+Bn$$

therefore, (6*b*) $$D=ta[(n-1)(k+1)+k-p]$$

simplifying, (6*c*) $$D=ta[n(k+1)-p-1]$$

where $n$ is the number of blocks.

The total number N of characters which may be stored in the delay line is given by:

(7) $$N=n(k+1)-p-1$$

The number of revolutions R of the line necessary for a complete display of all of the stored characters is:

(8) $$R=k+1 \text{ revolutions per display}$$

Therefore, the frame rate of the display is:

(9) $$F=\frac{1}{D(k+1)} \text{ displays/revolutions}$$

from (6*c*), (7) and (9), (10a) $$F=\frac{1}{taN(k+1)}$$

If there are $m+3$ bits required for the storage of each character, where $m$ is the number of bits in the character code, and a parity bit, a load bit, and an unload bit are provided, and the bit repetition rate of the system is $f$ bits per second, then $ta$ may be expressed as $$\frac{m+3}{f}$$

and equation (10*a*) becomes

(11) $$F=\frac{f}{N(k+1)(m+3)}$$

As an illustration, using the delay line of FIG. 24, if the bit repetition of 655200 bits/second was used, and the character code employed 6 information bits, the frame rate would be $$F=\frac{655200}{104\times7\times9}=100 \text{ displays/second}$$

This is the same frame rate as in the first described embodiment, but requires a shorter delay line for the same amount of information. Desirably, the frame rate is at least 20 displays per second, to avoid visually uncomfortable flicker on the screen.

It will be apparent that the above equations may be employed to adapt the system of my invention to specific requirements for message length, frame rate, character spacing and display resolution.

While I have described various embodiments of my invention in detail, many changes and variations will occur to those skilled in the art upon reading my description, and each can obviously be made without departing from the scope of my invention.

Having thus described my invention, what I claim is:

1. In an information processing system having a capacity for messages comprising N characters each represented by an electrical pulse sequence corresponding to a digital code sequence of $m$ bits produced at the rate of $f$ bits per second; timing means for producing a series of clock pulses at the rate of $f$ bits per second; means connected to and controlled by said timing means for periodically generating a first ordered sequence of $m+2$ electrical signals $b_1, b_2 \ldots b_m+2$ each having a duration of $1/f$ seconds and each corresponding in time to a clock pulse, a second ordered sequence of $k+1$ second electrical signals $S_1 \ldots S_{k+1}$ each having a duration of $$\frac{m+2}{f}$$

seconds and being in time phase with the first ordered sequence, and at least one electrical signal T having a duration of at least $$\frac{(k+1)(m+2)}{f}$$

seconds, where $k$ is an integer, and being in time phase with one occurrence of said second ordered sequence; a delay line having a delay of D seconds; message generating means for generating a sequence of electrical pulse character sequences representing the character of a message; manually operable means controlled by said signal T, a selected one $S_i$ of said signals S, and a selected one $b_i$ of said signals $b$ for supplying a first load pulse to the delay line at the time $TS_ib_i$; means controlled by the delay line and the signals $S_i$ and $b_i$ for producing a gate signal in response to the emergence of the load pulse; means controlled by the gate signal, the message generating means, the next following signal $S_i$ generated by said timing means and all of the signals $b$ except for $b_i$ and another selected one $b_j$ of said signals $b$ for gating the first character sequence to the delay line; means for supplying a load pulse to the delay line in response to the same signal $S_i$ and the signal $b_i$; and means for recirculating the contents of the delay line, whereby the successive character sequences of the message are loaded into the delay line on successive cycles thereof and sequentially in times marked by the times $S_i$.

2. In an information processing system, a recirculating delay line having a delay D, timing means operable periodically with a period D for registering the subdivision of the period D into a first group of N character storage times, the subdivision of each character storage time into $k+1$ code storage times, and the subdivision of each code storage time into $m+2$ bit storage times, where N, $k$ and $m$ are integers, load pulse means controlled by said timing means and operable when manually actuated to supply a first load pulse to the delay line in the last bit time in the first code storage time of a reference character time, message generating means for generating a message comprising a series of digital character code pulse sequences of $m$ bits each representing a character in the message, means for producing a strobe pulse for each character code sequence, first registering means controlled by the strobe pulse producing means, the delay line and the timing means for detecting said first load pulse, means controlled by receipt of each strobe pulse for erasing said first load pulse from the delay line at the output thereof, means controlled by said first registering means, said timing means and said message generating means for storing the first character code in each message in the delay line in the first $m$ bit times of the first code storage time of a first character time next following the reference character time, represented by presence of said first load pulse, and means for reinserting said first load pulse in the $m+2$ bit time of the first code storage time of the first and each succeeding character time receiving a character code from said message generating means, whereby the first character time becomes the reference character time for the next character to be loaded and so on until the last character, and following the last character the message is recirculated in the delay line with a load pulse in the $m+2$ bit time of the first code storage time of the character time in which the last character was loaded.

3. In combination with a delay line, pulse writing means for supplying pulses to the delay line, pulse reading means controlled by the delay line for producing pulses in response to pulses emerging from the delay line, an OR gate, recirculating gate means for connecting the reading means to the writing means through the OR gate and having a first state in which pulses from the reading means are transmitted to the OR gate and responsive to an applied pulse to shift to a second state in which pulses are not transmitted to the OR gate, timing means having a period equal to the delay of the delay line for periodically producing a series of character time signals which have a total duration equal to the delay of the delay line, marker gate means controlled by said timing means and actuated by a reference one of said time signals for supplying a pulse to said writing means and said recirculating gate means to write a load pulse into the delay line defining a reference character time and to shift the recirculating gate means to its second state during the pulse, means controlled by the timing means and the reading means for registering the load pulse and erasing it from the delay line at the output thereof, and character generating means controlled by the timing means and the registering means for supplying a sequence of code pulses identifying a character and a load pulse to the writing means in response to the character time signal following the reference character time.

4. In combination, a recirculating pulse delay means having a predetermined delay, timing means for periodically producing a series of timing pulses at equal intervals which are submultiples of the predetermined delay, manually enabled gate means for supplying one of said timing pulses to said delay line, storage means controlled by said delay line and responsive to said one pulse for storing it, means controlled by said storage means for supplying a pulse sequence to said delay line following the previously stored pulse and before the next timing pulse, and means controlled by said pulse sequence supply means for erasing the stored pulse from the storage means and supplying the next timing pulse to the delay line upon transfer of said pulse sequence to said delay line.

5. In a data processing system for processing messages comprising not more than N characters represented by character code sequences, a delay line having a storage capacity sufficient to store N character code sequences, means for supplying a reference pulse to said delay line to mark a character storage starting time, means connected to said delay line for recirculating information in said delay line, manually operable means for generating a message a character code sequence at a time and a strobe pulse for each character code sequence, temporary storage means for storing each character code sequence for at least two revolutions of said delay line, means controlled by the delay line and actuated by each strobe pulse for erasing the reference pulse from the delay line as it emerges and registering the time of its emergence, means controlled by said registering means and said temporary storage means for supplying each character code sequence to the delay line in the time immediately subsequent to the registered time, and means controlled by said registering means for supplying a new reference pulse to the delay line following the last stored character code sequence to mark the starting time for storing the next character code sequence.

6. In a data processing system, a delay line for storing electrical pulses and having a capacity for at least $n$ bits of a predetermined duration $1/f$ seconds per bit, means for producing a series of clock pulses at a repetition rate of $f$ pulses per second, means controlled by said clock pulses for cyclically producing a series of $n$ timing signals, one for each clock pulse, means for storing a code sequence of $n-2$ pulses, and gate means controlled by $n-2$ of said timing signals for storing said code pulses in said delay line each at a time corresponding to a different one of said $n-2$ timing pulses.

7. An information processing and display system comprising a shift register having a capacity of $m+1$ bits; recirculating pulse delay means having a capacity of $N(m+2)(k+1)$ bits, said delay means comprising a delay line, a first one-bit register, a source of strobe pulses, gate means connected to said one-bit register, said source and said delay line for applying the contents of said one-bit register to said delay line at each strobe pulse, a second one-bit register, a second source of strobe pulses, one for each first strobe pulse, second gate means connected to said delay line and said second pulse source for applying the output of the delay line to the second one-bit register at each second strobe pulse, and recirculating gate means controlled by the second one-bit register for applying its contents to the first one-bit register when enabled; means for disabling the recirculating gate means and storing a load bit in the first one-bit register, means for registering the emergence of the load bit from the delay line, means controlled by said load bit registering means for apply $m+1$ shift pulses to the shift register, means controlled by said load bit registering means for connecting the shift register to said first one-bit register, and means controlled by said load bit registering means for disabling the recirculating gate means while the contents of the shift register are stored in the delay line.

8. In an information processing and display system, in combination; a station, comprising a console having a keyboard provided with a group of manually operable labeled keys, a cathode ray tube having a display screen mounted on the console adjacent the keyboard, a recirculating delay line, and means controlled by said keys for entering digital character code sequences into said delay line with a delay between each sequence sufficient for the storage of a video display code sequence for actuating said tube to display the associated character; a symbol generator comprising means responsive to the character code sequences emerging from said delay line for generating a series of video display code sequences for displaying the characters represented by the character code sequences, means for entering the video code sequences into said delay line each following its associated character code sequence, and means responsive to the video code sequences in said delay line for controlling the cathode ray tube to display the stored character on the display screen.

9. A message display system, comprising; a cathode ray tube having a display screen, means for focussing a beam of electrons on said display screen, means for modulating the intensity of said beam, and horizontal and vertical beam deflection means; means for supplying a triangular horizontal sweep voltage to said horizontal deflection means having a period of $D/2$ seconds, a rise time of $$\frac{(N-X)(m+2)(k+1)}{yf}$$

seconds, where $N-X$ is the maximum number of characters in the message to be displayed, $f$ is a predetermined bit repetition rate, $m$ is the number of bits required to define a character in a selected digital code, $y$ is the number of lines to be utilized in displaying the message, $k$ is an integer, X is the minimum integer required by the fall time characteristics of the sweep voltage source and the particular tube, and $$D=\frac{N(m+2)(k+1)}{f}$$

means for applying a triangular sweep voltage to said vertical deflection means having a period of $$\frac{m+2}{f}$$

a rise time of $m/f$ and a fall time of $2/f$ seconds; means for applying a series of pulses to said beam intensity modulating means during the rise time of the vertical sweep pulses occurring during the rise time of the horizontal sweep pulses to form dot-pattern displays of the characters of a message, and means for applying a step voltage to said vertical deflection means having $y$ equally timed levels and a period of D seconds to direct the displays of the various characters to the appropriate display line.

10. In combination, means for generating a stream of $f$ clock pulses per second, $m+2$ first terminals, first means responsive to said clock pulses for cyclically energizing said first terminals, one for each clock pulse, $k+1$ second terminals, second means responsive to said clock pulses for cyclically energizing said second terminals, one for each $m+2$ clock pulse, a delay line having a period of $$\frac{N(m+2)(k+1)}{f}-\frac{2}{f}$$

seconds, where $m$, $k$ and N are integers, means connected to said delay line for recirculating pulses therein, means for inserting and storing a reference pulse in said delay line upon energization of the last of said first terminals and the first of said second terminals, a source of code pulse sequences of $m$ bits, means controlled by the emergence of the reference pulse from the delay line for serially strobing the $m$ bits of the first one of said code sequences into the delay line each when the first one of said $m+2$ first terminals is energized and the first one of said second terminals is energized following the emergence of the reference pulse, and means for shifting the reference pulse into emergence time phase with the energization of the last one of said first terminal next following the storage of said first sequence, whereby N code sequences may be stored in the delay line separated in the order of entry by a time equal to $$\frac{(k+1)(m+2)}{f}$$

seconds.

11. In combination, a recirculating delay line, means for storing a series of code sequences representing characters in a selected alphabet in said delay line at predetermined intervals, means controlled by said delay line in response to character code sequences emerging therefrom to generate a display code sequence for each character code sequence, means for storing the display code sequences in the delay line each following its associated character sequence, and display means controlled by said delay line in response to the display code sequences for displaying the associated characters once for each revolution of the delay line.

12. In combination with a cathode ray tube having beam intensity control means and a vertical sweep voltage comprising triangular pulses with a rise time of $r/f$ and a fall time of $s/f$ seconds; periodic timing means synchronized with said sweep voltage for marking each $k+1$ sweep pulses by providing a discrete signal for each pulse; a first set of lines, one for each of $b$ of said $k+1$ sweep pulses; means for energizing said lines sequentially by $b$ of said signals; second timing means synchronized with said sweep voltage for periodically producing sequences of $r$ discrete signals, said signals each having a duration of $1/f$ seconds and said sequences each occurring during a rise time; a second set of $rb$ lines; gate means controlled by said first set of lines and said $r$ discrete signals for sequentially energizing said $rb$ lines; a set of character lines, one for each character in a selected alphabet, said lines each being connected to ones of said $rb$ lines selected to form a serial code sequence in a group of $b$ rise times to display a dot pattern of the associated character; character code storage means; and gate means controlled by said character code storage means for connecting the character line corresponding to the stored character code to the intensity control means for the cathode ray tube.

13. In combination, a station comprising a console having a manually operable character code sequence generator for producing a sequence of character code sequences comprising an input message, a recirculating delay line for storing each character code as it is generated and recirculating the codes, display means controlled by the recirculating codes for displaying the stored message, shift register means, manually operable means for connecting the delay line to the shift register to store the first stored character of the message, means responsive to the storage of a character for disconnecting the delay line from the shift register means, information source means for supplying a reply message in response to an input message, means transmitting a character stored in the shift register means to the information source means, means responsive to the transmission of a character from the shift register means to connect the delay line to the shift register means to store the next character in the shift register means, and means controlled by the delay line for interrupting the connection to the shift register means and connecting the shift register means to receive a reply message from the information source means, means controlled by the information source means for storing the first character of a reply message in the shift register means, means responsive to the storage of a reply message character in the shift register means for interrupting the reply character storage means and connecting the shift register to store the first reply character in the delay line, means responsive to the storage of a reply character in the delay line for connecting the shift register means to receive the next reply character from the information source means, means responsive to the storage of the last reply character in the shift register means for interrupting the reply character storage means, and means responsive to the storage of the last reply character in the delay line for disconnecting the shift register means from the delay line.

14. In combination with a recirculating delay line, means for storing a load marker bit in the line, means for sequentially storing code sequences in the line following the load marker bit and shifting the load marker bit behind each sequence as it is loaded, means for storing an unload marker bit in the line ahead of the first loaded sequence, transmitting means for sequentially detecting the unload marker bit, unloading the next sequence, and shifting the unload marker bit ahead of the next sequence, and means for registering the location of the unload marker bit adjacent the load marker bit in the line for disconnecting the transmitting means.

15. In combination, first and second shift register means for storing a code sequence representing a character in a message, information processing means for sending messages a character at a time in code sequences representing the character, information source means for supplying in code sequences a reply message a character at a time in response to a message applied to it a character at a time in code sequences, a first conducting line, a second conducting line, means controlled by said information processing means for storing a character in said first shift register means, means responsive to the storage of a character in said first shift register means for applying a signal to said first line, means connected to said first line and controlled by said signal and said second shift register means for applying a signal to said second line, means connected to said second line and responsive to the signal applied thereto for shifting the contents of said first shift register to the second shift register and applying shift pulses to said first line, means connected to said first line for shifting said second shift register to store said character, means responsive to the storage of a character in said second shift register means for transferring the contents of said second shift register to said information source means, means operable after the transfer of a character to the information source means to apply a signal to the second line, means responsive to the last shift pulse applied to the first shift register means and controlled by said information processing means for storing a character in said first shift register, means controlled by the information processing means for storing a stop character in the first shift register, means responsive to the storage of the stop character in the second shift register for interrupting the connection to the second line, means controlled by the stop character and the information source means for supplying a reply message to the second shift register means a character at a time, means controlled by the second shift register means for transferring the reply characters to the first shift register means as they are received, and means controlled by the first shift register means for transferring the reply characters to the information processing means a character at a time as they are received.

16. An information processing and display system, comprising, in combination, a plurality of stations each comprising a recirculating delay line having a period D, means for storing a coded message a character code at a time in said delay line in an ordered sequence spaced by equal time spaces, and a character display means responsive to a display code for displaying a character represented by the code, symbol generator means for producing a sequence of display codes in response to a sequence of applied character codes, periodic switching means having a period D for sequentially connecting the delay lines of each station to apply character codes to said symbol generator, means controlled by the symbol generator and the switching means for applying the generated display codes to the delay line for the station then supplying character codes in the time spaces following each applied character code, and means controlled by the delay line in each station for supplying the stored display codes to the character display means.

17. In combination, a console having a keyboard and a cathode ray tube having a visible screen mounted thereon, said keyboard being provided with keys labeled with characters in a selected alphabet, a recirculating delay line, means controlled by said keys when sequentially actuated for storing a sequence of character codes in said delay lines representing the characters labeled on the keys, and means responsive to the stored character codes for displaying the associated characters on the screen.

18. In combination, a recirculating pulse storage means comprising a delay line and a one-bit register responding to the output of the delay line after a one-bit delay, means for storing a message in said delay line comprising a series of characters, a load bit following the last character, and an unload bit ahead of the first character, means for sequentially unloading the delay line and shifting the unload bit one character space as each character is unloaded, and means controlled by the output of the delay line and the output of the one-bit register for registering the unloaded state of the line in response to detecting a load bit adjacent an unload bit.

19. In an information processing system, timing means for periodically producing a first set of character signals of a first duration, a second set of code storage signals of a second duration which is a submultiple of said first duration, and a third set of bit storage signals of a third duration which is a submultiple of said second duration, recirculating serial bit storage means having an output terminal and an input terminal, manually controlled means operable during a reference one of said code storage signals and a reference one of said bit storage signals for applying a load pulse to the input terminal of the storage means, means for storing a character code pulse sequence for a period equal to at least one revolution of the storage means, code generating means for applying a series of pulse code sequences to said sequence storing means at intervals equal to more than one revolution of the storage means, means controlled by said code generating means for producing a strobe pulse for each code sequence, means controlled by the strobe pulse, the presence of a load pulse on the output terminal of the storage means, and said reference character storage, code storage and bit storage signals for removing the load pulse from the delay line, means for storing the load pulse, means controlled by the load pulse storing means, the next character signal, the reference code storage signal, and the bit storage signals except the last two for applying said stored sequence to the input terminal of the delay line, and means responsive to the next last bit storage signal for reinserting a load pulse at the input terminal of the recirculating storage means.

20. In combination, manually operable means for generating an information request message a character at a time, means for storing the message characters, means controlled by said storage means for displaying the stored characters, information source means for producing a reply message in response to an information request message, manually enabled means for transmitting the stored message to the information source means a character at a time, and means controlled by said information source means for transmitting a reply message a character at a time to said storage means.

21. In apparatus for communication between first and second shift registers, the combination comprising control means for regulating the admission of information to each register, control means for regulating the transmission of information from each register, a first communication channel, means for transmitting over said first channel an indication that the first shift register has in storage information to transmit, a second communication channel, means responsive to said indication and governed by the state of said second shift register for transmitting over said second channel an indication that the second shift register is in condition to receive information, a third communication channel, means for actuating the transmission control means for said first shift register to shift said information from said first register to said second register over said third channel and simultaneously transmit shift pulses over said first channel to said admission control means for said second register to store the information therein, processing means responsive to applied information for producing reply information, means responsive to the storage of information in said second register for actuating the transmission control means for said second register to extract the stored information and supply it to said processing means, means controlled by said processing means for actuating the admission control means for said second register to store said reply information in said second register, means responsive to the storage of said reply information for transmitting over said second channel an indication that the second register has in storage information to transmit, means responsive to said last recited indication and governed by the state of said first register for transmitting over said first channel an indication that the first register is in condition to receive information, a fourth communication channel, and means for actuating the transmission control means for said second shift register to shift said reply information from said second register to said first register over said fourth channel and simultaneously transmit over said second channel shift pulses to said admission control means for said first register to store the reply information therein.

22. In apparatus for exchanging information between first and second information processing systems, a first information channel between said first and second information processing systems, control means for transmitting over said first channel to said second system a first message that it is desired to transfer information from said first system to said second system, a second information channel between said systems, reply means responsive to said first message and the condition of said second system for transmitting over said second channel a second message indicating that said second system is capable of receiving information, a third information channel between said systems, and transfer means responsive to said second message for transmitting information in serial digital code over said third channel from said first system to said second system, said transfer means including means for transmitting clock pulses over said first channel from said first system to said second system to control the registration of said code in said second system simultaneously with transmission of said code to said second system.

23. The combination defined in claim 22 further including means for transmitting over said second channel a third message that it is desired to transfer information from said second system to said first system, means responsive to said third message and the condition of said first system for transmitting over said first channel to said second system a fourth message indicating that said first system is capable of receiving information, a fourth information channel between said systems, and means responsive to said fourth message for transferring information in serial digital code over said fourth channel from said second system to said first system including means for simultaneously transmitting clock pulses over said second channel to said first system for registering said information in said first system.

24. In combination, first and second shift register means for storing a code sequence representing a character in a message, information processing means for sending messages a character at a time in code sequences representing the character, information source means for supplying in code sequences a reply message a character at a time in response to a message applied to it a character at a time in code sequences, a first conducting line, a second conducting line, means controlled by said information processing means for storing a character in said first shift register means, means responsive to the storage of a character in said first shift register means for applying a signal to said first line, means connected to said first line and controlled by said signal and said second shift register means for applying a signal to said second line, means connected to said second line and responsive to the signal applied thereto for shifting the contents of said first shift register to the second shift register and applying shift pulses to said first line, means connected to said first line for shifting said second shift register to store said character, and means responsive to the storage of a character in said second shift register means for transferring the contents of said second shift register to said information source means.

25. In combination with a delay line having a delay of D seconds and capable of storing N characters, an arrangement for loading said delay line comprising, first means for applying a first load pulse to said delay line to mark a load starting time, second means for detecting the emergence of said first load pulse from said delay line, third means responsive to detection of said first load pulse by said second means for loading a code sequence into said delay line, fourth means responsive to said third means for actuating said second means to load second load pulse into said delay line subsequent to said code sequence, fifth means responsive to detection of said second load pulse by said second means for deleting said second load pulse and actuating said third means to load a code sequence in said line thereafter, sixth means responsive to said fifth means for actuating said fourth means to re-insert said second load pulse subsequent to the last code sequence, and seventh means for disabling said fifth means in response to loading of the Nth code sequence into said line.

26. The combination defined in claim 25 further including an arrangement for unloading said delay line comprising, eighth means responsive to actuation and detection of said first load pulse by said second means for actuating said fifth means to withdraw said first load pulse and a code sequence subsequent thereto and for actuating said sixth means to re-insert said first load pulse thereafter, and ninth means for disabling said eighth means in response to detection of said first and second load pulse adjacent one another in said delay line.

27. In combination with a recirculating serial storage means, an arrangement for loading and unloading said storage means comprising first means for entering a first marker pulse into said storage means, second means for detecting said first marker pulse and loading a code sequence into said storage means subsequent thereto, third means responsive to loading of said code sequence by said second means for shifting said first marker pulse to a point behind said stored code sequence, fourth means actuatable to insert a second marker pulse ahead of the first stored code sequence in said storage means, fifth means responsive to detection of said second marker pulse for withdrawing said second marker pulse and the code sequence subsequent thereto, sixth means responsive to said fifth means for reinserting said second marker at the head of said code sequences in said storage means, and means for disabling said fifth means upon detection of said first and second marker pulses adjacent one another in said storage means.

References Cited by the Examiner

UNITED STATES PATENTS

| | | | |
|---|---|---|---|
| 2,914,757 | 11/1959 | Millership | 340—347 |
| 3,036,291 | 5/1962 | Whittle | 340—172.5 |
| 3,037,192 | 5/1962 | Everett | 340—172.5 |
| 3,103,658 | 9/1963 | Chiang | 340—324 |
| 3,107,344 | 10/1963 | Baker | 340—173 |
| 3,117,220 | 1/1964 | Wensley | 340—172.5 |
| 3,145,369 | 8/1964 | Perschy | 340—173 |
| 3,160,857 | 12/1964 | Frush | 340—142.5 |
| 3,169,240 | 2/1965 | Macovski | 340—324 |

ROBERT C. BAILEY, *Primary Examiner.*

R. B. ZACHE, *Assistant Examiner.*